United States Patent [19]
Suffern et al.

[11] Patent Number: 5,646,983
[45] Date of Patent: Jul. 8, 1997

[54] HOST COMPUTER DIGITAL SIGNAL PROCESSING SYSTEM FOR COMMUNICATING OVER VOICE-GRADE TELEPHONE CHANNELS

[75] Inventors: Robert C. Suffern, Chicago, Ill.; Andrew L. Norrell, Nevada City, Calif.

[73] Assignee: U.S. Robotics Access Corp., Skokie, Ill.

[21] Appl. No.: 37,075

[22] Filed: Mar. 25, 1993

[51] Int. Cl.⁶ .................................................. H04M 11/00
[52] U.S. Cl. .................................. 379/93.32; 379/93.05; 379/100.15; 379/89
[58] Field of Search .............................. 379/93, 96, 97, 379/98, 88, 89; 375/8, 9, 122

[56] References Cited

U.S. PATENT DOCUMENTS

| | | | |
|---|---|---|---|
| 4,085,449 | 4/1978 | Walsh et al. | 364/900 |
| 4,455,661 | 6/1984 | Qureshi | 375/8 |
| 4,518,823 | 5/1985 | Kessler | 179/2 |
| 4,646,320 | 2/1987 | Krishnan | 375/8 |
| 4,680,773 | 7/1987 | Amundson | 375/8 |
| 4,700,358 | 10/1987 | Duncanson et al. | 375/8 |
| 4,890,316 | 12/1989 | Walsh et al. | 375/8 |
| 4,965,641 | 10/1990 | Blackwell et al. | 375/7 |
| 5,008,901 | 4/1991 | Wallach et al. | 375/122 |
| 5,170,470 | 12/1992 | Pindar et al. | 379/93 |
| 5,175,633 | 12/1992 | Saito et al. | 375/8 |
| 5,283,638 | 2/1994 | Engberg et al. | 379/93 |
| 5,365,545 | 11/1994 | Blackwell et al. | 375/8 |

OTHER PUBLICATIONS

CCITT Recommendation T.4 on "Standardization of Group 3 Facsimile Apparatus for Document Transmission."

The Theory and Practice Modem Design, by John A.C. Bingham, pp. 166–167, 226–231, and 282–286 (1988).

*Primary Examiner*—Curtis Kuntz
*Assistant Examiner*—Stephen Palan
*Attorney, Agent, or Firm*—McDonnell Boehnen Hulbert & Berghoff

[57] ABSTRACT

A conventional computer is coupled to an analog telephone transmission link by an analog/digital conversion interface adapter. Modem transmission is accomplished by performing the modulation and demodulation functions digitally in the computer's existing processor which executes programs which transfer data between the computer's memory and the interface adapter. Using the same interface adapter and existing processor, the arrangement may be used to send and receive images in the form of standard V.29 format facsimile data, to send and receive data operating as a synchronous IBM 3270 compatible terminal device, or to record and play back conventional voice transmissions rather than data to implement a telephone answering, voice message handling, and telemarketing systems.

23 Claims, 3 Drawing Sheets

HOST COMPUTER DIGITAL SIGNAL PROCESSING SYSTEM FOR COMMUNICATING OVER VOICE-GRADE TELEPHONE CHANNELS

COPYRIGHT NOTICE

A portion of the disclosure of this patent document contains material which is subject of copyright protection. The copyright owner has no objection to the facsimile reproduction by anyone of the patent document or the Patient and Trademark Office patent file or records, but otherwise reserves all copyright rights whatsoever. Copyright 1993 U.S. Robotics, Inc.

FIELD OF THE INVENTION

This invention relates to electronic communications systems and more particularly to a system for enabling a computer to transmit and receive information over an analog communications link.

BACKGROUND OF THE INVENTION

Computers typically use modems to communicate digital information over voice-grade telephone lines. Such modems translate digitally expressed information from the computer into analog tone signals suitable for transmission over the voice-grade telephone facility, and convert such tones back into digital form when received from the telephone line.

High speed modems may advantageously employ digital signal processing techniques for translating outgoing digital data into a sequence of digital values each representing a desired analog output signal sample amplitude. These digital sample values may then be converted into analog form by a digital-to-analog converter for transmission over the telephone facility. Correspondingly, at the receiving station, the incoming analog signal may be converted into a train of digital sample amplitude values which are then processed to reconstruct the original digital data.

The processing of the digital sample values is complex and has heretofor been accomplished by one or more dedicated microprocessors which form the heart of the digital modem. For example, the 9600 baud HST modem manufactured by U.S. Robotics Corporation and described in U.S. Pat. No. 5,008,901 issued on Apr. 16, 1991 employs three microprocessors: (1) a transmitting microprocessor dedicated primarily to the translation of digital data into digital sample values; (2) a receiving microprocessor devoted primarily to the translation of sample amplitude values back into digital data; and (3) a supervisory microprocessor which serves as the interface to the computer to which the modem is connected.

SUMMARY OF THE INVENTION

The present invention, like the digital modems described above, employs analog/digital conversion methods to convert received analog signals into digitally expressed analog sample values and, during transmission, to convert digitally expressed sample values into analog form. Unlike prior digital modems, however, in the present invention the digital sample value signals are not processed by a separate processor or processors within the modem unit, but are rather processed by the microprocessor already present in the connected computer. As a consequence, the cost of the modem is substantially reduced because the need for separate processors is eliminated.

The arrangement contemplated by the invention is implemented by the combination of a conventional host computer employing a microprocessor and a low-cost interface unit consisting of telephone line adaptor circuitry, an analog/digital converter, and a direct digital interface to the host computer's system I/O bus. The telephone interface unit exchanges digitally-expressed analog sample amplitude values directly with the connected host computer, and the microprocessor within the host computer handles the remainder of the digital processing.

When operating as a modem, digital data can be processed into a sequence of digitally expressed sample values in accordance with a selected one of several accepted modem formats and transmission speeds. Given processors of speeds typically available, such modem processing can take place in real time to eliminate the need for storing the digital sample data in memory; for example, using the preferred embodiment of the invention to be described, a relatively slow Intel 80286 (IBM-AT class) processor operating at 12 mhertz has been shown to have adequate computational capability to perform the modulation and demodulation processing needed for 2400 baud full-duplex modem operation.

Without requiring any additional hardware, the system may be programmed to send and receive graphical data as standard V.29 format facsimile data, or to send and receive data synchronously operating, for example, as an IBM 3270 compatible terminal device. Moreover, when the digital sample values represent conventional voice transmissions rather than data, the system may be used to provide automated voice recording and playback functions to implement a telephone answering, voice message handling, and telemarketing systems.

These and other functions may be added or revised without requiring any hardware modifications by simply changing standard programs which execute on the host processor in standard ways.

These and other features and advantages of the present invention will become more apparent by considering the following detailed description of a preferred embodiment of the invention. In the course of this description, reference will frequently be made to the attached drawings.

DETAILED DESCRIPTION

Figure 1:
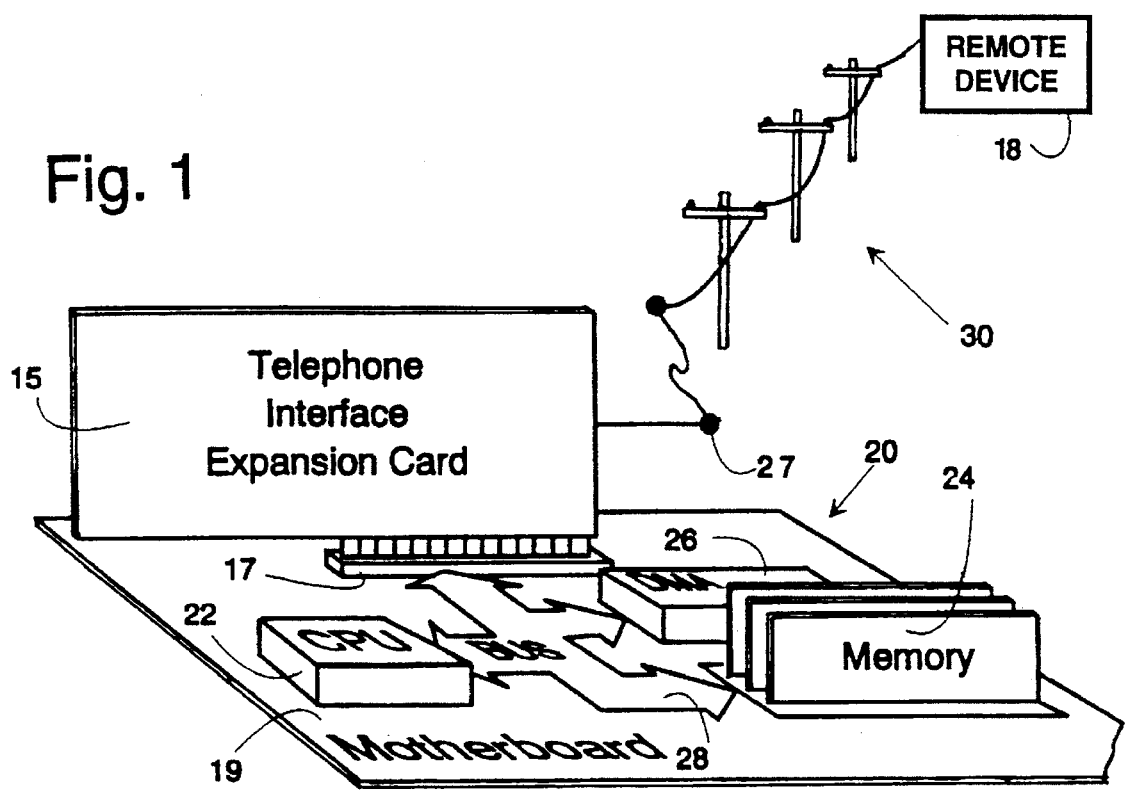
FIG. 1 illustrates the major hardware components of the preferred embodiment of the invention.

The preferred embodiment of the invention as illustrated in FIG. 1 consists of auxiliary components mounted on an expansion card 15 which plugs into an available socket 17 on the motherboard 19 of a conventional IBM-compatible Personal Computer indicated generally at 20. The host computer 20 includes a conventional single-chip integrated microprocessor 22 which executes programs stored in a RAM memory unit which is depicted in FIG. 1 as a group of SIMM (single inline memory module) devices 24 mounted on the motherboard 19. The RAM memory 24 is typically loaded with programs to be executed by the microprocessor 22 from their permanent storage location on a magnetic disk drive (not shown). The programs described which will be described below in connection with this preferred embodiment of the invention are executable on any IBM-compatible personal computer using the MS-DOS operating system. In order to provide adequate computational capacity, the microprocessor 22 is preferably be selected from the Intel 80286, Intel386 or Intel486 families of processors, or their functional equivalents, and should operate at a clock rate of at least 12 megahertz. In the description to follow, reference will also be made to the host computer's standard DMA (direct memory access) controller seen at 26 in FIG. 1. The host computer 20 includes an internal system bus 28 which interconnects the microprocessor 22, the random access memory 24, the DMA controller 26 and the expansion card 15 via the expansion socket 17.

Figure 2:
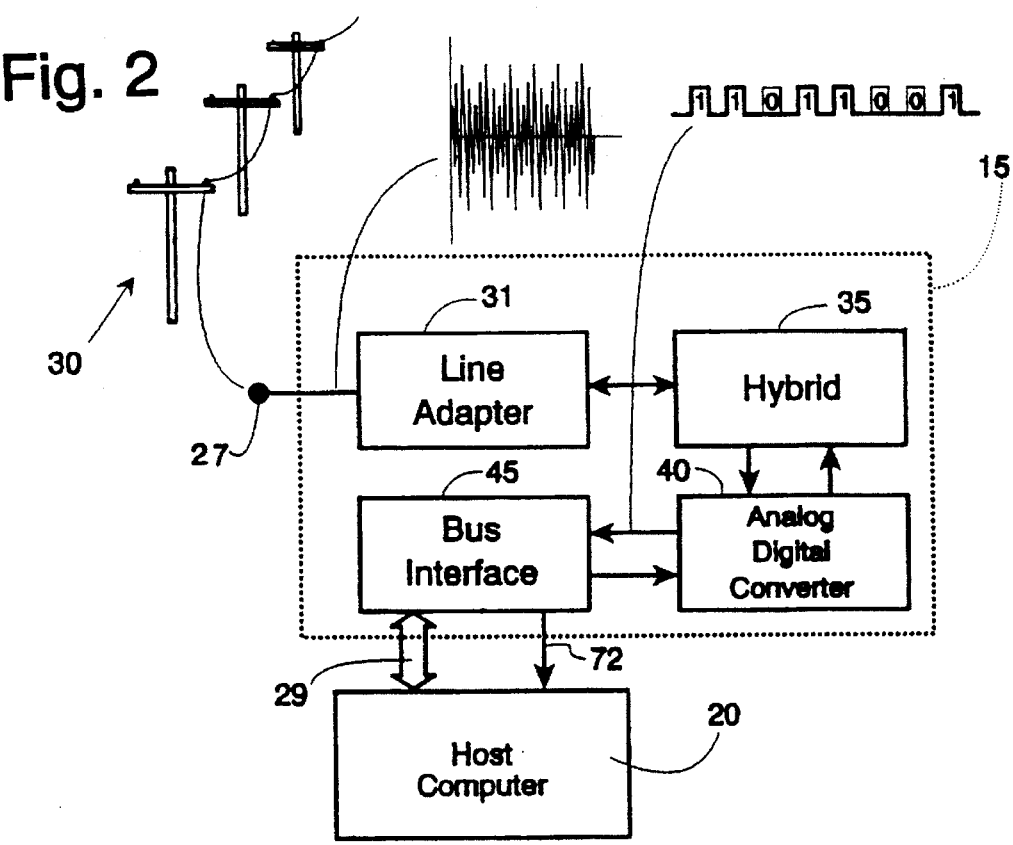
FIG. 2 is a block diagram of the major components of the interface card.

As seen in both FIGS. 1 and 2, the auxiliary or expansion card 15 is provided with a standard telephone jack 27 through which a connection is made to a conventional voice-grade analog communications link, also referred to as a telephone link or telephone line 30, which may be connected, in turn, to a remote device 18, such as a remote modem or a facsimile tansmission device, with which the host computer 20 communicates. The major components included on the interface card 15 are seen FIG. 2. The card 15 takes the form of a standard "half-size adapter card" which plugs into an available expansion slot 17 on the host computer 20 to connect to the host computer's internal bus 28. Detailed information on the structure and operation of the interface bus 28, as well as other aspects of the personal computer system 20, may be found in the applicable *IBM Technical Reference Manual*, IBM Corporation, Boca Raton, Fla. 33432. Details concerning the Intel family of microprocessors and their companion DMA controllers appears in the *Intel Microprocessor and Peripheral Handbook* (1990), Intel Corporation, Santa Clara, Calif.

The interface card sends and receives analog signals over a voice-grade analog telephone line which is connected at the terminal 27. Two standard RJ11 telephone Jacks (not show) may be used to provide convenient external connections to standard telephone equipment, one jack accepting a plug from the telephone line and the second a plug from a telephone station set which may share use of the line.

As seen in FIG. 2, the interface card includes a line adaptor circuit 31 which interconnects the telephone terminal 27 with a hybrid circuit 35 which splits the analog voice-band signal into inbound and outbound components which are respectively sent to and received from the analog ports of an analog/digital converter 40 (also called the "AIC" or "analog interface chip"). Converter 40 samples received voice-band signals, encodes the sample amplitudes into digitally-expressed values, and sends these values via bus interface circuitry seen at 45 in FIG. 2 to the host computer 20. As described in more detail below, the conventional processor within the host computer 20 processes incoming digitally-expressed sample values to perform one of a variety of functions, depending on the nature of the incoming signal.

Outbound communications originate within the host computer 20 which processes the information to be sent to create a sequence of digitally-expressed sample amplitude values which are sent via the interface circuitry to the converter 40 which transforms the digital sample values into the corresponding voice band analog signal which is applied via the hybrid circuit 35 and the line adapter 31 to the telephone line connected to terminal 27.

SIGNAL RECEPTION

Figure 3:
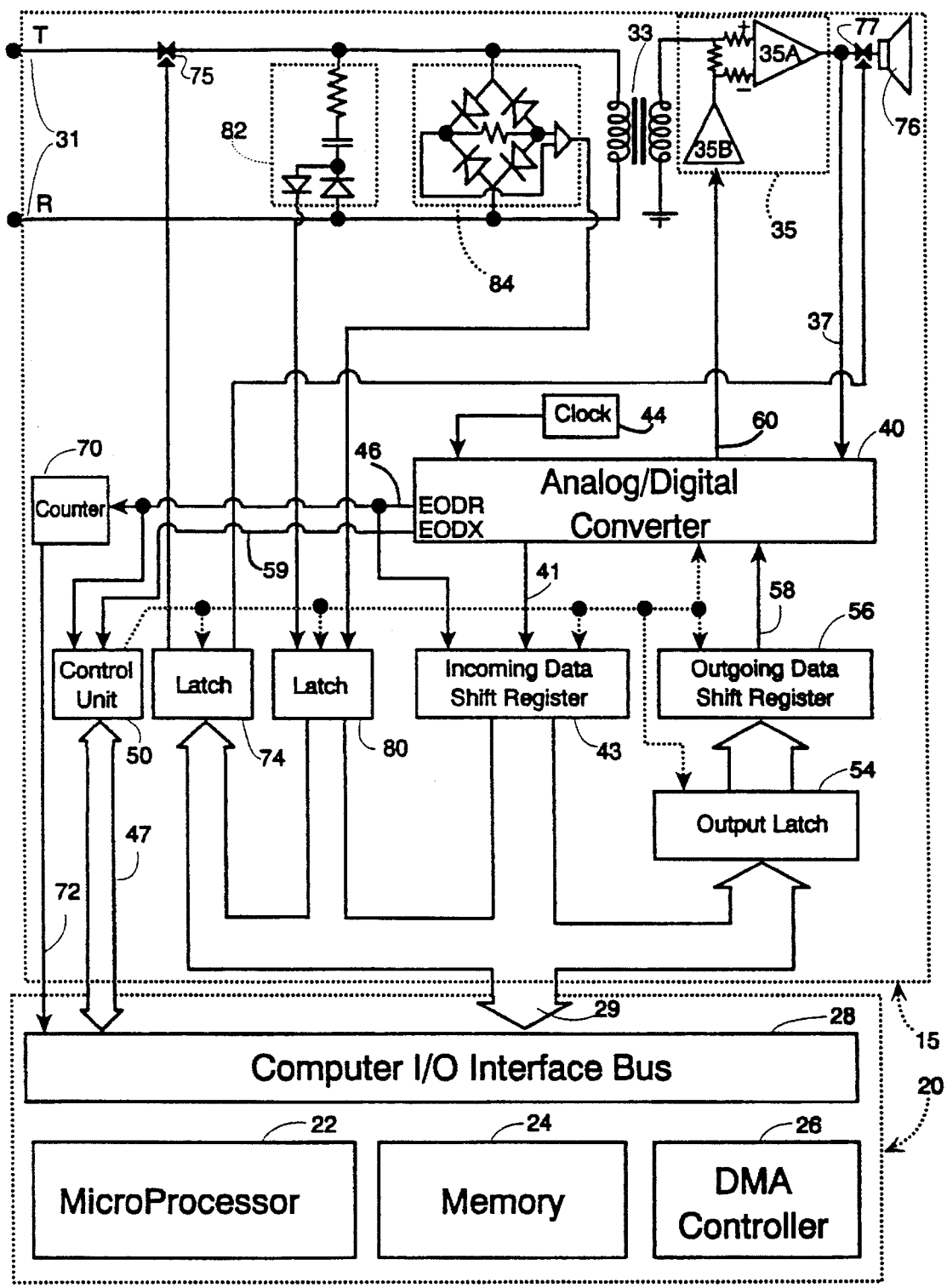
FIG. 3 is a detailed block diagram of the interface card.

The processing of the incoming voice-grade signal in the interface card is shown in more detail in FIG. 3. The incoming voice-band signal arriving at line adapter terminals 31 seen in FIG. 3 may be a conventional telephone voice signal, a modulated-tone data signal from a modem, a facsimile signal, or some other signal capable of being transmitted over conventional telephone links. See also FIG. 1. Regardless of their content, incoming and outgoing signals are processed in the same way by the interface card 15.

Arriving signals from the telephone link are applied directly via a transformer 33 to the input of an amplifier 35A within a hybrid network 35. The signal appearing at the output of amplifier 35A is applied to the analog input terminal 37 of a two-way analog/digital converter 40. The hybrid network 35 is of conventional design and includes a transmit amplifier 35B which is interconnected with the input to amplifier 35A by means of a resistive network which is arranged such that the transmitted signal from amplifier 35B is greatly reduced in magnitude at the output of the receiving amplifier 35A.

The converter 40 preferably takes the form of a single integrated circuit device comprising a Model TLC32044 voice band analog interface unit manufactured by Texas Instruments, Dallas, Tex. Detailed information on the structure and operation of the TLC32044 is contained in Data Sheet D3098 (1988) available from Texas Instruments. The TLC32044 integrates an input analog bandpass filter, an analog-to-digital converter including a sample-and-hold circuit and a successive-approximation encoder which converts the input analog signal on line 37 into a 14-bit resolution digital signal. For processing outbound signals, the TLC32044 includes a 14-bit resolution digital-to-analog converter and a low-pass output reconstruction filter.

The incoming analog signal is applied via line 37 seen in FIG. 3 to the converter 40 and the resulting digitally-expressed sample values are delivered via a bit-serial line 41 into an incoming-data shift register 43. When the converter 40 completes the encoding of a sample of the incoming telephone signal, the shift register 43 holds a 16-bit binary word whose 14 most significant bits specify the amplitude of a sample. The value accumulated in shift register 43 is then transmitted via a data bus 29 to the data port pins of the computer's interface bus 28 during a DMA memory transfer operation as next described.

The analog/digital converter 40 is timed by a clock signal from a clock generator 44 seen in FIG. 3. When the converter has delivered the last (least significant) bit via its bit-serial output 41, an EODR (end of data received) output 46 from converter 40 activated to inform a control unit 50 that the data in the incoming shift register 43 is ready for transmission. Control unit 50 then issues a direct memory access request signal which is transmitted to the interface bus 28 via a control line in the group of control lines depicted in FIG. 1 at 47.

The interface card 15 preferably makes use of two separate DMA channels which are available in IBM-compatible Personal Computers for use by external devices. The receive channel, which moves incoming information via the shift register 43, is activated by a request to DMA channel 6 (DREQ6 at pin D13 on the standard IBM system bus 28). The DMA controller 26 within the personal computer 20 responds with a DMA acknowledge signal which is returned to the control unit 50 via one of the control lines 47 (connected to receive the signal DACK6 at pin D12 on the system bus 28). The control unit 50 responds to the DMA acknowledgement by gating the information from shift register 43 to the computer interface bus 28 via the data bus lines 29.

SIGNAL TRANSMISSION

The analog output signal to be transmitted over the phone line is generated by the analog/digital converter 40 which receives digital words, each comprising a 14-bit sample amplitude value and two control bits, from the I/O interface bus 28 via the bus lines 29, an output latch register 54, and an outgoing-data shift register 56. The latch register 54 holds one digital sample while the sample previously received from the bus 28 is being sent, one bit at a time, from the shift register 56 to the analog/digital converter 40 via the bit-serial line 58.

The transfer of information between the bus 28 and the output latch register 54 is also accomplished by means of a DMA transfer. In this case, when the analog/digital converter completes the conversion of a word from the shift register 56, it issues an EODX (end of data transmit) signal on line 59 to the control unit 50 which in turn issues a transfer request to DMA channel 5 by activating one of the lines in the control bus 47 (signal DREQ5 applied to pin D11 of the interface slot to bus 28). The DMA controller 26 acknowledges that it is ready to handle the request by activating another of the control lines 47 (signal DACK5 at pin D10 of the interface slot). The control unit responds by transferring the contents of output latch 54 into shift register 56, and by enabling the output latch 54 to receive the data from interface bus 28 via the data bus 29.

The bit-serial data applied to converter 40 via line 58 is converted into an analog signal appearing at analog output 60 of the converter 40. The analog output signal on line 60 is then transmitted by the hybrid amplifier 35B and the transformer 33 to the tip and ring terminal 31 of the connected telephone line.

SUPERVISORY CONTROL

The microprocessor 22 within the personal computer 20 is directly connected via the interface bus 28 to the interface card 15 and provides general supervisory control over its operation. To accomplish this, the EODR signal on output 46 (one of which appears each time the translation of an incoming analog sample is completed) is applied to increment a 4-stage counter 70 which issues an output interrupt signal on line 72 for each group of 16 incoming words. The interrupt signal on line 72 is applied to a selected one of the available interrupt request lines on the interface bus 28 (the particular line IRQ3 to IRQ7 at interface slot pins B21–B25 may be jumper-selected at the time of installation to avoid conflicts with other peripherals issuing interrupts).

When data is being sent or received over the telephone line 30, control of the execution of microprocessor 22 is passed to an interrupt handling routine resident in the memory 24. This single routine, the details of which are set forth in the accompanying assembly language listing for the INTS module, calls routines for handling both transmission and reception in accordance with the currently selected mode of operation. These interrupt handling routines process incoming data words from incoming data shift register 43 as those incoming words are assembled in a RAM storage area by the DMA transfer mechanism described above. Secondly, the interrupt handling routines process outgoing information, assemble the outgoing data words indicative of analog sample amplitudes in a RAM storage area pending the DMA transfers to the output latch 54. Note that the single interrupt from line 72, issued on every 16th received word, triggers the handling of the received data being accumulated in the DMA buffer as well as the assembly, in the transmit DMA buffer, of the outgoing data to be converted into analog sample values.

In addition, the microprocessor has access at any time to information about the status of the telephone line, and may send control commands to the control unit 50 to control that unit's operation. The control lines 47 which exchange control information between the control unit 50 and the interface bus 28 include address lines (at interface slot pins A22–A29 to bus 28) which must contain a particular pattern of bits (in the range 35C to 35F, hexadecimal) designating information to or from the interface unit. When the appropriate address is detected, data from the interface port is placed in the board control latch register 74 to control the line. One bit position of latch 74 may be advantageously used to control an electronic off-hook switch seen at 75 in FIG. 3 (which is closed or placed "off hook" to connect the interface unit to the telephone line). A second bit position in the control latch register 74 may be used to connect a speaker 76 to the output of the amplifier 35A by activating a switch 77. A third bit position may be used to reset the AIC 40.

Correspondingly, a sense latch register 80 includes bit positions which are set by the status of the telephone line. A first bit is set whenever a ringing signal detector 82 connected across the telephone line terminals 31 detects the presence of ringing signals of a predetermined amplitude. A loop current signal detector seen at 84 sets a second bit whenever loop current exceeding a predetermined value is present, indicating an active connection to another system. These status signals may be obtained at any time by a programmed inquiry which places the appropriate I/O address on the address leads within control bus 47.

PROGRAMMING OVERVIEW

In the preferred embodiment of the invention, all digital processing of the digitally-expressed analog sample values which are supplied by and delivered to the interface card 15 are processed by the microprocessor in the host computer. Similarly, the digital information which specifies the telephone line status, as well as control information which takes the telephone line on and off hook, is handled by the host microprocessor. As a consequence, substantially any communication and communication control function using a voice-band channel may be implemented with the hardware disclosed above (and nothing more) by providing appropriate programming for the host computer 20.

Figure 4:
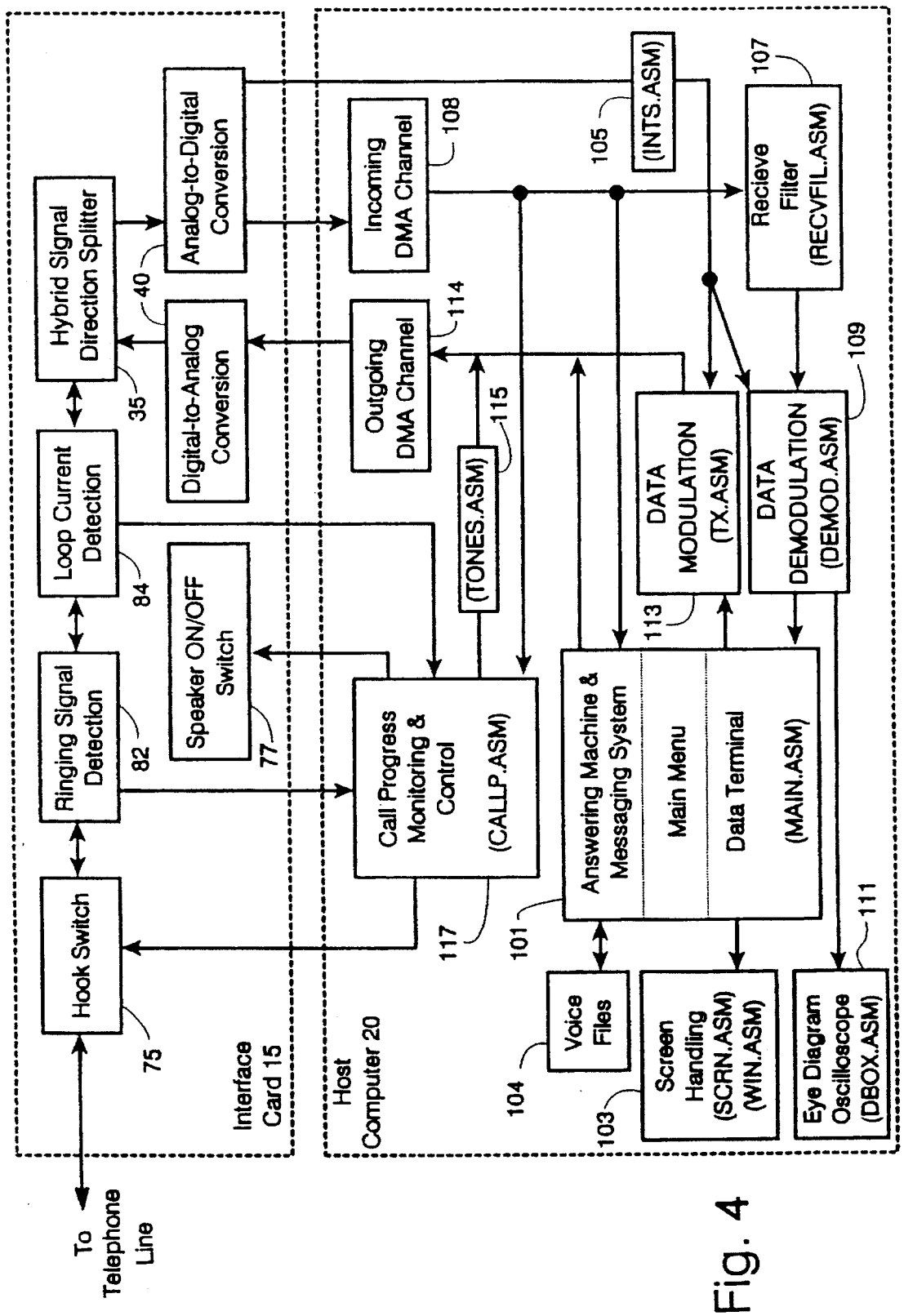
FIG. 4 is a functional block diagram illustrating the interaction of the major functions implemented by the host processor under program control.

The program listing presented at the conclusion of this specification provides numerous functions which allow the combination of the host computer and the interface card to support a rich assortment of voice and data communications applications. The listed source programs are written in conventional assembly language and may be assembled, linked and executed on any IBM-compatible Personal Computer which has sufficient operating speed and which is equipped with the expansion card described above. The assembly language which defines the program and data structures needed to implement the illustrative embodiment is divided into 12 separately listed modules which are summarized below and depicted in FIG. 4 of the drawings:

MAIN.ASM The MAIN.ASM module seen at 101 in FIG. 4 initializes the interface card hardware and the screen, transmit and receive buffers in the host computer's RAM memory. It displays the main menu by calling the screen handling routines in SCRN.ASM and WIN.ASM as seen at 103 and decodes any user keystrokes which control the system's operation. In addition, it provides routines capable of answering the phone, recording and playing back voice messages to and from standard DOS disk files as indicated at 104, as well as routines that manage the system when it is operating as a data terminal when keystroke data are directly transmitted and received (via modem processing) over the telephone link.

INTS.ASM This module indicated at 105 handles the interrupts generated by the interface card each time 16 incoming digital samples have been accumulated in the host computers RAM memory by prior DMA transfers as determined by the counter 70 seen in FIG. 3. The interrupt handler calls routines for handling data transmission and reception. In addition, INT.ASM responds to telephone ringing signals generated by detector 82 and line current indications from loop current detector 84 on the interface card 15 as seen in FIGS. 3 and 4.

RECVFIL.ASM This module, seen at 107 in FIG. 4, contains the filtering routines used to pre-process the incoming analog signal samples which are received via the incoming DMA channel seen at 108 in FIG. 4. When the system is operating as a 1200/2400 baud modem, the RECVFIL.ASM routines 107 process the accumulated digitally expressed sample values from the interface card and performs band-splitting and phase-splitting digital filtering to create filtered samples for demodulation, as well as automatic gain control and baud rate synchronization.

DEMOD.ASM This module, shown at 109 in FIG. 4, demodulates the filtered sample value from RECVFIL.ASM into data.

DBOX.ASM The DBOX.ASM module at 111 provides routines which allow the host computer's screen to provide an oscilloscope-like eye-diagram display useful for monitoring the performance of the system during modem data reception.

TX.ASM This module, seen at 113, modulates digital data to be transmitted into sample amplitudes which are placed into the transmit buffer from which they are moved via the outgoing DMA channel seen at 114 to the interface card for digital-to-analog conversion into a voice-band analog modem output signal which is transmitted over the phone line. TX.ASM also provides digital filtering to confine the transmitted analog signal to its assigned passband.

TONES.ASM This module, indicated at 115, generates touch-tones and answer tones used by the system to perform conventional dial-up telephone signalling.

CALLP.ASM The call progress monitoring and control module seen at 117 provides supervisory control of the telephone link. It performs band-pass filtering of the receive samples from the interface card in order to detect ringing signals, answer tones, and touch-tone signals, and uses the tone generating routines in TONES.ASM at 115 to produce comparable outgoing tones.

WIN.ASM This module, indicated at 103 along with SCRN.ASM, manages the pop-up windows which appear on the host computer's screen as part of the user interface. This module employs pre-generated character definitions which are specified in the separately listed include file SFT_WINS.INC.

SCRN.ASM This module provides screen management routines used when the system is operating in terminal mode.

EQUATES This module defines commonly used numbers and keycodes referred to in the other modules.

The MAIN.ASM module initializes the system and provides the primary user interface. In the discussion of MAIN.ASM and the other modules which follows, unless otherwise noted, the routines being discussed will be identified by their labels and may be found within the listing for the particular module being described.

When the system's started (typically by the entry of the program's name at the operating system's standard command prompt), it is loaded for execution from disk, and execution begins at the label SOFT_MODEM. The amount of memory allocated to the program is reduced to the size of the program plus the size of the stack, and the routine ALLOCATE_BUFFERS is used to create 8k (16-bit word) memory buffers for the both the transmitted and received sample amplitude values. The video display is then initialized and the routines INIT_AIC and INIT_DMA are called to initialize the TLC32044 analog interface circuit 40 on the interface card 15, and to initialize both the transmit and receive DMA channels. A call is then made to the routine WEDGE_INT (listed in INT.ASM) which hooks into the COM2 interrupt (reconfigurable as COM1 through COM4).

A check is then made to determine if the user supplied the name of a voice-recording file to be played back along with the program name when the program was called at the DOS command line. If so, the routine PLAYBACK_MSG (to be discussed) is called immediately, with control thereafter being passed to MAIN_EXIT to terminate the program. In this way, the program can be loaded to play back a recorded voice message without invoking any other functions.

If no recorded message file was specified, ON_HOOK and SPEAKER_OFF are called to insure that hook switch 75 and speaker switch 77 on interface card 15 are both open, and the routine MAIN_SCREEN is begun. The routine INIT_SCREEN (in WIN.ASM) clears the screen and pops up a window for the main menu. The routine at GET_KEY monitors keyboard input and incoming ringing signals.

If ringing signals are detected, the routine ANSWERING_MACHINE is called to take the telephone line off-hook and then call the routine PLAYBACK_MSG to play back a pre-recorded voice message. The routine PLAYBACK_MSG moves the contents of a disk file, which is a sequential file of digitally-expressed voice sample amplitudes, into the transmit buffer, with each transfer being followed by a call to TX_DMA_ON which enables a DMA transfer of the transmit buffer's contents for digital-to-analog conversion by the interface card 15. To conserve disk space, the file of digitally-expressed voice samples may be compressed prior to storage and decompressed prior to playback. After the recorded voice message is played for the caller, SEND_TONES (in TONES.ASM) sends a prompting tone to advise the caller that recording is starting.

The ANSWERING_MACHINE routine then calls RECORD_MSG to record the incoming message. A DOS file is opened to record the message, the routine INIT_AIC is called to ready the analog interface circuit 40 to receive at 9600 samples/second, and the incoming samples from the interface board are moved by DMA transfer to the receive buffer from which they are recorded on disk, in 4 kilobyte blocks, in a standard DOS file.

MAIN MENU FUNCTIONS

The routine in MAIN.ASM beginning at MENU_COMMAND processes user keystrokes to invoke functions selected by the user from the following available options which demonstrate the system's capabilities:

| KEY | OPERATION |
|---|---|
| F1 | Go to data mode by calling ORIGINATE_MODE_INIT followed by COMM_MODE, which takes keystrokes entered by the user and sends them to the transmitter (to be discussed), and looks for characters from the receiver and puts them on the screen. When operating in terminal mode, the user can press the F2 key to enter the display box mode by calling INIT_DBOX (in DBOX.ASM) in which case the received characters are buffered and keystrokes are processed through the display box menu. |
| F2 | Record voice off the telephone line by calling RECORD_MSG discussed above. |
| F3 | Play back a recorded voice message by calling PLAYBACK_MSG discussed above. |
| F4 | Send an answer tone over the phone line by calling SEND_TONES (listed in TONES.ASM) as discussed above. |
| F5 | Perform ORIGINATE_MODE by dialing a phone number (using DIAL in TONES.ASM) and, if answered, attempts to establish a modem link (using CALLP_MAIN in CALLP.ASM which initiates the expansion card and enables the receiving DMA transfers) in 1200 baud originate mode (by calling INIT_RECV in DEMOD.ASM), and then calls COMM_MODE to perform communications with the remote modem. |
| F6 | Execute call progress functions by calling CALLP_MAIN (listed in CALLP.ASM). |
| F7 | Execute tone detection by calling TOUCH_TONE_DETECT (listed in CALLP.ASM). |
| F8 | Execute automated voice message handling by calling MESSAGING_SYSTEM. This routine uses DTMF (listed in TONES.ASM) to produce the dual dial tones for each digit to be dialed in a number taken from a list of numbers to be dialed. MESSAGING_SYSTEM plays back a message asking the person who answers the remote phone to press the touchtone "1" key on their stationset, then waits to accept the response, at which time MESSAGING_SYSTEM plays back a prompting message and then records the called party's response using PLAYBACK_MSG and RECORD_MSG, and then terminates the conversation by calling ON_HOOK. |
| Alt-H | Toggle between on/hook and off/hook using CHK_ON_OFF_HOOK. |
| Alt-S | Toggle the speaker between on and off conditions using CHK_SPKR. |
| Alt-P | Change parity by calling NEW_PARITY. |
| Alt-A | Toggle answering machine enabled/disabled states using CHK_ANSWER_MODE. |
| F10 | Exit the program and return control to DOS after calling DISABLE_INT (listed in INTS.ASM) to restore the original COM2 interrupt vector and disabling DMA transmission and reception. |

SCREEN HANDLING ROUTINES

As seen in the listing WIN.ASM, the routine FILL_SCREEN fills the screen with a background color, WINDOW_UP moves a previously stored window image from a screen buffer to the active screen, and WINDOW_FLIP swaps the active screen memory with the contents of a screen buffer.

The screen is initialized for the terminal mode by a call to INIT_COMM_SCREEN (listed in SCRN.ASM) which is called when data mode is entered. This routine paints the screen blue by calling INIT_SCREEN (in WIN.ASM), which in turn calls WINDOW_UP, brings up data mode windows which indicate speed and parity, and then saves the written screen to a screen buffer for later use.

SCREEN_OUT (listed in SCRN.ASM) performs the terminal mode functions. After checking for special characters, received characters are displayed on the screen. Special characters are the line feed, carriage return and backspace characters, which are handled by the appropriate display-point repositioning functions. If the cursor is on the last line of the screen, a line feed or carriage return character causes the screen lines to scroll upwards. The routine PRINT_PARITY listed in SCRN.ASM is called to place the currently active parity and word length indications on the screen.

The display box mode is entered by calling INIT_DBOX listed in DBOX.ASM. INIT_DBOX calls routines which draw an oscilloscope face on the screen along with a menu of display box options (DBOX_MENU) and initializes the video controller to enable modification of all video planes. The display box may have up to eight points on the screen (POINT0–POINT7) each of which is defined by a data structure of type SCOPE_POINT. The routine PLOT_POINT places yellow dots on the screen using the publicly declared horizontal and vertical coordinates X and Y. Each dot displayed consists of three lines of dots. RESTORE_OLD removes the yellow pixels and replaces them with either light gray, dark gray or blue, depending on whether the pixel is positioned on the blue background of a reference line. DO_COLOR reads the old point out of the data structure and is called three times, once for each color. SAVE_COLOR saves the bits is also performed once for each color and saves the bits where the new dots will go. GET_COLOR reads the video RAM and checks for an intersection between a new oscilloscope dot and the desired color. The eye diagram of the incoming signal is produced by the demodulation routine DEMOD in DEMOD.ASM which, at the label DISPLAY_BOX, sets the variables X and Y and calls PLOT_POINT.

CALL PROGRESS MONITORING

The routines for monitoring and controlling the telephone circuit connected to the interface card 15 are listed in CALLP.ASM which begins by defining various coefficients and delay line values used by the call progress filters.

The routine CALLP_FILTERS executes a filtering algorithm for each input sample value in the received sample buffer, and calculates a mean square output level value for each filter. As indicated by the comment lines in the assembly language listing, the DC component is first removed from the sample value, and the input sample is then processed by the ANSWER_TONE_FILTER routine, at the end of which a check is made to determine if the system is currently waiting for the answer tone to end (which occurs during the originate mode training sequence to be described). The voice filtering algorithm may then performed to obtain a means square voice level indication (in the CALLP.ASM listing, the voice filter algorithm has been commented out to reduce runtime, but is retained here for illustration). Next, the call progress filtering routine is performed to detect dial tones, busy tones, and ringing signals. The mean square level (power level) output from each filter is transferred into a holding location for CALLP_MAIN to test later whenever SAMPLE_COUNT is decremented to zero.

The DTMF_FILTERS algorithm performs basically the same function as the call progress filters described above, except that the dual tones are written. In this illustrative embodiment, a filter for the touch-tones for "1" only are present, and the detection of a received "1" tone is used in the example voice message handling system implemented by the routine MESSAGING_SYSTEM (in MAIN.ASM) described above. The routine GET_TOUCH_TONE detects the "1" touch tone and waits for it to terminate.

The call progress system is initialized by CALLP_INIT which initializes the analog interface circuit 40 and the input counters. The mean square outputs are inspected every 256 sample times (35.5 millisecond intervals) to simplify division of the mean square values.

CALLP_MAIN performs the DMA initialization and waits for 256 samples to be received and the filter outputs to be computed. It then tests the mean square values to determine if an answer tone has a sufficient magnitude (at least 4000H and also greater than ¼ of the total energy on the line), and that such a tone has been present for a predetermined duration. CALLP_MAIN also calls PRINT_CALLP which displays the mean square filter output levels (useful for testing and debugging). The routines TOUCH_TONE_DETECT and PRINT_DTMF are similarly available to indicate the receive levels coming through the DTMF filters for testing purposes.

The routine GET_END_ATONE is called after a valid answer tone has been detected. It resets the call progress counters to 4.44 milliseconds in order to detect the end of an answer tone more quickly. This routine also enables the transmitter DMA to start the 1200 bps transmitter as part of the training sequence leading to 2400 baud transmission. The routine then waits for the remote location to terminate the answer tone, which triggers the beginning of the 1200 bps receiver function. As soon as the end of the answer tone is detected, the AIC is set to receive at 9600 samples per second.

RECEIVER FILTERING, AGC AND INTERPOLATION

The digitally expressed incoming analog sample amplitudes are processed by the microprocessor 22 in the host computer system 20 to filter the desired received signals from other signals outside its passband, to split the incoming signal into its two phase-shifted quadrature components, to regulate the signal level of the incoming signal by means of automatic gain control processing, and to compensate for variations in the baud rate of the incoming data by an interpolation procedure. All of these steps, which occur prior to demodulation, are handled by the module listed in RECVFIL.ASM.

Filtering consists of running the samples through either a high or low bandpass filter to reject the modem's local transmitter. Phase splitting reduces the samples to two sets of complex numbers (real and imaginary) for each baud time of samples (the baud rate being 600 per second), resulting in 1200 complex numbers per second.

The phase splitting occurs at FILTER_PQ in RECVFIL.ASM. FILTER_PQ is a two stage filter specifically designed to reduce the number of multiplication's and thus reduce execution time. Because of the computational burden placed on the host computer's processor when filtering and demodulating the incoming analog samples, it is essential that efficient algorithms be employed if processors which are in widespread use are to be capable of handling the high baud rates employed by conventional modems now in use. The efficiency of the FILTER_PQ routine, when combined with the efficient demodulation scheme to be described, has been shown to be capable of receiving and demodulating a conventional V.22bis, 2400 baud modem transmissions when executed by a conventional IBM-AT class Personal Computer employing an Intel 80286 microprocessor operating at 12 Mhz.

As can be seen at the label FILTER_LOOP, the Cosine and Sine variables are either zero or plus or minus ¼. These values reduce the number of multiplication's and improve operation speed. LOW_STAGE1 and HI_STAGE1 do the pass-band to base-band conversion (4800 and 9600 sample rate conversion down to 2400 samples per second). LOW_STAGE1 performs the front end filtering of the receive low band samples. 4800 samples per second are reduced to 2400 by reading in a single sample and skipping the second because the second Cosine is zero for a total of two samples per loop. HI_STAGE1 reads in the 9600 samples a total of two times, skipping every other one (4 samples per loop) thus reducing the number of samples to 2400. Next the output of the first stage is sent through STAGE2 to be filtered.

At REAL_DONE, the output value of this routine is divided by 128 or 16 depending on the AGC reaction speed (AGC computed over 16 or 128 samples) and then the absolute value is added to the AGC sum. Each output is then AGCed to bring it up to the correct level.

The same samples are then processed in the same way by the imaginary filter, DO IMAGINARY. At IMAG_DONE, the imaginary number is added to the AGC sum variable and the multiplication is performed to yield the automatic gain controlled output value. At this point, one quarter baud times worth of samples (one 2400th of a second) have been computed, and the process proceeds by reducing the sample rate to 1200 through the interpolator. Because two or four samples per loop are being handled, the routine is optimized to reduce the number of delay line shifts needed.

The INTERPOLATOR_ROUTINES perform the baud loop timing for the modem by computing one set of real and imaginary numbers for each two sets of input samples. The routine also looks for differences in timing between the input sample rate and the remote transmitter's sample rate. If the remote transmitter's crystal frequency is a littler faster than the sampling rate established by the analog interface circuit 40 so that, for example, the remote transmitter is sending 1201 real and imaginary pairs per second instead of the standard 1200, the INTERPOLATOR_ROUTINES will generate an additional pair of samples every second. Conversely, one fewer pair will be generated if the remote end is operating at a slower rate than expected. This allows the disclosed arrangement to lock onto the remote end's transmitted baud rate without having to adjust the rate at which samples are delivered via the fixed-rate DMA transfers required by the host computer system.

INTERPOLATOR_ROUTINES is called by a pointer named BAUDLP_VECTOR immediately after the label ADD_IMAGINARY in RECVFIL.ASM. This routine alternates between buffering the first set of samples and secondly, computing the 1200 rate real and imaginary inputs required by the receiver. Inside SAVE_S1 there is a counter called QUAD_COUNT which, when decremented to zero, indicates that it is time to compute new interpolator coefficients by a jump to NEW_COEFF. This routine looks at the BAUD_X variable in DEMOD.ASM for an underflow or an overflow. These conditions indicate it may be time to compute and extra set of real and imaginary numbers or to skip the next pair. The final sets of real and imaginary numbers (Ps and Qs) are stored in buffers called REAL_BUFFER and IMAG_BUFFER. Because the FILTER_PQ routine can return back with anywhere from 1 to 3 sets of Ps and Qs, those sets are buffered so that DEMOD can handle the under flow/overflow.

When INTERPOLATOR_ROUTINES is finished, control is returned to FILTER_PQ which then loops three more times, followed by a check to determine if the end of the receive sample buffer has been reached, and if the filter delay lines are full. If so, the delay line variables are copied from the end of the buffer to the beginning, the pointers are reset, and the routine is exited. By using long buffers for the delay lines, it is unnecessary to constantly shift these numbers within the delay lines, thus saving execution time.

DEMODULATION

When filtering and interpolation are completed, control is returned to label EQUALIZER_BUF_CHECK in DEMOD (listed in DEMOD.ASM). A check is performed to determine if there are two sets of Ps and Qs in the buffers. If present, they are copied to equalizer input buffers named EQR_DELAY and EQI_DELAY. At this time, the BAUD_SUM variable is set for use by the baud loop routine used for interpolation. BAUD_SUM is set by adding the absolute values of the first set of Ps and Qs and subtracting the second set.

The next routine provides automatic gained controlled amplification (AGC). The first thing done is a check of the baud counter to see if four or thirty-two baud times have passed (corresponding to the 16 or 128 divisor used to calculate the AGC average in FILTER_PQ as discussed above). If appropriate, a check is then to determine if the flag that indicates a valid energy level on the phone line has been set. If not, at ENERGY_CHECK, the current energy level (AGC_AVERAGE) is inspected to see if it is above the minimum level (−43 dBm) indicated by ENERGY_THRESHOLD. If there is still no energy, Jump (via NO_ENERGY) to EQUALIZER_FULL_CHECK at the end of DEMOD which insures that the equalizer delay lines do not overflow.

If there is energy for the first time, calculate a new AGC multiplier (at NEW_LEVEL) and start up the receiver. This routine is needed when the user has entered F1 from the initial command buffer (direct to data mode) in order not to run the adaptive equalizer with no input signal. If energy has already been detected and the correct number of baud times has been reached, control is passed to AGC_TESTS.

Before the AGC tests are performed, a routine labeled CHECK_ALPHA slows down the equalizer gain term after 256 baud times. The variable ALPHA is high during training so as to bring the receiver up more quickly. After 256 baud times, ALPHA is reduced to increase performance and reduce variability.

If the AGC is in wide band mode (fast reacting), control then passes to WIDEBAND_AGC; otherwise, a check is made to see if the new AGC_AVERAGE is either one-half the level or greater than 1.5 times the last AGC_AVERAGE. If it is, control is passed to NEW_LEVEL to compute an AGC multiplier just on that new value. This lets the receiver act quickly to gain hits on the phone line. If neither of these tests pass, the routine adds ⅛th of the new to ⅞ths of the old level, and computes a new multiplier from the sum. In this way the AGC reacts smoothly and does not vary quickly, which improves performance on a line with little signal level variations.

COMPUTE_AGC takes the new AGC_AVERAGE and computes AGC_XSUBE and AGC_MANT, two variables which are used to adjust any receive signal level the optimal level needed by the receiver. Also, the AGC is changed from wide-band to narrow mode after the first 32 baud times (as seen immediately before the label DISPLAY_BOX in the AGC routine).

DISPLAY BOX checks the RECV_FLAGS register to see if the user is in the display box view mode. If so, the current display box variable is gathered by calling the routine pointed to by DBOX ROUTINE and then the appropriate point is plotted on the oscilloscope screen as noted earlier. The next routine updates the baud loop variables used by the interpolator routine in FILTER_PQ. The baud loop is controlled by two different loops. A first order baud loop does fine tuning and a second order loop makes coarse adjustments to get the baud loop close to the optimal timing. Every eight baud times the sign of BAUD_SUM is checked. Depending on the sign, a decimal 160 is added or subtracted from BAUD_X. Also, BAUD_SUM is divided by 128 and added to LOOP_INT2, the second order baud loop integrator. LOOP_INT2 is then checked to make sure it stays within the bounds of F200 to 0EFF, hexadecimal. This puts a maximum limit on how much the baud loop can correct for timing differences between itself and the remote modem. At BAUD_LOOP2, a counter called LOOP2_CNT is decremented. When it reaches zero, the sign of LOOP_INT2 is checked and 160 is added or subtracted from BAUD_X. At label GET_NEW-COUNT, LOOP2_CNT is reloaded from the table BAUD_LOOP2_TABLE (defined at the beginning of the DEMOD.ASM listing immediately before the code). The value loaded from BAUD_LOOP2_TABLE is determined by an offset into the table which comes from the high order eight bits of LOOP2_INT. As LOOP2_INT grows to bigger levels, LOOP2_CNT is reloaded with a smaller and smaller count, causing the second order baud loop to make more frequent adjustments to BAUD_X. BAUD_X is then used by the interpolator to know when to skip or add an extra set of Ps and Qs to the equalizer delay line.

The routine EQUALIZER_OUTPUT generates the actual receive data point from the incoming Ps and Qs. The algorithm performs a complex number multiplication between the complex numbers in the equalizer delay line and the complex taps. Each of the last 7 baud times (14 taps) of Ps and Qs are multiplied with their respective taps and the results are summed. What results is the complex number RZN+j IZN, which is the data point.

In the following routine, PHASE_ROTATION, the equalizer output is rotated into the correct quadrant by the Cosine and Sine of the phase angle PHI. This is done through the multiplication of RZN+j IZN by negative COSINE+J SINE. The resulting point is RYM+j IYM.

The next routine performs the calculations to determine which point in the signal constellation RYM+j IYM is closest to. Once this is determined, the data pattern associated with this point is known and the demodulation of the analog signal is complete. Also, the nearest perfect point is saved into DEC_R+J DEC_I and an error vector from this point to the point we demodulated is generated and stored into R_ERROR+J I_ERROR. There are separate routines 1200 and 2400 baud because the signal constellations are different.

For 1200 baud, because there is only four possible points, the process is as simple as comparing the signs of both RYM and IYM to determine which of the quadrants the point resides in. At label DECISION_1200, the sign of RYM is tested. If it is positive, the absolute decision point, 49 * 256, is placed in DEC_R, and this value is subtracted from RYM to get the error vector, R_ERROR. Also, the offset into DECISION_TABLE, where the actual data sent from the other end is decoded, is placed into the BL register. This process is repeated for IYM to yield DEC_I and I_ERROR. At the label READ_DECISION, the receive data is read out of DECISION_TABLE and placed into RECV_DATA.

The process for decoding data at 2400 bits per second is a little different in that there are sixteen possible decision points. Consequently, the routine inspects the sign of RYM and j IYM, as well as their magnitudes. Once the error vectors and decision points are determined, the code branches to READ_DECISION and the receive data is read out of DECISION_TABLE as in the 1200 case above.

The next step is to update the taps with the counter-rotated error vector. By doing this, the taps learn what types of errors are being generated by the phone line and they move in a direction that can correct for these errors. The counter-rotated error vector is scaled down by ALPHA so that the taps cannot be significantly changed by any one baud time error. The counter rotation is done my multiplying R_ERROR+J I_ERROR by COSINE−j SINE, and then again multiplied by ALPHA. The results are placed in AREN+j AIEN.

The routine DO_TAP_UPDATE multiplies all fourteen of the taps (RW+j IW) by (AREN+J AIEN). Before this, however, the taps are all "bled" a little to keep them from becoming too big. This is done by repeating the macro BLEED_TAP (defined at the beginning of the DEMOD.ASM listing) 28 times, each time adding four to a negative tap or subtracting four from a positive tap, thus pulling all taps toward zero. BLEED_TAP is performed for both the real and imaginary parts of all taps.

Next, the phase loop is updated so that it can recalculate COSINE and SINE for the next baud time. To do this, the output of the equalizer RYM+j IYM must be multiplied by the negative of the decision point DEC R−J DEC I. Only the imaginary vector is needed so RERR need not be recalculated. Thus, IERR=(IYM * DEC R)−(RYM * DEC I). Also, the routine multiplies IERR by two to meet the needed gain for PHASE_UPDATE.

PHASE_UPDATE employs a first and second order phase loop which locks onto the phase roll of the remote transmitter. PHI is the new phase angle determined by the code. The upper eight bits of PHI are then used to access a pre-computed COSINE and SINE from the tables listed in TONES.ASM. This algorithm use of tables indexed by the phase angle PHI substantially improves execution speed by eliminating multiplications.

The S1_DETECT routine functions is a matched filter which detects the presence of the S1 digit sequence defined in the V.22bis CCITT specification. The S1 transmit sequence is used to signal the remote receiver that the other end is a 2400 baud modem, or that the other end wants to initiate a 2400 baud retrain. The S1 sequence is composed of unscrambled 11's then 00's at 1200 baud that create a specific tone on the line. Si_DETECT determines the presence of the tone by looking at the numbers in the real equalizer delay two baud times apart. If the difference in these numbers is above a certain threshold a counter, S1_COUNTER, is incremented. If the difference is below the threshold, the counter is decremented by four. If the counter ever reaches 20, S1 has been detected. The routines starting at DATA_DECODE perform the necessary computations to parse the incoming data stream into ASCII characters.

At 1200 baud, the two received data bits are stored in bits 2 and 3 of RECV_DATA.

At 2400 baud, the incoming data is decoded in accordance with the V.22 and V.22bis specification. bits 0 through 3 are valid data. First, differential decoding is performed by subtracting the previous baud times' bits 2 and 3 from the baud time's data. Next, the Gray decoding process checks bit 3 and, if it is zero, bit 2 is inverted. Descrambling parses four bits at a time so that, at 1200 baud, the first baud times data bits are placed into DATA_1200, the routine waits for the second baud times data, and then combines the two at COMBINE_1200_DATA before descrambling. DESCRAMBLE_4 performs the descrambling routine specified in V.22 and V.22bis.

After the descrambler, the data is now in the same format as sent to the modem by the remote data terminal equipment: asynchronous ASCII data. The routine then searches the incoming data for a start bit, parse the next eight data bits into an ASCII character, and then puts the result into the receive character buffer for the terminal loop to display on the screen.

At RECEIVE_PARSER, a state variable R_PARSE_JMP is tested to see if it's zero and, if it is, the routine jumps to CHECK_FOR_START to look at the four bits out of the descrambler to see if there are any zeros present. If there are, the data is moved into R_PARSE_DATA, and R_PARSE_JMP is set to PARSE_8. The next time into the loop, RECEIVE_PARSER jumps to PARSE_8 where the next four receive bits are combined into R_PARSE_DATA. Four data bits are still needed to complete the ASCII data, so R_PARSE_JMP is set to PARSE_12.

At PARSE_12, enough data has been collected to form the character, so it is now necessary to determine where the character is in the received 12 bits of data. This depends on where the start bit is located. PARSE_12 begins by shifting the received 12 bits right until a zero enters the carry flag. Once a zero is detected, the eight data bits of the receive character are in the AL register, from which they can be stored into RX_CHAR_BUF, and the pointers into R_CHAR_BUF are updated. The bit counters are then checked to see how many of the received 12 bits are left. Depending on where the start bit was located there can be up to three data bits left over. These bits are checked to see if there is another start bit. If there is, the routine recreates R_PARSE_DATA so that it has four valid bits in the low order and resets R_PARSE_JMP to PARSE_8. Code outside the interrupt handling routines checks to see if any characters have been placed in RX_CHAR_BUF and displays them in terminal mode.

The last thing done by the receiver, at EQUALIZER_FULL_CHECK, is to make sure that the equalizer delay line buffers are not full. The previous 6 baud times worth of Ps and Qs must always be available; consequently, when the equalizer is full, the last 12 Ps and Qs are copied to the beginning of the EQR_DELAY and EQI_DELAY. Also, the EQUALIZER_IN pointer is reset to point into location 13.

MODULATION

The transmitter routines listed in TX.ASM are substantially less complex than the demodulation routines because modulation is a determinate process.

The first two routines in TX.ASM, INIT_TX and SETUP_SAMPLE_COUNT, initialize the transmitter variables. INIT_TX resets the pointers into the transmitter sample buffers and calls SETUP_SAMPLE_CNT which tests to see if transmission is to be performed in the low band (8 samples per baud time) or high band (16 samples per). SETUP_SAMPLE_COUNT also sets up the transmit buffer threshold, SAMPLE_COUNT, to either 100 samples for low band or 200 for high band. SAMPLE_COUNT insures that there are always enough samples in the buffer to handle the case where the transmitter routine will not receive control for a prolonged period (which occurs, for example, when interrupts are turned off while the PC is changing video modes). This safeguard adds a 20 ms delay into the transmit path.

TX1224, the code which performs the actual transmission, is reached through the transmit vector, TX_VECTOR, in the interrupt handling routine SOFTMODEM in INTS.ASM which, as described above, receives control each time the interface card 15 generates an interrupt at every 16th receive sample.

The first thing TX1224 does is check the number of samples in the transmit buffer. If the count is less than SAMPLE_COUNT, another baud times worth of samples is processed. DO_TX is the actual start of the transmitter process. Flags are first checked to see if the system is operating in a forced data mode in which all marks (ones) or the dibit pattern S1 is to be sent. If either of these flags is set, control is passed to SEND_MARKS.

At CHECK_TX_DATA, the routine first checks to see data is being parsed. If so, control is passed to the routine pointed to by T_PARSE_JMP. If not, control is passed to CHECK_TX_CHAR where a test is performed to determine if any ASCII characters to be sent are present in TX_CHAR_BUF. If there are none, control is passed to SEND_MARKS. If characters are ready to be sent, they are read from TX_CHAR_BUF, the pointers to that buffer are updated, and a start bit is inserted into the data before it is stored in SEND_DATA. The parser vector, T_PARSE_JMP, is set to PARSE_4_2_DATA.

The PARSE_DATA routines are listed at the end of TX.ASM. PARSE_4_2_DATA sets the parser vector to PARSE_2_DATA, obtains the next four data bits of the ASCII character and returns. PARSE_2_DATA then takes the last data bit of the character, appends on three stop bits, and checks for another character to be sent. If there are no more characters to be sent, the routine resets T_PARSE_JMP to zero and returns. If there is a character to be sent, the routine gets the character and updates the buffer pointers, and then shifts the character left three bit positions such that this new character is given a start bit. The routine then inserts the two remaining bits of the last character and saves it off. Next, the new character is shifted right by four, a stop bit is inserted, and T_PARSE_JMP to set to PARSE4_4_DATA. PARSE_4_4_DATA parses the next four bits of the TX char and sets T_PARSE_JMP to PARSE_4_0 DATA. PARSE 4_0_DATA parses the last three bits of the second data byte plus the stop bit and resets T_PARSE_JMP to zero so that the process is returned to state 0.

As seen in TX.ASM at SCRAMBLER, the data is scrambled using the algorithm specified by the V.22 and V.22bis specification. At CHECK_1200, the low order two bits of the scrambler output are saved for the next baud time.

The next two processes, GRAY_ENCODE and DIFF_ENCODE perform the appropriate Gray and differential coding defined in the V.22 and V.22bis specification.

The next routines process the transmit data into sample amplitude values which are delivered to the interface card 15 for digital-to-analog translation by the AIC 40. For each possible data value there are six sets of samples, and the pointers to these samples are called AN0_PTR, AN1_PTR, AN2_PTR, BN0_PTR, BN1_PTR, and BN2_PTR. AN0_PTR and BN0_PTR are read from a table at an offset location equal to the current transmit data value. The other four pointers are the AN0 and BN0 pointers saved from the last two baud times. Next, the transmit sample is created by adding the three values pointed to by the AN pointers, multiplying them by 1 or −1 depending on which sample is being formed, and putting the result into TEMP_TX_BUF. Next, the three values pointed to by the BN pointers are added together and the sum is either added or subtracted from the corresponding TEMP_TX_BUF value depending on the 1 or −1 multiplier. This process is done for either 8 or 16 samples, depending on whether transmission is to be made in the low or high band respectively. Once the samples are completely formed in TEMP_TX_BUF, they are copied into the transmit sample buffer making sure to take into account the position of the end of the buffer.

When transmitting low band samples during the training sequence, it is necessary to change the receive sample rate from 7200 samples per second (needed for call progress functions) to 9600 samples per second needed by the receiver code. To change the sampling rate, AIC commands are imbedded into the data stream in the routine SEND_AIC_CMDS. This routines takes a transmit sample, ORs it with binary 3 which tells the AIC there is a command following this data sample, and the puts the command into the next location. To change the sample rate, two consecutive commands are sent.

The process differs during high band transmission. Alternating samples are filled with the sum of the AN's and then the sum of the BN's, and the need to send AIC commands does not arise; consequently, there is always room in the sample buffer for a full baud times worth of samples. Once the TX samples have been moved into the TX sample buffer, the HIGH_BAND_FILTER routine shifts the AN and BN delay lines and returns.

The functions provided to the user by the program described are, of course, merely illustrative of the communications functions which can be implemented by suitably programming the host processor to exchange information with the interface card. In addition to the 1200 baud, originate mode modem communications capability implemented as operational code in the program listing which follows, much of the code necessary to implement 2400 baud V.22bis modem communication is also included in the following listing, although a fully operative 2400 baud system has not been completed and hence the 2400 baud routines that are included have not been fully tested. It should also be noted that the disclosed hardware, suitably programmed, can provide a variety of additional functions, such as facsimile and synchronous data transmission, as well as other modem modulation schemes such as the Bell 208 or U.S. Robotics HST asymmetrical transmission modes. Additional routines for performing more elaborate line equalization, echo suppression, adaptive transmission rate adjustment ("fall forward" and "fall back" to adjust to transmission noise conditions), error correction and data compression algorithms can be readily implemented by programming the host processor to manipulate transmitted and received data, either on either a concurrent, real-time basis, or by processing the data before transmission begins or after it concludes.

It should also be noted that, because the telephone interface operates under direct control of the host processor, it is unnecessary to embed control sequences (e.g. AT command code sequences) within the data stream to provide communications control functions. It is accordingly possible to much more rapidly respond to events which occur, either in the host computer, the telephone link, or at the remote data terminal equipment, so that flow control procedures (for example) can be more rapidly, more transparently, and more effectively handled than is currently possible with separate modems which must be controlled by escape signals imbedded in the data stream, typically with mandatory guard times which accompany the unique pattern of characters forming the escape signal.

Most importantly, however, the present invention is implementing virtually any voice or digital communications function which can be accomplished over voice-grade lines without needing different hardware. This versatility is achieved by transferring substantially all of the functionality from the conventional separate communications processor (which is typically programmed with resident firmware and/or employs special purpose analog or digital circuitry for signal processing functions) to the available processor in the host computer, which can be programmed to perform a suite of functions whether presently available or yet to be developed.

It is to be understood that the arrangement which has been described, and which is implemented by the programs listed below, is merely illustrative of one application of the principles of the invention. Numerous modifications may be made by those skilled in the art without departing from the true spirit and scope of the invention.

PROGRAM LISTING

The assembly language listing for the modules discussed above appears below:

```
;%%%%%%%%%%%% COPYRIGHT  1993 U.S.ROBOTICS, INC. %%%%%%%%%%%%%%%
.model small
.286
.stack      200h
;%%%%%%%%%%%%%%%%%%%%%%%%%%%%%%%%%%%%%%%%%%%%%%%%%%%%%
;
;       MAIN (the user interface into the modem)
;
;       Main sets up the DMA channels and initializes the modem
;       interrupts.
;
;%%%%%%%%%%%%%%%%%%%%%%%%%%%%%%%%%%%%%%%%%%%%%%%%%%%%% include     equates public      vid_mode,rx_sample_segment,tx_sample_segment
        public      ds_segment,tx_dma_ala16,rx_dma_ala16
        public      set_aic_bands,init_dma,speaker_on,speaker_off
        public      on_hook,off_hook,tx_dma_off,rx_dma_off
        public      display_segment,attribute,init_aic
        public      init_aic_tx48_rx72,sreg
        public      init_tx_dma,tx_dma_on
        public      rx_dma_on,main_flags extrn init_dbox:near,init_tx:near,init_recv:near
        extrn demod:near,tx1224:near,softmodem:near
        extrn dbox_address:near,init_timer:near
        extrn disable_int:near,wedge_int:near
        extrn nul_routine:near,send_tones:near
        extrn dial:near,init_screen:near,window_flip:near
        extrn ring_detect:near,no_ring_state:near
        extrn save_screen:near,restore_screen:near
        extrn init_comm_screen:near,screen_out:near
        extrn callp_main:near,print_parity:near
        extrn touch_tone_detect:near,dtmf:near,init_callp:near
        extrn get_callp:near,get_touch_tone:near extrn rx_char_in:word,rx_char_out:word
        extrn tx_char_in:word,tx_char_out:word
        extrn rx_char_buf_start:word,rx_char_buf_end:word
        extrn tx_char_buf_start:word,tx_char_buf_end:word
        extrn recv_flags:word,rx_out:word,baud_count:word
        extrn tx_in_ptr:word,tx_flags:word
        extrn recv_vector:word,tx_vector:word
        extrn freq:word,ring_state:word extrn main_menu:byte,start_message:byte,end_message:byte
        extrn int_flags:byte,outgoing_msg:byte,recording_msg:byte buffer_word_size    equ     8192-1
```

```
            stack_length          equ    200h/16
            rx_buf_len    equ     8192 * 2
            tx_buf_len    equ     8192 * 2

5   .data
            main_flags   dw       ?
        ;   main_flags.0          = 1    No recv data
        ;   main_flags.1          = 1    Auto-answer in data mode versus voice mode
10      ;   main_flags.2          = 1    TX DMA on
        ;   main_flags.3          = 1    Ignore Loop Loss
        ;   main_flags.4          = 1    Loop loss status
        ;   main_flags.5          = 1    Annouce rings ;   main_flags.8          = 1    Odd/Mark = 0  Even/Space
15      ;   main_flags.9          = 1    Force parity
        ;   main_flags.10         = 1    Parity ON dbox_ok       db      ?      ; <>0 = graphics adaptor present
            vid_mode      db      ?      ; save the old video state
20          out_latch     db      ?      ; image of output latch
            temp_address_low  dw  ?
            temp_address_high dw  ?
            init_AIC_tx96_rx96    dw     9,9,3,0ff47h,03h,1e3ch,03h,0dh
                                  dw     03h,3872h,0,0,0,0,0,0
25          init_AIC_voice        dw     9,9,3,0ff47h,03h,1c38h,03h,0dh
                                  dw     03h,50a2h,0,0,0,0,0,0    ; RX 7200
            init_AIC_tx48_rx96    dw     9,9,3,0ff47h,03h,383ch,03h,0dh
                                  dw     03h,3c72h,0,0,0,0,0,0
            init_AIC_tx48_rx72    dw     9,9,3,0ff47h,03h,3838h,03h,0dh
30                                dw     03h,3ca2h,0,0,0,0,0,0 init_AIC_tx96_rx48    dw     9,9,3,0ff47h,03h,1e70h,03h,0dh
                                  dw     03h,387ah,0,0,0,0,0,0
            init_AIC_tx48_rx48    dw     9,9,3,0ff47h,03h,3870h,03h,0dh
35                                dw     03h,3c7ah,0,0,0,0,0,0 ds_segment    dw      ?
            psp_segment   dw      ?      ; program segment prefix
        ; Dynamically allocated sample buffers
40          tx_sample_segment dw  ?
            tx_dma_ala16          dw     ?
            tx_dma_page   dw      ?

rx_sample_segment dw  ?
45          rx_dma_ala16          dw     ?
            rx_dma_page   dw      ?

ram_error_msg         db     cr,lf,'Insufficient RAM',cr,lf,'$'
            shrink_error_msg  db  cr,lf,'Error during RAM shrink',cr,lf,'$'
50          display_segment       dw     ?
```

34

```
                attribute           db      ?
        EVEN
                playback_file       db      'msg1.dat',0,0,0,0,0,0,0

; MODEM SPECIFIC REGISTERS
            sreg    dw      1,0,43,13,10,8,2,30,2,17,7,70
    .code
    SOFT_MODEM  PROC    NEAR mov     dx,@data
            mov     ds,dx
            cld
            mov     psp_segment,es
            mov     ds_segment,ds           ; save for further reference ; shrink RAM to the size of the program
            mov     bx,ss               ; find the end of the program
            add     bx,stack_length     ; add length of the stack in paragraphs
            mov     ax,es
            sub     bx,ax               ; subtract start of the program
            inc     bx                  ; add one for good measure
            mov     ah,4ah              ; shrink ram
            int     21h                 ; ES points to PSP
            mov     dx,offset shrink_error_msg
            jc      alloc_error mov     es,ds_segment
            call    allocate_buffers    ; get the two 8K word sample buffers
            jnc     alloc_ok mov     dx,offset ram_error_msg
    alloc_error:
            mov     ah,09h
            int     21h
    exit_jmp:
            jmp     main_exit alloc_ok:
            mov     out_latch,0ffh mov     ah,0fh              ; get the current video mode and save
            int     10h
            mov     vid_mode,al ; presence test for EGA/VGA
            mov     dbox_ok,0
            xor     bx,bx
            mov     ax,1a00h    ; VGA display info
            int     10h
            cmp     al,1ah              ; AL returned as 1ah if supported
```

```
              jne     no_vga
              mov     dbox_ok,0ffh
              jmp     short presence_done
      no_vga:
 5            mov     ah,12h          ; EGA display info
              mov     bl,10h
              int     10h
              cmp     bl,10h          ; if bl remains the same the no EGA
              je      presence_done
10            mov     dbox_ok,0ffh
      presence_done:
      ; get the display segment
              int     11h                     ; color or monochrome monitor ?
              and     ax,30h
15            cmp     ax,30h
              mov     display_segment,mono
              mov     attribute,07h
              je      mono_disp
              mov     attribute,01bh
20            mov     display_segment,color_seg
      mono_disp:

mov     main_flags,0            ;
          IF board
25            lea     si,init_aic_tx96_rx96   ; tx 9600 rx 9600
              call    init_aic
              call    init_dma mov     ring_state,offset no_ring_state
30            mov     recv_vector,offset ring_detect
              mov     tx_vector,offset nul_routine
              call    wedge_int ; check for any command line options
35            mov     es,psp_segment
              mov     bx,80h
              mov     cl,[es:bx]      ; get the command line option count
              xor     ch,ch
              inc     bx
40            cmp     cx,0
              je      init_ring
      space_loop:
              mov     al,[es:bx]
              inc     bx
45            cmp     al,' '
              jne     got_char
              loop    space_loop
      got_char:
              dec     bx
50            lea     si,playback_file
```

```
                cmp     cx,12
                jle     get_name
                mov     cx,12
        get_name:
                mov     al,[es:bx]
                inc     bx
                mov     [ds:si],al
                inc     si
        space_off:
                loop    get_name xor     al,al               ; terminate
                mov     [ds:si],al
                call    speaker_on
                lea     dx,playback_file
                call    playback_msg
                call    speaker_off
                jmp     main_exit init_ring:
                push    ds
                pop     es
        ; re-init all the vectors
                mov     ring_state,offset no_ring_state
                mov     recv_vector,offset ring_detect
                mov     tx_vector,offset nul_routine call    on_hook
                call    speaker_off
            ENDIF main_screen:
        ; hide the cursor
                mov     ah,02h
                xor     bh,bh
                mov     dh,25
                mov     dl,0
                int     10h and     main_flags,0700h    ; every thing but parity
                call    init_screen
                call    print_parity main_loop:
            IF board
                call    on_hook
            ENDIF
        no_hangup:
                lea     si,main_menu
```

```
        call    window_flip get_key:
        mov     ah,1
        int     16h
        jnz     menu_command test    int_flags,b0
        jz      get_key                 ; check for ring and     int_flags,0feh test    main_flags,b0
        jnz     aa_data lea     si,main_menu
        call    window_flip call    answering_machine
        jmp     short main_loop aa_data:
;       call    aa_comm_mode
        jmp     short main_loop menu_command:
        mov     ah,0
        int     16h cmp     ax,F1
        jne     chk_record lea     si,main_menu
        call    window_flip call    originate_mode_init
        call    comm_mode
    IF board
        jmp     short init_ring
    ELSE
        jmp     short main_screen
    ENDIF chk_record:
        cmp     ax,F2
        jne     chk_playback lea     si,main_menu
        call    window_flip
```

```
            call    off_hook
            call    speaker_off
            or      main_flags,b3       ; ignore loop loss 5          lea     si,start_message
            call    window_flip mov     ah,0                ; get a key
            int     16h
10
            lea     si,start_message
            call    window_flip lea     si,end_message
15          call    window_flip IF board
            lea     dx,out_msg
            call    record_msg
20      ELSE
            mov     ah,0
            int     16h
        ENDIF 25          lea     si,end_message
            call    window_flip jmp     main_loop 30      chk_playback:
        IF board
            cmp     ax,F3
            jne     chk_tone 35          lea     si,main_menu
            call    window_flip call    on_hook
            call    speaker_on
40
        try_again:
            lea     dx,playback_file
            call    playback_msg
            jc      bad_play
45
            mov     bx,offset playback_file
            inc     byte ptr [bx+3]

no_files:
50          call    speaker_off
```

39

```
                jmp     main_loop
        bad_play:
                mov     bx,offset playback_file
                cmp     byte ptr [bx+3],'1'
                je      no_files
                mov     byte ptr [bx+3],'1'
                jmp     short try_again ENDIF
        chk_tone:
                cmp     ax,F4
                jne     chk_dial lea     si,main_menu
                call    window_flip IF board
                call    speaker_on
        ENDIF mov     freq,tone_2225
                mov     ax,1000                 ; ten seconds
                call    send_tones IF board
                call    speaker_off
        ENDIF jmp     main_loop chk_dial:
                cmp     ax,F5
                je      originate_mode
                jmp     chk_F6 originate_mode:
                lea     si,main_menu
                call    window_flip call    dial
        IFE board
                jmp     no_hangup
        ELSE
                mov     sreg+9,17               ; 600 ms of answer tone
                mov     sreg+7,30               ; 30 second time out
                call    callp_main
                jnc     got_atone
                jmp     main_loop
        got_atone:
```

40

```
            call    setup_loop_current or      recv_flags,1h           ; recv_high
            call    init_comm_screen and     main_flags,NOT b0
            call    init_recv or      recv_flags,08h          ; data mode
    ;       cmp     dbox_ok,0
    ;       je      no_dbox1
    ;       and     recv_flags,0fff7h
    ;       call    init_dbox
    ;no_dbox1:
            call    init_rx_dma cli
            mov     ax,150
            call    init_timer
            mov     recv_vector,offset demod ; enable DMA channel 2  RECV DMA
            call    rx_dma_on
            sti wait_connect:
            test    recv_flags,b5
            jz      wait_connect
            call    speaker_off
            mov     rx_char_in,offset rx_char_buf_start
            mov     rx_char_out,offset rx_char_buf_start call    comm_mode
            jmp     init_ring
        ENDIF chk_f6:
            cmp     ax,F6
            jne     chk_ttone_detect lea     si,main_menu
            call    window_flip call    callp_main
            jmp     no_hangup chk_ttone_detect:
            cmp     ax,F7
            jne     chk_message_system
```

41

```
            lea     si,main_menu
            call    window_flip call    off_hook
            call    speaker_on call    touch_tone_detect call    on_hook
            call    speaker_off
            jmp     no_hangup chk_message_system:
            cmp     ax,f8
            jne     chk_on_off_hook lea     si,main_menu
            call    window_flip call    messaging_system jmp     no_hangup chk_on_off_hook:
        IF board
            cmp     ax,ALT_H
            jne     chk_spkr mov     dx,modem_board
            xor     out_latch,1
            mov     al,out_latch
            out     dx,al
            jmp     get_key chk_spkr:
            cmp     ax,ALT_S
            jne     chk_parity mov     dx,modem_board
            xor     out_latch,8
            mov     al,out_latch
            out     dx,al
            jmp     get_key
        ENDIF chk_parity:
            cmp     ax,ALT_P
            jne     chk_answer_mode
```

```
                call    new_parity
                jmp     get_key chk_answer_mode:
                cmp     ax,ALT_A
                jne     chk_exit xor     main_flags,b5           ; change answering machine answer mode
                jmp     get_key
        chk_exit:
                cmp     ax,F10
                je      main_exit
                jmp     get_key main_exit:
                call    disable_int mov     ah,15           ; CLS
                int     10h
                mov     ah,0
                int     10h mov     ah,4ch          ; exit
                xor     al,al
                int     21h SOFT_MODEM      ENDP
        ;
        ;%%%%%%%%%%%%%%%%%%%%%%%%%%%%%%%%%%%%%%%%%%%%%%%
        ;
        INIT_DMA        PROC    NEAR call    tx_dma_off
                call    rx_dma_off mov     dx,wr_cmd               ; command register
                mov     al,00000000b
                out     dx,al
                jmp     $+2 mov     dx,wr_mode
                mov     al,01011001b            ; channel 1
                out     dx,al
                jmp     $+2 mov     al,01010110b            ; channel 2
                out     dx,al
                jmp     $+2
```

```
                call    init_tx_dma
                call    init_rx_dma ret

INIT_DMA        ENDP
        ;
        ;%%%%%%%%%%%%%%%%%%%%%%%%%%%%%%%%%%%%%%%%%%%%%%%%%%
        ;
        INIT_TX_DMA PROC  NEAR mov     dx,wr_clr_byte_ptr      ; init flag to low byte
                out     dx,al
                jmp     $+2 mov     ax,tx_dma_a1a16
        ; AX contains A1 - A16 of the tx buffer
                mov     dx,dma_5_address
                out     dx,al
                jmp     $+2
                mov     al,ah
                out     dx,al
                jmp     $+2 mov     ax,tx_dma_page
                mov     dx,dma_5_page
                out     dx,al
                jmp     $+2 mov     dx,wr_clr_byte_ptr      ; init flag to low byte
                out     dx,al
                jmp     $+2

; Write the buffer size to each channel
                mov     ax,buffer_word_size
                mov     dx,dma_5_count
                out     dx,al
                jmp     $+2
                mov     al,ah
                out     dx,al
                jmp     $+2 ret

INIT_TX_DMA ENDP
        ;
        ;%%%%%%%%%%%%%%%%%%%%%%%%%%%%%%%%%%%%%%%%%%%%%%%%%%
        ;
        INIT_RX_DMA PROC  NEAR
```

```
            mov     dx,wr_clr_byte_ptr      ; init flag to low byte
            out     dx,al
            jmp     $+2

; setup the receive buffer samples
            mov     ax,rx_dma_ala16
            mov     dx,dma_6_address
            out     dx,al
            jmp     $+2
            mov     al,ah
            out     dx,al
            jmp     $+2 mov     ax,rx_dma_page
            mov     dx,dma_6_page
            out     dx,al
            jmp     $+2 mov     dx,wr_clr_byte_ptr      ; init flag to low byte
            out     dx,al
            jmp     $+2 mov     dx,dma_6_count
            mov     ax,buffer_word_size
            out     dx,al
            jmp     $+2
            mov     al,ah
            out     dx,al
            jmp     $+2 ret

INIT_RX_DMA ENDP
    ;
    ;%%%%%%%%%%%%%%%%%%%%%%%%%%%%%%%%%%%%%%%%%%%%%%%%%%%%
    ;
    INIT_AIC    PROC    NEAR

; disable DMA channels
            call    rx_dma_off
            call    tx_dma_off mov     dx,wr_cmd               ; command register
            mov     al,00000000b
            out     dx,al
            jmp     $+2 mov     dx,wr_mode
            mov     al,01011001b            ; channel 1
            out     dx,al
```

```
        jmp     $+2 mov     dx,wr_clr_byte_ptr      ; init flag to low byte
        out     dx,al
        jmp     $+2 mov     ax,tx_dma_a1a16
; AX contains A1 - A16 of the tx buffer
        mov     dx,dma_5_address
        out     dx,al
        jmp     $+2
        mov     al,ah
        out     dx,al
        jmp     $+2 mov     ax,tx_dma_page
        mov     dx,dma_5_page
        out     dx,al
        jmp     $+2 mov     dx,wr_clr_byte_ptr      ; init flag to low byte
        out     dx,al
        jmp     $+2

; Write the buffer size to each channel
        mov     ax,buffer_word_size
        mov     dx,dma_5_count
        out     dx,al
        jmp     $+2
        mov     al,ah
        out     dx,al
        jmp     $+2 end_dma:
;    reset the AIC
        mov     dx,modem_board
        and     out_latch,0fbh
        mov     al,out_latch
        out     dx,al
        mov     cx,100
here2:
        loop    here2
        or      out_latch,4h
        mov     al,out_latch
        out     dx,al ; DS:SI already setup
        xor     di,di
        mov     es,tx_sample_segment
        mov     cx,16
```

46

```
                rep     movsw

; enable DMA channel 1
                call    tx_dma_on wait_aic:
                mov     dx,wr_clr_byte_ptr      ; init flag to low byte
                out     dx,al
                jmp     $+2
                mov     dx,dma_5_count
                in      al,dx
                mov     bl,al
                jmp     $+2
                in      al,dx
                mov     bh,al
                cmp     bx,buffer_word_size - 14
                jge     wait_aic ; disable DMA channel 1
                call    tx_dma_off ; clear out the AIC commands
                mov     es,tx_sample_segment
                xor     di,di
                mov     cx,11
                xor     ax,ax
                rep     stosw ; AIC has been initialized
                ret INIT_AIC        ENDP
        ;
        ;%%%%%%%%%%%%%%%%%%%%%%%%%%%%%%%%%%%%%%%%%%%%%%%%%
        ;
        MISC_ROUTINES   PROC    NEAR off_hook:
                mov     dx,modem_board
                and     out_latch,0feh
                mov     al,out_latch
                out     dx,al
                ret on_hook:
                mov     dx,modem_board
                or      out_latch,1
                mov     al,out_latch
                out     dx,al
                ret
```

```
            ret
    file_open:
            mov     handle,ax 5          lea     si,init_aic_voice  ; tx 9600 rx 9600
            call    init_aic
            call    init_dma ; dma is setup
10          mov     tx_in_ptr,0
    playback_loop:
            mov     ah,1
            int     16h
            jz      no_abort
15          jmp     abort_pb
    no_abort:
            mov     dx,wr_clr_byte_ptr       ; init flag to low byte
            out     dx,al
            jmp     $+2
20
            mov     dx,dma_5_address
            in      al,dx
            mov     cl,al
            jmp     $+2
25          in      al,dx
            mov     ch,al
            jmp     $+2 mov     dx,wr_clr_byte_ptr       ; init flag to low byte
30          out     dx,al
            jmp     $+2

; check for low byte rollover
            mov     dx,dma_5_address
35          in      al,dx
            cmp     al,cl
            je      tx_address_ok
            mov     cl,al
            jmp     $+2
40          in      al,dx
            mov     ch,al
            jmp     $+2 tx_address_ok:
45          mov     ax,tx_in_ptr       ; calculate the tx buffer address
            shr     ax,1               ; word address
            add     ax,tx_dma_a1a16
            sub     ax,cx
            jns     pos_diff2
50          add     ax,( tx_buf_len / 2 )
```

```
        pos_diff2:
        ;       shr     ax,1                    ; word count
                cmp     ax,800h                 ; less than 2K words in the buffer?
                jge     playback_loop ; file the tx buffer with 2K words of samples
                mov     ah,03fh                 ; file read
                mov     bx,handle
                mov     cx,1000h                ; 4K bytes
                mov     dx,tx_in_ptr
                push    ds
                mov     ds,tx_sample_segment
                int     21h
                pop     ds push    ax
        ; enable DMA channel 1  TX DMA
                call    tx_dma_on
                pop     ax cmp     ax,0
                je      file_end
                add     tx_in_ptr,1000h         ; adjust input pointer
                cmp     tx_in_ptr,tx_buf_len
                jne     playback_loop mov     tx_in_ptr,0
                jmp     short playback_loop file_end:
                mov     bx,tx_in_ptr            ; calculate the tx buffer address
                shr     bx,1                    ; word address
                add     bx,tx_dma_ala16 wait_end_loop:
        ; wait for tx_in_ptr and the DMA 5 address to be the same
                mov     dx,wr_clr_byte_ptr      ; init flag to low byte
                out     dx,al
                jmp     $+2 mov     dx,dma_5_address
                in      al,dx
                mov     cl,al
                jmp     $+2
                in      al,dx
                mov     ch,al
                jmp     $+2 mov     dx,wr_clr_byte_ptr      ; init flag to low byte
```

```
                out     dx,al
                jmp     $+2

; check for low byte rollover
                mov     dx,dma_5_address
                in      al,dx
                cmp     al,cl
                je      tx_address_ok2
                mov     cl,al
                jmp     $+2
                in      al,dx
                mov     ch,al
                jmp     $+2 tx_address_ok2:
                cmp     bx,cx
                jne     wait_end_loop abort_pb:
        ; disable DMA channel 1 TX DMA
                call    tx_dma_off ;       call    speaker_off mov     bx,handle       ; close the file
                mov     ah,03eh
                int     21h clc
                ret PLAYBACK_MSG    ENDP
        ;
        ;%%%%%%%%%%%%%%%%%%%%%%%%%%%%%%%%%%%%%%%%%%%%%%%%%
        ;
        COMM_MODE       PROC    NEAR comm_loop:
            IFE board
        ;       mov     cx,20000
        ;here:
        ;       loop    here
                call    tx1224
                call    demod
            ENDIF
                mov     ah,1            ; any keys hit?
                int     16h
                jz      check_receive
```

```
            jmp     got_key check_receive:
            test    main_flags,b3       ; ignore loop current?
            jnz     chk_dbox_mode test    main_flags,b4
            jz      chk_dbox_mode
            jmp     dbox_check
    chk_dbox_mode:
       IFE board
            test    main_flags,b0
            jnz     data_ok
            cmp     baud_count,300      ; 1.5 seconds
            jle     comm_loop   ; blow off data for 1.5 seconds
            or      main_flags,b0
            mov     rx_char_in,offset rx_char_buf_start
            mov     rx_char_out,offset rx_char_buf_start
    data_ok:
       ENDIF
            test    recv_flags,b3       ; are we in display box mode?
            jz      comm_loop mov     si,rx_char_out      ; check for receive chars
            cmp     si,rx_char_in
            je      comm_loop lodsb
            cmp     si,offset rx_char_buf_end
            jne     save_char_out
            mov     si,offset rx_char_buf_start
    save_char_out:
            mov     rx_char_out,si mov     bx,5b20h            ; ' '
    ; do parity checking
            test    main_flags,b10
            jz      no_parity
            test    main_flags,b9
            jz      check_even_odd
            test    main_flags,b8
            jnz     check_mark
            test    al,80h
            jz      good_receive
            mov     bx,3545h
            jmp     short good_receive
    check_mark:
            test    al,80h
            jnz     good_receive
```

56

```
                mov     bx,3545h
                jmp     short good_receive check_even_odd:
  5     ; even or odd
                test    main_flags,b8
                jz      check_even
                cmp     al,0
                jpo     good_receive
 10             mov     bx,3545h
                jmp     short good_receive
        check_even:
                cmp     al,0
                jpe     good_receive
 15             mov     bx,3545h good_receive:                           ; if parity is wrong turn.. flash parity
                mov     es,display_segment
                mov     di,70
 20             mov     [es:di],bx
                and     al,7fh
        no_parity:
                call    screen_out
                jmp     comm_loop
 25
        got_key:
                mov     ah,0
                int     16h 30             cmp     ax,F1
                jne     check_f2 test    recv_flags,b3    ; check if we are in display box mode
                jnz     comm_loop_jmp
 35
                or      recv_flags,08h   ; turn off the dbox while changing vid modes
                call    dbox_address
                and     recv_flags,0fff7h
                jmp     comm_loop
 40     check_f2:
                cmp     ax,F2
                jne     check_parity 45             test    recv_flags,b3
                jnz     go_dbox or      recv_flags,08h
                mov     al,vid_mode ; restore the initial video mode
 50             mov     ah,0
```

57

```
            jc      error_exit mov     tx_sample_segment,ax
            mov     bx,ax
  5         shl     ax,4
            rol     bx,4
            and     bx,0fh
            shr     bx,1
            rcr     ax,1
 10
            shl     bx,1            ; restore A16 - A23
            mov     tx_dma_page,bx
            mov     tx_dma_ala16,ax 15     no_problem:
        ; Now get the RX buffer
            mov     ah,48h          ; allocate memory
            mov     bx,400h         ; 16K bytes
            int     21h
 20         jc      error_exit ; now find out if the DMA address register will overflow
        ; AX - segment
            mov     rx_sample_segment,ax
 25         mov     bx,ax
            shl     ax,4
            rol     bx,4
            and     bx,0fh
            shr     bx,1
 30         rcr     ax,1 shl     bx,1            ; restore A16 - A23
            mov     rx_dma_page,bx
            mov     rx_dma_ala16,ax
 35         cmp     ax,0            ; if the DMA address is positive
                                    ; then don't worry...be happy
            jge     good_exit
            add     ax,2000h        ; word count
            cmp     ax,0
 40         jl      good_exit       ; still enough words
        ; the last buffer won't work so get the next, it will
            mov     ah,48h          ; allocate memory
            mov     bx,400h         ; 16K bytes
            int     21h
 45         jc      error_exit mov     rx_sample_segment,ax
            mov     bx,ax
            shl     ax,4
 50         rol     bx,4
```

49

```
              and     bx,0fh
              shr     bx,1
              rcr     ax,1

5            shl     bx,1                    ; restore A16 - A23
              mov     rx_dma_page,bx
              mov     rx_dma_a1a16,ax good_exit:
10            clc
       error_exit:
              ret ALLOCATE_BUFFERS    ENDP
15     ;
       ;%%%%%%%%%%%%%%%%%%%%%%%%%%%%%%%%%%%%%%%%%%%%%%%%%%%
       ;
       RECORD_MSG  PROC    NEAR
       .data
20            in_file         db      'msg1.dat',0
              handle          dw      ?
              end_flag        db      ?
              start_msg       db      cr,1f,'Hit a key to begin recording',cr,1f,'$'
              end_msg         db      cr,1f,'Hit a key to stop recording',cr,1f,'$'
25            bad_create      db      cr,1f,'Bad file create',cr,1f,'$'
       .code
              mov     ah,03ch                 ; create file
              xor     cx,cx                   ; normal access
              int     21h
30            jnc     file_ok
              lea     dx,bad_create
              jmp     error_exit
       file_ok:
              mov     handle,ax
35
              lea     si,init_aic_voice ; tx 9600 rx 9600
              call    init_aic
              call    init_dma 40     ; dma is setup
       ; enable DMA channel 2  RECV DMA
              call    rx_dma_on mov     rx_out,0
45            mov     end_flag,0
       ; set up the next address
       record_loop:
              mov     dx,wr_clr_byte_ptr      ; init flag to low byte
              out     dx,al
50            jmp     $+2
```

```
; how many words are there in the receive buffer?
        mov     dx,dma_6_address      ; get RX in
        in      al,dx
        mov     cl,al
5       jmp     $+2
        in      al,dx
        mov     ch,al
        jmp     $+2

10      mov     dx,wr_clr_byte_ptr    ; init flag to low byte
        out     dx,al
        jmp     $+2

; check to see if the low byte rolled over
15      mov     dx,dma_6_address
        in      al,dx
        cmp     cl,al
        je      read_ok
        mov     cl,al
20      in      al,dx
        mov     ch,al
read_ok:
        mov     ax,rx_out
        shr     ax,1                  ; words
25      add     ax,rx_dma_a1a16
        sub     cx,ax
        jns     pos_diff
        add     cx,( rx_buf_len / 2 )
pos_diff:
30 ;    shr     ax,1                  ; word count
        cmp     cx,800h               ; 2k words
        jge     save_it cmp     end_flag,0
35      jne     record_loop mov     ah,1
        int     16h
        jnz     end_record
40
        test    main_flags,b3         ; ignore loop loss
        jnz     record_loop test    main_flags,b4         ; loop loss?
45      jz      record_loop
end_record:
        mov     end_flag,0ffh
        jmp     short record_loop 50 save_it:
```

51

```
                push    ds
                mov     cx,1000h        ; 4k bytes
                mov     bx,handle
                mov     dx,rx_out
 5              mov     ah,040h
                mov     ds,rx_sample_segment
                int     21h
                pop     ds
                mov     ax,rx_out
10              add     ax,1000h
                cmp     ax,rx_buf_len
                jne     no_rollover
                xor     ax,ax
        no_rollover:
15              mov     rx_out,ax
                cmp     end_flag,0
                jne     end_record_dma
                jmp     record_loop 20      end_record_dma:
        ; disable DMA channel 2 RECV DMA
                call    rx_dma_off mov     bx,handle       ; close the file
25              mov     ah,03eh
                int     21h ret 30      error_out:
                mov     ah,09h
                int     21h
                ret 35      RECORD_MSG      ENDP
        ;
        ;%%%%%%%%%%%%%%%%%%%%%%%%%%%%%%%%%%%%%%%%%%%%%%%%%
        ;
        PLAYBACK_MSG    PROC    NEAR
40      .data
                out_msg         db      'msg1.dat',0
                bad_open        db      cr,lf,'Bad file open',cr,lf,'$'
        .code
                mov     ah,03dh                 ; open file
45              xor     al,al                   ; read access
                int     21h
                jnc     file_open
        ;       lea     dx,bad_open
        ;       mov     ah,09h
50      ;       int     21h
```

```
        speaker_on:
                mov     dx,modem_board
                and     out_latch,0f7h
                mov     al,out_latch
  5             out     dx,al
                ret speaker_off:
                mov     dx,modem_board
 10             or      out_latch,8
                mov     al,out_latch
                out     dx,al
                ret 15     MISC_ROUTINES   ENDP
        ;
        ;%%%%%%%%%%%%%%%%%%%%%%%%%%%%%%%%%%%%%%%%%%%%%%%%%%
        ;
        ALLOCATE_BUFFERS    PROC    NEAR
 20
        ; get TX buffer first
                mov     ah,48h              ; allocate memory
                mov     bx,400h             ; 16K bytes
                int     21h
 25             jc      error_exit1

; now find out if the DMA address register will overflow
        ; AX = segment
                mov     tx_sample_segment,ax
 30             mov     bx,ax
                shl     ax,4
                rol     bx,4
                and     bx,0fh
                shr     bx,1
 35             rcr     ax,1 shl     bx,1                ; restore A16 - A23
                mov     tx_dma_page,bx
                mov     tx_dma_ala16,ax
 40             cmp     ax,0                ; if the DMA address is positive
                                            ; then don't worry...be happy
                jge     no_problem
                add     ax,2000h            ; word count
                cmp     ax,0
 45             jl      no_problem          ; still enough words
        ; the last buffer won't work so get the next, it will
                mov     ah,48h              ; allocate memory
                mov     bx,400h             ; 16K bytes
                int     21h
 50     error_exit1:
```

```
            int     10h
            call    restore_screen
    comm_loop_jmp:
            jmp     comm_loop go_dbox:
            cmp     dbox_ok,0
            je      comm_loop_jmp    ; display does not support graphics
            call    save_screen
            call    init_dbox
            and     recv_flags,0fff7h
            jmp     comm_loop check_parity:
            cmp     ax,ALT_P
            jne     check_ascii call    new_parity
            jmp     comm_loop check_ascii:
            cmp     al,0             ; ASCII ?
            je      check_exit ; set up the correct parity
            test    main_flags,b10
            jz      send_it test    main_flags,b9
            jnz     force_it
            test    main_flags,b8
            jnz     odd_parity
            cmp     al,0             ; set parity bits
            jpe     send_it
            or      al,80h
            jmp     short send_it
    odd_parity:
            cmp     al,0             ; set parity bits
            jpo     send_it
            or      al,80h
            jmp     short send_it force_it:                        ; mark or space parity
            and     al,7fh
            test    main_flags,b8
            jz      send_it
            or      al,80h send_it:
    ; put the key into the transmit buffer
```

58

```
                mov     es,ds_segment
                cli
                mov     di,tx_char_in
                stosb
                cmp     di,offset tx_char_buf_end
                jne     save_di
                lea     di,tx_char_buf_start
        save_di:
                cmp     di,tx_char_out    ; is the buffer full?
                je      loop_end          ; yes so don't update the pointer
                mov     tx_char_in,di
                sti check_exit:
                cmp     ax,F10
                je      dbox_check        ; F10
        loop_end:
                sti
                jmp     comm_loop dbox_check:
                test    recv_flags,b3     ; are we data mode ?
                jnz     exit or      recv_flags,08h
                mov     al,vid_mode ; restore the initial video mode
                mov     ah,0
                int     10h exit:
                call    tx_dma_off
                call    rx_dma_off
                cli
                mov     tx_vector,offset nul_routine
                mov     recv_vector,offset nul_routine
                sti
                ret COMM_MODE       ENDP
        ;
        ;%%%%%%%%%%%%%%%%%%%%%%%%%%%%%%%%%%%%%%%%%%%%%%%%%%%
        ;
        SET_AIC_BANDS   PROC    NEAR ; set up the AIC
                lea     si,init_aic_tx96_rx96
                test    tx_flags,b0
                jnz     tx96
                lea     si,init_aic_tx48_rx48
                test    recv_flags,b0
```

```
                jz      init_interface
                lea     si,init_aic_tx48_rx96
                jmp     short init_interface
        tx96:
 5              test    recv_flags,b0
                jnz     init_interface
                lea     si,init_aic_tx96_rx48
        init_interface:
                call    init_aic
10              ret SET_AIC_BANDS   ENDP
        ;
        ;%%%%%%%%%%%%%%%%%%%%%%%%%%%%%%%%%%%%%%%%%%%%%%
15      ;
        TX_DMA_OFF  PROC   NEAR IF board
        ; disable DMA channels 1
20              mov     dx,wr_single_mask
                mov     al,00000101b            ; mask channel 1
                out     dx,al
                and     main_flags,NOT b2
            ENDIF
25
                ret TX_DMA_OFF  ENDP
        ;
30      ;%%%%%%%%%%%%%%%%%%%%%%%%%%%%%%%%%%%%%%%%%%%%%%
        ;
        RX_DMA_OFF  PROC   NEAR IF board
35      ; disable DMA channels 2
                mov     dx,wr_single_mask
                mov     al,00000110b            ; mask channel 2
                out     dx,al
            ENDIF
40
                ret RX_DMA_OFF  ENDP
        ;
45      ;%%%%%%%%%%%%%%%%%%%%%%%%%%%%%%%%%%%%%%%%%%%%%%
        ;
        TX_DMA_ON   PROC   NEAR IF board
50              test    main_flags,b2
```

```
              jnz     already_on

; enable DMA channels 1
              mov     dx,wr_single_mask
  5           mov     al,00000001b            ; unmask channel 1
              out     dx,al
              or      main_flags,b2 already_on:
 10       ENDIF
              ret

TX_DMA_ON   ENDP
      ;
 15   ;%%%%%%%%%%%%%%%%%%%%%%%%%%%%%%%%%%%%%%%%%%%%%%%
      ;
      RX_DMA_ON   PROC    NEAR

IF board
 20   ; enable DMA channels 2
              mov     dx,wr_single_mask
              mov     al,00000010b            ; unmask channel 2
              out     dx,al
          ENDIF
 25
              ret RX_DMA_ON   ENDP
      ;
 30   ;%%%%%%%%%%%%%%%%%%%%%%%%%%%%%%%%%%%%%%%%%%%%%%%
      ;
      ANSWERING_MACHINE PROC   NEAR
      .data
              record_file db      'msg1.dat',0
 35           announce_file   db      'announce.dat',0
      .code
              test    main_flags,b5
              jz      yes_answer 40           call    speaker_on lea     dx,announce_file
              call    playback_msg 45           call    speaker_off
              ret yes_answer:
 50           call    off_hook
```

61

```
            call    speaker_off mov     ax,50
            call    init_timer
    wait_for_timer:
            test    recv_flags,b5
            jz      wait_for_timer lea     si,outgoing_msg
            call    window_flip lea     dx,out_msg
            call    playback_msg mov     freq,tone_1500
            mov     ax,100              ; 1/2 second
            call    send_tones lea     si,outgoing_msg
            call    window_flip call    setup_loop_current lea     si,recording_msg
            call    window_flip lea     dx,record_file
            call    record_msg lea     si,recording_msg
            call    window_flip call    on_hook lea     bx,record_file
            inc     byte ptr [bx+3]

ret

ANSWERING_MACHINE ENDP
    ;
    ;%%%%%%%%%%%%%%%%%%%%%%%%%%%%%%%%%%%%%%%%%%%%%%%%%
    ;
    ORIGINATE_MODE_INIT     PROC   NEAR
        IF board
            and     tx_flags,0fffeh     ; tx low
            or      recv_flags,1h       ; recv_high
        ELSE
    ;       or      tx_flags,1          ; tx high
```

62

```
        ;   or      recv_flags,1            ; rx high
            and     tx_flags,0fffeh
            and     recv_flags,0fffeh
        ENDIF call    init_comm_screen and     main_flags,NOT b0
            call    init_tx
            call    init_recv or      recv_flags,08h          ; data mode
            cmp     dbox_ok,0
            je      no_dbox
            and     recv_flags,0fff7h
            call    init_dbox
    no_dbox:

IF board
            call    off_hook
            call    speaker_on call    set_aic_bands
            call    init_dma call    setup_loop_current cli
            mov     ax,150
            call    init_timer
            mov     tx_vector,offset tx1224
            mov     recv_vector,offset demod
        ; enable DMA channel 2  RECV DMA
            call    rx_dma_on
            sti wait_timer:
            test    recv_flags,b5
            jz      wait_timer
            call    speaker_off
            mov     rx_char_in,offset rx_char_buf_start
            mov     rx_char_out,offset rx_char_buf_start
        ENDIF
            ret
    ORIGINATE_MODE_INIT         ENDP
    ;
    ;%%%%%%%%%%%%%%%%%%%%%%%%%%%%%%%%%%%%%%%%%%%%%%
    ;
    SETUP_LOOP_CURRENT          PROC    NEAR
```

```
                and     main_flags,NOT( b3 OR b4 )      ; set up loop loss
                mov     dx,modem_board
                in      al,dx
                test    al,b0
 5              jz      got_loop_current
                or      main_flags,b3                   ; ignore loop loss
        got_loop_current:
                ret 10      SETUP_LOOP_CURRENT      ENDP
        ;
        ;%%%%%%%%%%%%%%%%%%%%%%%%%%%%%%%%%%%%%%%%%%%%%%%%
        ;
        NEW_PARITY      PROC    NEAR
15
                mov     ax,main_flags
                and     ax,0700h
                inc     ah
                and     ah,07h
20              cmp     ah,1
                jne     update_parity
                mov     ah,4            ; make sure parity bit is set
        update_parity:
                and     main_flags,0f8ffh
25              or      main_flags,ax
                call    print_parity
                ret NEW_PARITY      ENDP
30      ;
        ;%%%%%%%%%%%%%%%%%%%%%%%%%%%%%%%%%%%%%%%%%%%%%%%%
        ;
        MESSAGING_SYSTEM   PROC   NEAR
        .data
35              done            db      0
                phone_number1   db      9,8,2,5,2,4,0,0ffh
        ;       phone_number1   db      9,2,9,9,8,4,4,0ffh
                file_1          db      'file1.dat',0
                file_2          db      'file2.dat',0
40              end_file        db      'file3.dat',0
                file_3          db      'casey.dat',0
                response_msg    db      'msg1.dat',0
                                dw      0ffffh
        .code
45      ; first dial the number
                lea     si,phone_number1 push    si
        call_loop:
50          IF board
```

```
            call    off_hook
            call    speaker_on
            mov     ax,2 * 100          ; 2 sec.
            call    init_timer
 5  off_hook_wait:
            test    recv_flags,b5
            jz      off_hook_wait 10          pop     si dial_loop:
            lodsb
            cmp     al,0ffh
15          je      dial_done
            xor     ah,ah
            mov     bx,ax
            mov     ax,7
            push    si
20          call    dtmf
            pop     si
            jc      dial_done mov     ax,7                ; 70 ms
25          call    init_timer inter_digit_wait:
            test    recv_flags,b5
            jz      inter_digit_wait
30
            jmp     short dial_loop dial_done:
            comment     !
35          call    init_callp
            mov     cx,28
    get_ring:
            mov     ah,1
            int     16h
40          jnz     key_hit
            push    cx
            call    get_callp
            test    al,1
            jz      wait_ring
45          pop     cx
            dec     cx
            jcxz    got_ring
            jmp     short get_ring
    wait_ring:
50          pop     cx
```

```
              mov     cx,28
              jmp     short get_ring
      got_ring:
      ; wait for 4 seconds of silence
              mov     cx,112
      get_silence:
              mov     ah,1
              int     16h
              jnz     key_hit
              push    cx
              call    get_callp
              test    al,1
              jnz     no_silence
              pop     cx
              dec     cx
              jcxz    got_silence
              jmp     short get_silence
      no_silence:
              pop     cx
              mov     cx,112
              jmp     short get_silence got_silence:
              !
              mov     ah,0
              int     16h lea     dx,file_1
              call    playback_msg call    get_touch_tone lea     dx,file_2
              call    playback_msg lea     dx,file_3
              call    playback_msg lea     dx,end_file
              call    playback_msg mov     freq,tone_1500
              mov     ax,100              ; 1/2 second
              call    send_tones call    setup_loop_current lea     dx,response_msg
              call    record_msg
```

```
                call    on_hook
            ELSE
        key_hit:
            ENDIF
                mov     ah,0
                int     16h
                ret

MESSAGING_SYSTEM    ENDP

END

.model small
        .286
        ;%%%%%%%%%%%%%%%%%%%%%%%%%%%%%%%%%%%%%%%%%%%%%
        ;
        ;       INTS is the interrupt routines
        ;
        ;       This routine contains the basic interrupt driver for the SOFTMODEM.
        ;       Tx_vector and rx_vector point to the routines to be performed during
        ;       the interrupt.  This module also contains the ring detect code.
        ;
        ;%%%%%%%%%%%%%%%%%%%%%%%%%%%%%%%%%%%%%%%%%%%%% include     equates public      softmodem,init_timer,timer_10ms
                public      processed,nul_routine
                public      recv_vector,tx_vector,int_flags
                public      wedge_int,disable_int,ring_detect
                public      ring_state,no_ring_state,timer_reload
                public      timer_tic extrn tx_dma_off:near,rx_dma_off:near extrn recv_flags:word,main_flags:word .data
                int_flags   db      ?
        ;       int_flags.0 = 1 ring detected ring_state  dw      ?       ; ring detect state variable
                state_count db      ?
                cycle_count db      ?

old_comint  dd      ?
                recv_vector dw      ?
                tx_vector   dw      ?

timer_10ms  dw      ?       ; ten MS timer
```

```
                timer_tic      db     ?      ; interrrupt counter
                timer_reload   db     ?
                processed      db     ?      ; data has been sent or received
                in_int         db     0
        .code
        ;
        ;%%%%%%%%%%%%%%%%%%%%%%%%%%%%%%%%%%%%%%%%%%%%%%%%
        ;
        SOFTMODEM    PROC   NEAR pusha              ; save context
                push   es
                push   ds sti
                mov    al,20h
                out    20h,al mov    dx,@data
                mov    ds,dx cmp    in_int,0
                jne    exit_int mov    in_int,0ffh modem_loop:
                mov    processed,0
                mov    ax,recv_vector
                call   ax
                mov    ax,tx_vector
                call   ax
                cmp    processed,0
                jne    modem_loop mov    dx,modem_board
                in     al,dx
                sal    al,4
                and    ax,b4
                or     main_flags,ax        ; if one then will latch it ; ten MS timer routine
                dec    timer_tic
                jnz    timer_done mov    al,timer_reload
                mov    timer_tic,al dec    timer_10ms
                jnz    timer_done
```

```
                or      recv_flags,20h
        timer_done:
                mov     in_int,0
        exit_int:
                pop     ds              ; restore context
                pop     es
                popa ; interrupt exit
                iret SOFTMODEM       ENDP
        ;
        ;%%%%%%%%%%%%%%%%%%%%%%%%%%%%%%%%%%%%%%%%%%%%%%%%
        ;
        INIT_TIMER      PROC    NEAR cli
                mov     timer_10ms,ax
                and     recv_flags,0ffdfh
                mov     al,6
                test    recv_flags,b0
                jnz     high_band
                shr     al,1
        high_band:
                mov     timer_tic,al
                mov     timer_reload,al
        nul_routine:
                sti
                ret INIT_TIMER      ENDP
        ;
        ;%%%%%%%%%%%%%%%%%%%%%%%%%%%%%%%%%%%%%%%%%%%%%%%%
        ;
        WEDGE_INT       PROC    NEAR
            IF board
        ; wedge int 0bh ---- COM 2 INT in      al,21h                  ; set interrupt controller chip
                or      al,00001000b            ; disable com 2 int
                out     21h,al mov     al,0bh                  ; COM 2 interrrupt
                mov     ah,35h                  ; get current vector
                int     21h
                mov     word ptr old_comint,bx
                mov     word ptr old_comint[2],es mov     al,0bh
```

69

```
            mov     ah,25h                  ;set new vector
            lea     dx,softmodem
            push    ds
            push    cs
    5       pop     ds
            int     21h
            pop     ds in      al,21h                  ; set interrupt controller chip
    10      and     al,11110111B            ; enable com 2 int
            out     21h,al
        ENDIF
            ret 15  WEDGE_INT  ENDP
        ;
        ;%%%%%%%%%%%%%%%%%%%%%%%%%%%%%%%%%%%%%%%%%%%%%%%%%
        ;
        DISABLE_INT PROC  NEAR
    20      IF board
            in      al,21h                  ; set interrupt controller chip
            or      al,00001000b            ; disable com 2 int
            out     21h,al 25      mov     tx_vector,offset nul_routine
            mov     recv_vector,offset nul_routine mov     dx,word ptr old_comint
            mov     ax,word ptr old_comint[2]
    30      push    ds
            mov     ds,ax
            mov     al,0bh
            mov     ah,25h                  ;set new vector
            int     21h
    35      pop     ds call    rx_dma_off
            call    tx_dma_off
        ENDIF
    40      ret
        DISABLE_INT ENDP
        ;
        ;%%%%%%%%%%%%%%%%%%%%%%%%%%%%%%%%%%%%%%%%%%%%%%%%%
        ;
    45  RING_DETECT PROC  NEAR mov     dx,modem_board
            in      al,dx
            mov     bx,ring_state
    50      call    bx
```

```
        ret no_ring_state:
        mov     cycle_count,5
        test    al,bl
        jnz     no_ring
        mov     ring_state,offset ring1
no_ring:
        ret ring1:
        test    al,bl
        jnz     abort_ring              ; got a spike
        mov     state_count,21          ; 35 ms
        mov     ring_state,offset wait_low    ; low long enough
                                        ; 1.667ms to 3.3ms
        ret
abort_ring:
        mov     ring_state,offset no_ring_state
        ret wait_low:
; no manual ring check so can be low for 35ms without a problem
; if it stays low for that long then abort the ring and start over
        test    al,bl
        jnz     went_high
        dec     state_count
        jz      abort_ring              ; low for greater than expected
        ret
went_high:
        mov     ring_state,offset wait_high
        mov     state_count,20          ; can't be high more than 33.3ms
        ret wait_high:
        test    al,bl
        jz      count_cycle
        dec     state_count             ; went high before 5 cycles
        jz      abort_ring
        ret count_cycle:
        dec     cycle_count
        jz      got_ring
        mov     ring_state,offset ring1
        ret
got_ring:
        mov     state_count,105         ; 175ms of no activity for ring to be
                                        ; complete
        mov     ring_state,offset wait_end
```

```
              ret wait_end:
              test    al,bl
              jnz     count_it
              mov     state_count,105
              ret
      count_it:
              dec     state_count
              jz      ring_done
              ret
      ring_done:
              or      int_flags,1        ; set got ring flag
              mov     ring_state,offset no_ring_state
              ret RING_DETECT ENDP
              END
      .model small
      .286
      ;%%%%%%%%%%%%%%%%%%%%%%%%%%%%%%%%%%%%%%%%%%%%%%%%%
      ;
      ;       Receive filter
      ;
      ;       This module uses a special filter algorithm for
      ;       band and phase splitting of the receive samples.
      ;
      ;       Receive samples are accumulated at a rate of 9600 per second
      ;       for high band and 4800 per second for the low band.
      ;
      ;       The receive buffer is 8192 words long as is the transmit buffer.
      ;
      ;%%%%%%%%%%%%%%%%%%%%%%%%%%%%%%%%%%%%%%%%%%%%%%%%% include equates public    filter_pq,rx_out,delay_ptr
              public    rx_in,baudlp_vector,save_s1
              public    r_a2_delay,i_a2_delay
              public    buffer_in,buffer_out,interp_a0,interp_a1,quad_count
              public    real_buffer,imag_buffer extrn agc_average:word
              extrn eqr_delay:word
              extrn eqi_delay:word
              extrn rx_sample_segment
              extrn recv_flags:word,baud_x:word
              extrn agc_speed:word
              extrn agc_mant:word
              extrn temp_x:word,temp_y:word
```

```
                extrn agc_xsube:byte delay_length        equ     256

5       .data
                rx_out              dw      ?
                rx_in       dw      ?

; the following are the baud loop interpolator variables
10              baudlp_vector       dw      ?               ; jump for baud loop interpolator quad_count  dw      ?                       ; update coeff count buffer_in   dw      ?
15              buffer_out  dw      ?
                real_buffer dw      4 dup(?)        ; real equalizer input buffer
                imag_buffer dw      4 dup(?)        ; imaginary buffer real_s1             dw      ?               ; interpolator delay lines
20              imag_s1             dw      ?

interp_a0   dw      ?               ; interpolator coefficients
                interp_a1   dw      ?

25              old_x dw    ?

;       EVENDATA
        ;       rx_samples_start    label word
        ;       rx_sample_buf       dw      8192 dup(?)
30      ;       rx_samples_end              label word

; REAL DELAY LINES delay_ptr   dw      ?
35
                r_b1_z1             dw      ?
                r_b1_z2             dw      ?

r_a2_delay_z1       dw      ?
40              r_a2_delay  dw      delay_length-1 dup(?)
                r_a2_delay_end0     dw      ?
                r_a2_delay_end1     dw      ?

r_b2_delay_z1       dw      ?
45              r_b2_delay  dw      delay_length-1 dup(?)
                r_b2_delay_end0     dw      ?
                r_b2_delay_end1     dw      ?

r_a3_delay_z1       dw      ?
50              r_a3_delay  dw      delay_length-1 dup(?)
```

73

```
                r_a3_delay_end0     dw      ?
                r_a3_delay_end1     dw      ?

; IMAGINARY DELAY LINES
5               i_a1_z1             dw      ?
                i_b1_z1             dw      ?
                i_b1_z2             dw      ?

i_a2_delay_z1       dw      ?
10              i_a2_delay  dw      delay_length-1 dup(?)
                i_a2_delay_end0     dw      ?
                i_a2_delay_end1     dw      ?

i_b2_delay_z1       dw      ?
15              i_b2_delay  dw      delay_length-1 dup(?)
                i_b2_delay_end0     dw      ?
                i_b2_delay_end1     dw      ?

i_a3_delay_z1       dw      ?
20              i_a3_delay  dw      delay_length-1 dup(?)
                i_a3_delay_end0     dw      ?
                i_a3_delay_end1     dw      ?

.code
25
        FILTER_PQ    PROC   NEAR

; filter and phase split 8 or 16 samples
                mov     ch,4            ; four times through the loop
30
                mov     es,rx_sample_segment
                mov     si,rx_out       ; filter sample pointer
        ;       mov     di,equalizer_in ; equalizer delay line pointer 35      ; filter 4 or 2 samples until we have a sample ready for the second
        ; stage. Execute the second stage and then do the same for the
        ; imaginary filter_loop:
40
        ;********************************************************
        ;
        ; THE FIRST STAGE OF THE RECV FILTER IS:
        ;
45      ; IN ──┤ X ├────────┤ + ├──────────────────── OUT
        ;
        ;      COS or
        ;      -SIN      │ Z │              │ Z │
        ;
50      ;
```

```
;                        ┌──┐
;                     ┌──┤Z │
;                     │X ├──┘
;                     ├──┤
5    ;                -1/4
;
;      COS = 1/4,0,-1/4,0,...    -SIN = 0,-1/4,0,1/4,...
;********************************************************
10
        mov     ax,es:[si]
        add     si,4            ; skip the next sample because cos = 0
        sar     ax,2

15      test    recv_flags,b0
        jnz     hi_stage1 low_stage1:
        test    ch,1
20      jz      no_neg
        neg     ax
   no_neg:
        mov     dx,r_b1_z1      ; out1 = 1/4X0 + Z1 - 1/4*Z2
        add     dx,ax
25      sar     r_b1_z2,2
        sub     dx,r_b1_z2      ; out1
        mov     r_b1_z2,dx
        add     ax,dx           ; out2 = 1/4X0 + out1 - 1/4*Z1
        sar     r_b1_z1,2
30      sub     ax,r_b1_z1
        mov     r_b1_z1,ax
        jmp     short stage2 hi_stage1:
35      mov     bx,ax           ; 1/4 X0 --> BX
        add     ax,r_b1_z1      ; 1/4 X0 + z1
        sar     r_b1_z2,2
        sub     ax,r_b1_z2      ; out1 = 1/4X0 + Z1 + (-1/4*Z2)
        mov     dx,ax           ; dx = out1
40      add     ax,bx           ; + 1/4 X0
        sar     r_b1_z1,2
        sub     ax,r_b1_z1      ; out2 = 1/4X0 + out1 + (-1/4*Z1)
        mov     bx,ax           ; bx = out2
        mov     ax,es:[si]      ; get X2 * -1/4
45      add     si,4
        sar     ax,2
        neg     ax
        sar     dx,2            ; -1/4 * out1
        neg     dx
50      xchg    ax,dx           ; dx = -1/4 * X2
```

75

```
        add    ax,bx              ; -1/4 X2 + B2/2 - B3
        add    ax,dx              ; out3
        mov    r_b1_z2,ax         ; save in Z2
        add    ax,dx              ; out4 = -1/4X2 + out3 - 1/4out2
        mov    dx,bx
        sar    dx,2
        sub    ax,dx
        mov    r_b1_z1,ax
        add    ax,bx              ; input to second stage = out4 + out2
        sar    ax,1               ; 1/2 stage2:
        sar    ax,3               ; second stage scalar 1/8 mov    bx,delay_ptr
        mov    r_a2_delay[bx+2],ax    ; store input into the delay line mov    dx,r_a2_delay[bx] ; scalar * OUT + ( 2 * r_a2_z1)
        sal    dx,1
        add    ax,dx
        add    ax,r_a2_delay[bx-2]    ; + r_a2_z2

; calculate OUT1
        add    ax,r_b2_delay[bx] ; add Z1
        mov    dx,r_b2_delay[bx-2]
        sar    dx,1               ; + ( -.5 * B2 )
        sub    ax,dx
        mov    r_b2_delay[bx+2],ax    ; store result into the delay line sar    ax,2               ; 1/4
        mov    dx,r_b2_delay[bx] ; + ( 1/2 * Z1 )
        sar    dx,1
        add    ax,dx
        mov    dx,r_b2_delay[bx-2]    ; + Z2/4
        sar    dx,2
        add    ax,dx sar    ax,1
        mov    r_a3_delay[bx+2],ax
        add    ax,r_a3_delay[bx-2]    ; + Z3
        mov    temp_x,ax real_done:
; AX holds the filter and phase split real output
        push   ax
        test   agc_speed,b4
        jz     not_narrow
        sar    ax,3               ; /128 total
not_narrow:
        sar    ax,4               ; /16
```

```
        ; get the absolute value
                jns     r_positive
                neg     ax
        r_positive:
  5             add     agc_average,ax
                pop     ax ; AGC AX here
                imul    agc_mant
 10             mov     cl,agc_xsube
                sal     dx,cl comment    !
                test    ch,b0
 15             jnz     no_save
                mov     eqr_delay[di],dx
                jmp     short do_imaginary no_save:
 20     ; do baud loop integrator calculations
                or      dx,dx             ; set the sign bit
                jns     pos_real
                neg     dx
        pos_real:
 25             sar     dx,5              ; /32
                test    ch,bl             ; are we at RX1 or RX0
                jz      add_it
                neg     dx                ; -RX1
        add_it:
 30             add     baud_sum,dx
                !

mov     di,dx             ; save in DI 35     do_imaginary:
        ; have completed 4 ( or 2 ) input samples for the real delay line.
        ; Now do the same for the imaginary.

40             mov     si,rx_out         ; filter sample pointer add     si,2              ; skip the fist sample because sin = 0
                mov     ax,es:[si]
                add     si,2
 45             sar     ax,2 test    recv_flags,b0
                jnz     hi_stage1_i 50             test    ch,b0
```

77

```
              jnz     no_neg2
              neg     ax
      no_neg2:
              mov     dx,i_a1_z1      ; A1
 5            mov     i_a1_z1,ax      ; save for the next loop
              add     dx,i_b1_z1
              sar     i_b1_z2,2
              sub     dx,i_b1_z2
              mov     i_b1_z2,dx      ; out1
10            add     ax,dx           ; + X0 * 1/4 = OUT
              sar     i_b1_z1,2
              sub     ax,i_b1_z1
              mov     i_b1_z1,ax 15    ; first stage pass two done
              jmp     short stage2_i hi_stage1_i:
              neg     ax              ; the first sample is a 0
20            mov     dx,ax           ; save for the next loop
              mov     ax,i_a1_z1
              add     ax,i_b1_z1      ; out1 = in_z1 + out_z1 + (-1/4*out_z2)
              sar     i_b1_z2,2
              sub     ax,i_b1_z2
25            mov     bx,ax           ; out1
              add     ax,dx           ; out2 = in + out1 + (-1/4*out_z1)
              sar     i_b1_z1,2
              sub     ax,i_b1_z2      ; out2
              add     dx,ax           ; out3 = in + out2 + (-1/4*out1)
30            sar     bx,2
              sub     dx,bx           ; out3
              mov     i_b1_z2,dx      ; save out3 in out_z2
              mov     dx,ax           ; dx = out2
              mov     bx,ax
35            add     si,2            ; skip sample 2
              mov     ax,es:[si]      ; get sample 3
              add     si,2
              sar     ax,2            ; in3
              mov     i_a1_z1,ax      ; save for next loop
40            add     ax,i_b1_z2      ; out3
              sar     bx,2
              sub     ax,bx           ; out4
              mov     i_b1_z1,ax
              add     ax,dx           ; input to second stage = out4 + out2
45            sar     ax,1 stage2_i:
              sar     ax,3            ; scaler for second stage 50            mov     bx,delay_ptr
```

```
            mov     i_a2_delay[bx+2],ax     ; store input into the delay line mov     dx,i_a2_delay[bx]  ; scalar * OUT + ( 2 * i_a2_z1)
            sal     dx,1
  5         add     ax,dx
            add     ax,i_a2_delay[bx-2]     ; + i_a2_z2

; calculate OUT1
            add     ax,i_b2_delay[bx]  ; add Z1
 10         mov     dx,i_b2_delay[bx-2]
            sar     dx,1               ; + ( -.5 * B2 )
            sub     ax,dx
            mov     i_b2_delay[bx+2],ax     ; store result into the delay line 15         sar     ax,2               ; 1/4
            mov     dx,i_b2_delay[bx]  ; + ( 1/2 * Z1 )
            sar     dx,1
            add     ax,dx
            mov     dx,i_b2_delay[bx-2]     ; + Z2
 20         sar     dx,2
            add     ax,dx sar     ax,1
            mov     i_a3_delay[bx+2],ax
 25         add     ax,i_a3_delay[bx-2]     ; + Z3
            mov     temp_y,ax imag_done:
    ; AX holds the filter and phase split imaginary output
 30         push    ax
            test    agc_speed,b4
            jz      wideband_agc
            sar     ax,3               ; /128 total
    wideband_agc:
 35         sar     ax,4               ; /16
    ; get the absolute value
            jns     i_positive
            neg     ax
    i_positive:
 40         add     agc_average,ax
            pop     ax ; AGC AX here
            imul    agc_mant
 45         mov     cl,agc_xsube
            sal     dx,cl comment     !
            test    ch,b0
 50         jnz     no_save_i
```

```
                mov     eqi_delay[di],dx
                add     di,2
                jmp     short update_ptr
        no_save_i:
        ; do the baud loop integrator calculations
                or      dx,dx
                jns     pos_imaginary
                neg     dx
        pos_imaginary:
                sar     dx,5            ; /32
                test    ch,bl
                jz      add_imaginary   ; RX0 or RX1?
                neg     dx              ; RX1
        add_imaginary:
                add     baud_sum,dx
                !

mov     ax,baudlp_vector
                call    ax update_ptr:
                add     delay_ptr,2 mov     rx_out,si
                dec     ch
                jz      baud_time_done
                jmp     filter_loop baud_time_done:
        ;       add     equalizer_in,4          ; set for the next baud time
                cmp     si,rx_samples_length
                jne     chk_end_delay mov     rx_out,0
        chk_end_delay:
                cmp     delay_ptr,(delay_length * 2 )
                jne     no_delay_shift mov     delay_ptr,0
        ; shift the delay lines from the end to the beginning
                mov     ax,r_a2_delay_end0
                mov     r_a2_delay_z1,ax
                mov     ax,r_a2_delay_end1
                mov     r_a2_delay,ax mov     ax,r_b2_delay_end0
                mov     r_b2_delay_z1,ax
                mov     ax,r_b2_delay_end1
                mov     r_b2_delay,ax
```

```
            mov     ax,r_a3_delay_end0
            mov     r_a3_delay_z1,ax
            mov     ax,r_a3_delay_end1
            mov     r_a3_delay,ax ; IMAGINARY DELAY LINES
            mov     ax,i_a2_delay_end0
            mov     i_a2_delay_z1,ax
            mov     ax,i_a2_delay_end1
            mov     i_a2_delay,ax mov     ax,i_b2_delay_end0
            mov     i_b2_delay_z1,ax
            mov     ax,i_b2_delay_end1
            mov     i_b2_delay,ax mov     ax,i_a3_delay_end0
            mov     i_a3_delay_z1,ax
            mov     ax,i_a3_delay_end1
            mov     i_a3_delay,ax no_delay_shift:
            ret FILTER_PQ   ENDP
;
;%%%%%%%%%%%%%%%%%%%%%%%%%%%%%%%%%%%%%%%%%%%%%%%%%%%%
;
INTERPOLATOR_ROUTINES   PROC    NEAR save_s1:
            mov     imag_s1,dx
            mov     real_s1,di
            mov     baudlp_vector,offset save_s0
            ret save_s0:
; imaginary sample is in DX
; real sample is in DI
            mov     baudlp_vector,offset save_s1
            dec     quad_count
            jz      new_coeff
compute_equalizer:
            mov     bx,buffer_in
; compute imaginary first
            push    cx
            mov     ax,dx
            imul    interp_a0       ; A0 * S0
            mov     cx,dx
            mov     ax,imag_s1
```

81

```
            imul    interp_a1           ; A1 * S1
            add     cx,dx
            sal     cx,1
            mov     imag_buffer[bx],cx
 5  ; compute the real
            mov     ax,di
            imul    interp_a0           ; A0 * S0
            mov     cx,dx
            mov     ax,real_s1          ; A1 * S1
10          imul    interp_a1
            add     cx,dx
            sal     cx,1
            mov     real_buffer[bx],cx  ; store in the real buffer
            add     buffer_in,2
15          and     buffer_in,07h
            pop     cx
            ret new_coeff:
20          mov     quad_count,32
            mov     ax,old_x
            xor     ax,baud_x
            jns     same_sign           ; if old and new have the same
                                        ; sign then no rollover
25
    ; could have rolled over --- or passed through zero so find out
            mov     ax,baud_x           ; if baud_x < .7 then no rollover
            cmp     ax,0
            jge     pos_int
30          neg     ax
            jns     pos_int             ; special case when baud_x - 8000h
            dec     ax
    pos_int:
            cmp     ax,5998h            ; .7
35          jl      same_sign cmp     baud_x,0
            jge     zero_to_one 40  ; compute an extra P
            mov     bx,buffer_in
    ; compute imaginary first
            push    cx
            push    dx
45          mov     ax,dx
            imul    interp_a0           ; A0 * S0
            mov     cx,dx
            mov     ax,imag_s1
            imul    interp_a1           ; A1 * S1
50          add     cx,dx
```

```
                sal     cx,1
                mov     imag_buffer[bx],cx
        ; compute the real
                mov     ax,di
  5             imul    interp_a0       ; A0 * S0
                mov     cx,dx
                mov     ax,real_s1      ; A1 * S1
                imul    interp_a1
                add     cx,dx
 10             sal     cx,1
                mov     real_buffer[bx],cx      ; store in the real buffer
                add     buffer_in,2
                and     buffer_in,07h
                pop     dx
 15             pop     cx zero_to_one:
                mov     imag_s1,dx
                mov     real_s1,di
 20             mov     baudlp_vector,offset save_s0
        ; compute A0 and A1
                mov     ax,baud_x
                mov     old_x,ax
                sar     ax,1
 25             add     ax,4000h        ; 1/2
                mov     interp_a1,ax
                neg     ax
                add     ax,7fffh
                mov     interp_a0,ax
 30             ret same_sign:
        ; compute A0 and A1
                mov     ax,baud_x
 35             mov     old_x,ax
                sar     ax,1
                add     ax,4000h        ; 1/2
                mov     interp_a1,ax
                neg     ax
 40             add     ax,7fffh
                mov     interp_a0,ax
                jmp     compute_equalizer 45     INTERPOLATOR_ROUTINES   ENDP
                END
        .model small
        .286
        ;**********************************************
 50     ;
```

```
;       Main demodulator
;
;       This program is the main demodulator algorithm for 1200
;       and 2400 baud operation.
;
;       The receive samples are stored in RX_SAMPLE_BUF and are filtered,
;       AGCed, and split into equalizer samples by the file RECVFIL.asm .
;
;%%%%%%%%%%%%%%%%%%%%%%%%%%%%%%%%%%%%%%%%%%%%%%%% bleed_tap       macro
                lodsw                   ; 5
                cwd                     ; 2
                and     dl,bl           ; 2
                or      dl,bh           ; 2
                sub     ax,dx           ; 2
                stosw                   ; 3
                endm absolute        macro cwd
                xor     ax,dx
                sub     ax,dx
                sar     ax,5 endm include equates public          equalizer_in,recv_flags,demod
                public          agc_average,agc_speed,recv_sample_count
                public          eqr_delay,eqi_delay
                public          init_recv,rx_char_out,rx_char_in
                public          rx_char_buf_start,rx_char_buf_end
                public          dbox_address,baud_count
                public          agc_xsube,agc_mant
                public          temp_x,temp_y,loop2_int,baud_x extrn filter_pq:near,save_sl:near
                extrn init_dbox:near,plot_point:near,get_tx_data:near
                extrn buffer_in:word,buffer_out:word
                extrn delay_ptr:word,baudlp_vector
                extrn cosine_table:word,sine_table:word
                extrn rx_out:word,rx_in:word
                extrn i_a2_delay:word,r_a2_delay:word
                extrn ds_segment:word,rx_dma_a1a16:word
                extrn tx_flags:word
                extrn buffer_in:word,buffer_out:word
                extrn interp_a0:word,interp_a1:word,quad_count:word
```

84

```
                extrn   real_buffer:word,imag_buffer:word extrn   vid_mode:byte,x:byte,y:byte
                extrn   reverse_table:byte
5               extrn   processed:byte rx_buf_len          equ     8192
                equalizer_length    equ     2048
                Cbeta1                      equ     -3072
10              Cbeta2                      equ     1096
                Calpha                      equ     -3072
                receive_low_thresh          equ     0000h
                receive_high_thresh         equ     0000h 15      .data
                tap_offset  dw      ?
                temp_x              dw      ?
                temp_y              dw      ?

20              recv_sample_count dw    ?       ; number of samples per baud time
                processed_cnt       dw      ?

eqr_delay   dw      equalizer_length dup(?) ; real equalizer delay
                eqr_end     label word
25              eqi_delay   dw      equalizer_length dup(?) ; imaginary equalizer
                eqi_end     label word real_taps       dw      14 dup(?)
                imaginary_taps  dw      14 dup(?)
30
                equalizer_in    dw      ?       ; equalizer delay line input pointer
                baud_count      dw      ?       ; increment every baud time rzn             dw      ?       ; equalizer real output
35              izn             dw      ?       ; eqiulizer imaginary output rym             dw      ?       ; rotated equalizer output
                iym             dw      ?

40              r_error         dw      ?       ; real error vector
                i_error         dw      ?       ; imaginary error vector dec_r           dw      ?       ; closest V22 point - real
                dec_i           dw      ?       ; V22 point - imaginary
45
                alpha           dw      ?       ; tap update speed aren            dw      ?       ; alpha * ren
                aien            dw      ?       ; alpha * ien
50
```

```
            ierr        dw      ?       ; counter rotated error vector imag.

recv_flags  dw      ?
    ;       bit 0       1 = recv high band
    ;       bit 1       1 = recv 2400 baud
    ;       bit 2       1 = got 1200 recv data
    ;       bit 3       1 = receive data on
    ;       bit 4       1 = detected 1100 ( S1 )
    ;       bit 5       1 = 10Ms timer expired
    ;       bit 6       1 = got energy
    ;       bit 7       1 = call progress timed out
    ;       bit 8       1 = looking for the end of the answer tone phi         dw      ?       ; carrier loop angle
            phase_corr  dw      ?       ; phase corrector integrator cosine              dw      ?       ; cosine(phi)
            sine        dw      ?       ; sine(phi)

recv_data   db      ?       ; demodulated data dbox_routine        dw      ?

sl_counter  db      ?

decision_table      db      0bh
                                db      0ah
                                db      0dh
                                db      0fh
                                db      09h
                                db      08h
                                db      0ch
                                db      0eh
                                db      06h
                                db      04h
                                db      00h
                                db      01h
                                db      07h
                                db      05h
                                db      02h
                                db      03h prev_y3y2   db      ?
            descram_0   db      ?
            descram_1_17        dw      ?
            data_1200   db      ?

eye_menu    db      '1. equalizer output',cr,lf
                        db      '2. equalizer 0 input',cr,lf
                        db      '3. equalizer 1 input',cr,lf
```

```
                db      '4. tap 5',cr,lf
                db      '5. S1 detector',cr,lf
                db      '6. Interpolator A1',cr,lf
                db      '7. PHI',cr,lf
                db      '8. 1st order baud loop integrator',cr,lf
                db      '9. 2nd order baud loop integrator',cr,lf,'$' tap_question    db      cr,lf,'Enter tap number ( 0 - 9, A - D ):','$' rx_char_in      dw      ?
rx_char_out     dw      ?

rx_char_buf_start  label byte
rx_char_buf     db      2000 dup(?)
rx_char_buf_end    label byte r_parse_jmp     dw      ?
r_parse_data    dw      ?

agc_coeff0      dw      1460h
agc_coeff1      dw      50b7h
agc_coeff2      dw      4f50h
agc_coeff3      dw      27e1h
agc_coeff4      dw      887h energy_threshold dw     ?
agc_average     dw      ?       ; agc sum
old_agc         dw      ?
agc_speed       dw      ?       ; agc countdown
agc_mant        dw      ?
agc_xsube       db      ?

baud_sum        dw      ?
loop2_int       dw      ?
loop2_cnt       db      ?
baud_x          dw      ?

baud_loop2_table db     60
                db      60
                db      30
                db      20
                db      15
                db      12
                db      10
                db      9
                db      8
                db      7
                db      6
                db      5
                db      4
```

```
                    db      3
                    db      2
        .code
        DEMOD PROC NEAR
5
        IF board
            mov     dx,wr_clr_byte_ptr      ; init flag to low byte
            out     dx,al
            jmp     $+2
10
        ; how many words are there in the receive buffer?
            mov     dx,dma_6_address    ; get RX in
            in      al,dx
            mov     cl,al
15          jmp     $+2
            in      al,dx
            mov     ch,al
            jmp     $+2

20          mov     dx,wr_clr_byte_ptr      ; init flag to low byte
            out     dx,al
            jmp     $+2 mov     dx,dma_6_address
25          in      al,dx
            cmp     cl,al
            je      read_ok
            mov     cl,al
            in      al,dx
30          mov     ch,al
        read_ok:
            mov     ax,rx_out
            shr     ax,1
            add     ax,rx_dma_ala16
35          sub     cx,ax
            jns     pos_diff
            add     cx,rx_buf_len
        pos_diff:
        ;   shr     ax,1                    ; word count
40          cmp     cx,recv_sample_count
            jge     demodulate_it
            ret
        ELSE
            call    get_tx_data
45          jnc     demodulate_it           ; data available
            ret
        ENDIF
;************************************************************************
        *
50      ;
```

```
;       DEMODULATION CODE
;
;
;**********************************************************************
*
5       demodulate_it:
            cmp     cx,processed_cnt    ; more than 1 1/2 baud times samples?
            jle     not_enough_samples  ; this will prevent further calls to
            or      processed,01h       ; demod by the interrrupt
        not_enough_samples:
10          inc     baud_count
            call    filter_pq           ; filter the next baud times samples
                                        ; insert into the equalizer delay lines equalizer_buf_check:            ; are there two samples in the
15          mov     ax,buffer_in        ; equilizer buffer ?
            sub     ax,buffer_out
            jns     no_adj
            add     ax,08h
        no_adj:
20          cmp     ax,4
            jge     get_equ
            ret get_equ:
25          mov     di,equalizer_in
            mov     bx,buffer_out mov     ax,real_buffer[bx]  ; RX1
            mov     eqr_delay[di],ax
30          absolute                    ; take care of the baud loop integrator
            sub     baud_sum,ax mov     ax,imag_buffer[bx]  ; IX1
            mov     eqi_delay[di],ax
35          absolute
            sub     baud_sum,ax add     bx,2
            and     bx,07h
40          mov     ax,real_buffer[bx]  ; RX0
            mov     eqr_delay[di+2],ax
            absolute
            add     baud_sum,ax 45          mov     ax,imag_buffer[bx]  ; IX0
            mov     eqi_delay[di+2],ax
            absolute
            add     baud_sum,ax 50          add     equalizer_in,4
```

89

```
                add     bx,2
                and     bx,07h
                mov     buffer_out,bx 5              test    recv_flags,b6
                jnz     got_energy mov     ax,baud_count
                and     ax,agc_speed
10              jz      energy_check
        no_energy:
                jmp     equalizer_full_check
        energy_check:
                mov     ax,agc_average
15              sub     ax,energy_threshold
                js      no_energy
                or      recv_flags,b6
                mov     baud_count,1
                jmp     short new_level
20
        got_energy:
                mov     ax,baud_count
                and     ax,agc_speed            ; every 4 or 32 baud times
                jz      check_alpha
25              jmp     display_box ;**********************************************************************
        *
        ;       AGC code
30      ;**********************************************************************
        * check_alpha:
                cmp     baud_count,100h
35              jne     agc_tests
                mov     alpha,800h              ; slow down to 1/16 after 2 sec
        agc_tests:
                test    agc_speed,b4
                jz      wideband_agc
40
        ; AGC test 1
                mov     ax,old_agc
                sar     ax,1                    ; .5
                sub     ax,agc_average          ; new < .5 old then compute all new AGC
45              jns     new_level ; AGC test 2
                mov     ax,old_agc
                sar     ax,1
50              add     ax,old_agc              ; 1.5 old
```

90

```
                sub     ax,agc_average
                jns     wideband_agc            ; if new > 1/5 old then compute new AGC new_level:
    5           mov     ax,agc_average
                mov     old_agc,ax
                jmp     short compute_agc wideband_agc:
   10   ; get ( ALPHA * NEW ) + (( 1 - ALPHA ) * OLD )
        ; ALPHA = 1/8
                mov     ax,old_agc
                mov     bx,ax
                sar     bx,3            ; 1/8
   15           sub     ax,bx           ; 7/8 old
                mov     bx,agc_average
                sar     bx,3            ; + 1/8 new
                add     ax,bx
                mov     old_agc,ax
   20
        compute_agc:
                mov     agc_average,0
                mov     cl,1
        ; AX is > 0
   25   ; subtract one from cl because the reference is /4 but during the actual
        ; AGCing of the sample we need a * 2
        normalize:
                inc     cl
                test    ax,b14
   30           jnz     normalize_done
                sal     ax,1
                jmp     short normalize
        normalize_done:
                mov     agc_xsube,cl
   35           push    ax              ; M
                mov     bx,ax
                imul    bx
                sal     dx,1
                push    dx              ; M^2
   40           mov     ax,bx
                imul    dx
                sal     dx,1
                push    dx              ; M^3
                mov     ax,bx
   45           imul    dx
                sal     dx,1            ; M^4
                mov     bx,agc_coeff0
                mov     ax,agc_coeff4
                imul    dx              ; A(4) * M^4
   50           add     bx,dx
```

91

```
                pop     ax
                imul    agc_coeff3    ; A(3) * M^3
                sub     bx,dx
                pop     ax
5               imul    agc_coeff2    ; A(2) * M^2
                add     bx,dx
                pop     ax
                imul    agc_coeff1    ; A(1) * M
                sub     bx,dx
10              sal     bx,3          ; * 8 because of equation plus a * 2 because
                                      ; of the multiplies and a /2 for reference
                mov     agc_mant,bx cmp     baud_count,32 ; slow the AGC down after 32 baud times
15              jne     display_box
                mov     agc_speed,1fh display_box:
                test    recv_flags,b3
20              jnz     baud_loop mov     ax,dbox_routine
                call    ax
                mov     x,ah
25              mov     y,bh
                call    plot_point ;*********************************************************************
        *
30      ;*********************************************************************
        *

; equation is | RX0 | + | IX0 | - | RX1 | - | IX1 | + | RX2 | + ...
        ; over eight baud times
35
        baud_loop:
        ; do first order baud loop every 8 baud times
                mov     ax,baud_count
                and     ax,7h
40              jnz     baud_loop2 cmp     baud_sum,0
                mov     ax,160
                jns     shorten
45              neg     ax
        shorten:
                add     baud_x,ax mov     ax,baud_sum
50              mov     baud_sum,0
```

```
            sar     ax,7                    ; /128
            add     loop2_int,ax
            jns     check_upper
            cmp     loop2_int,0f200h
  5         jge     baud_loop2
            mov     loop2_int,0f200h
            jmp     short baud_loop2
    check_upper:
            cmp     loop2_int,0f00h
 10         jl      baud_loop2
            mov     loop2_int,0effh baud_loop2:
            dec     loop2_cnt
 15         jnz     equalizer_output mov     ax,loop2_int
            or      ax,ax                   ; set sign bit
            js      add_time
 20         cmp     ax,0ffh
            jle     get_new_count
            add     baud_x,160
            jmp     short get_new_count 25 add_time:
            sub     baud_x,160
            neg     ax get_new_count:
 30         xor     bh,bh
            mov     bl,ah
            mov     al,baud_loop2_table[bx]
            mov     loop2_cnt,al 35 equalizer_output:
    ;****************************************************
    ;*
    ;*      equalizer update ( calculate rzn + j izn )
    ;*
 40 ;*      rzn = ( rx * rw ) - ( ix * iw ) summed over all taps
    ;*      izn = ( rx * iw ) + ( ix * rw )
    ;*
    ;****************************************************
            mov     bx,equalizer_in
 45         lea     si,real_taps ; CALCULATE ( REAL EQUALIZER DELAY 0 - 13 ) * ( REAL TAP 0 - 13 )
            lodsw                           ; rtap0
            imul    word ptr eqr_delay[bx-2]
 50         mov     cx,dx
```

```
        lodsw                   ; rtap1
        imul    word ptr eqr_delay[bx-4]
        add     cx,dx
        lodsw                   ; rtap2
5       imul    word ptr eqr_delay[bx-6]
        add     cx,dx
        lodsw                   ; rtap3
        imul    word ptr eqr_delay[bx-8]
        add     cx,dx
10      lodsw                   ; rtap4
        imul    word ptr eqr_delay[bx-10]
        add     cx,dx
        lodsw                   ; rtap5
        imul    word ptr eqr_delay[bx-12]
15      add     cx,dx
        lodsw                   ; rtap6
        imul    word ptr eqr_delay[bx-14]
        add     cx,dx
        lodsw                   ; rtap7
20      imul    word ptr eqr_delay[bx-16]
        add     cx,dx
        lodsw                   ; rtap8
        imul    word ptr eqr_delay[bx-18]
        add     cx,dx
25      lodsw                   ; rtap9
        imul    word ptr eqr_delay[bx-20]
        add     cx,dx
        lodsw                   ; rtap10
        imul    word ptr eqr_delay[bx-22]
30      add     cx,dx
        lodsw                   ; rtap11
        imul    word ptr eqr_delay[bx-24]
        add     cx,dx
        lodsw                   ; rtap12
35      imul    word ptr eqr_delay[bx-26]
        add     cx,dx
        lodsw                   ; rtap13
        imul    word ptr eqr_delay[bx-28]
        add     cx,dx
40

; CALCULATE ( IMAGINARY EQUALIZER DELAY 0 - 13 ) * ( IMAGINARY TAP 0 - 13 )
; si already pointing to the imaginary taps
        lodsw                   ; itap0
45      imul    word ptr eqi_delay[bx-2]
        sub     cx,dx
        lodsw                   ; itap1
        imul    word ptr eqi_delay[bx-4]
        sub     cx,dx
50      lodsw                   ; itap2
```

```
        imul  word ptr eqi_delay[bx-6]
        sub   cx,dx
        lodsw                       ; itap3
        imul  word ptr eqi_delay[bx-8]
 5      sub   cx,dx
        lodsw                       ; itap4
        imul  word ptr eqi_delay[bx-10]
        sub   cx,dx
        lodsw                       ; itap5
10      imul  word ptr eqi_delay[bx-12]
        sub   cx,dx
        lodsw                       ; itap6
        imul  word ptr eqi_delay[bx-14]
        sub   cx,dx
15      lodsw                       ; itap7
        imul  word ptr eqi_delay[bx-16]
        sub   cx,dx
        lodsw                       ; itap8
        imul  word ptr eqi_delay[bx-18]
20      sub   cx,dx
        lodsw                       ; itap9
        imul  word ptr eqi_delay[bx-20]
        sub   cx,dx
        lodsw                       ; itap10
25      imul  word ptr eqi_delay[bx-22]
        sub   cx,dx
        lodsw                       ; itap11
        imul  word ptr eqi_delay[bx-24]
        sub   cx,dx
30      lodsw                       ; itap12
        imul  word ptr eqi_delay[bx-26]
        sub   cx,dx
        lodsw                       ; itap13
        imul  word ptr eqi_delay[bx-28]
35      sub   cx,dx sal   cx,2                  ; adjust for the multiply plus 1/2 tap
        mov   rzn,cx 40      lea   si,real_taps ; CALCULATE ( IMAGINARY equalIZER DELAY 0 - 13 ) * ( REAL TAP 0 - 13 )
        lodsw                       ; rtap0
        imul  word ptr eqi_delay[bx-2]
45      mov   cx,dx
        lodsw                       ; rtap1
        imul  word ptr eqi_delay[bx-4]
        add   cx,dx
        lodsw                       ; rtap2
50      imul  word ptr eqi_delay[bx-6]
```

```
        add     cx,dx
        lodsw                           ; rtap3
        imul    word ptr eqi_delay[bx-8]
        add     cx,dx
        lodsw                           ; rtap4
        imul    word ptr eqi_delay[bx-10]
        add     cx,dx
        lodsw                           ; rtap5
        imul    word ptr eqi_delay[bx-12]
        add     cx,dx
        lodsw                           ; rtap6
        imul    word ptr eqi_delay[bx-14]
        add     cx,dx
        lodsw                           ; rtap7
        imul    word ptr eqi_delay[bx-16]
        add     cx,dx
        lodsw                           ; rtap8
        imul    word ptr eqi_delay[bx-18]
        add     cx,dx
        lodsw                           ; rtap9
        imul    word ptr eqi_delay[bx-20]
        add     cx,dx
        lodsw                           ; rtap10
        imul    word ptr eqi_delay[bx-22]
        add     cx,dx
        lodsw                           ; rtap11
        imul    word ptr eqi_delay[bx-24]
        add     cx,dx
        lodsw                           ; rtap12
        imul    word ptr eqi_delay[bx-26]
        add     cx,dx
        lodsw                           ; rtap13
        imul    word ptr eqi_delay[bx-28]
        add     cx,dx ; CALCULATE ( REAL EQUALIZER DELAY 0 - 13 ) * ( IMAGINARY TAP 0 - 13 )
; si already pointing to the imaginary taps
        lodsw                           ; itap0
        imul    word ptr eqr_delay[bx-2]
        add     cx,dx
        lodsw                           ; itap1
        imul    word ptr eqr_delay[bx-4]
        add     cx,dx
        lodsw                           ; itap2
        imul    word ptr eqr_delay[bx-6]
        add     cx,dx
        lodsw                           ; itap3
        imul    word ptr eqr_delay[bx-8]
        add     cx,dx
```

```
            lodsw                       ; itap4
            imul    word ptr eqr_delay[bx-10]
            add     cx,dx
            lodsw                       ; itap5
            imul    word ptr eqr_delay[bx-12]
            add     cx,dx
            lodsw                       ; itap6
            imul    word ptr eqr_delay[bx-14]
            add     cx,dx
            lodsw                       ; itap7
            imul    word ptr eqr_delay[bx-16]
            add     cx,dx
            lodsw                       ; itap8
            imul    word ptr eqr_delay[bx-18]
            add     cx,dx
            lodsw                       ; itap9
            imul    word ptr eqr_delay[bx-20]
            add     cx,dx
            lodsw                       ; itap10
            imul    word ptr eqr_delay[bx-22]
            add     cx,dx
            lodsw                       ; itap11
            imul    word ptr eqr_delay[bx-24]
            add     cx,dx
            lodsw                       ; itap12
            imul    word ptr eqr_delay[bx-26]
            add     cx,dx
            lodsw                       ; itap13
            imul    word ptr eqr_delay[bx-28]
            add     cx,dx sal     cx,2                ; adjust for the multiply
            mov     izn,cx phase_rotation:
;****************************************************
;*
;*      phase rotation
;*
;*      rym = ( rzn * cosphi ) - ( izn * sinphi )
;*      iym = ( rzn * sinphi ) + ( izn * cosphi )
;*
;****************************************************
            mov     ax,rzn
            imul    cosine
            mov     bx,dx
            mov     ax,izn
            imul    sine
            sub     bx,dx
            sal     bx,2                ; sine and cosine are 1/2 scale
```

```
            mov     rym,bx mov     ax,rzn
            imul    sine
    5       mov     bx,dx
            mov     ax,izn
            imul    cosine
            add     bx,dx
            sal     bx,2        ; sine and cosine are 1/2 scale
    10      mov     iym,bx ;*****************************************************
        ;*
        ;*   derive the error vector and the v22 point
    15  ;*
        ;*   error vector --- r_error + j i_error
        ;*   v22 point    --- dec_r  + j dec_i
        ;*
        ;*****************************************************
    20      xor     bx,bx
            mov     ax,rym
            test    recv_flags,bl
            jnz     decision_2400
            jmp     decision_1200
    25
        decision_2400:
            or      ax,ax
            js      r_negative_24

30      mov     bl,2
            cmp     ax,( 44 * 256 )
            jge     big_positive_24

; real is less than 44
    35      sub     ax,( 22 * 256 )
            mov     r_error,ax mov     dec_r,( 22 * 256 )
            jmp     short i_decision
    40
        big_positive_24:
        ; real is above 44
            sub     ax,( 66 * 256 )
            mov     r_error,ax
    45
            mov     dec_r,( 66 * 256 )
            inc     bx
            jmp     short i_decision 50  r_negative_24:
```

```
        xor     bl,bl
        cmp     ax,( -44 * 256 )
        jle     big_negative_24 add     ax,( 22 * 256 )
        mov     r_error,ax mov     dec_r,( -22 * 256 )
        inc     bx
        jmp     short i_decision big_negative_24:
        add     ax,( 66 * 256 )
        mov     r_error,ax mov     dec_r,( -66 * 256 )

i_decision:
        mov     ax,iym or      ax,ax
        js      i_negative_24 cmp     ax,( 44 * 256 )
        jge     imag_big

; imaginary is less than 44
        sub     ax,( 22 * 256 )
        mov     i_error,ax mov     dec_i,( 22 * 256 )
        or      bl,8
        jmp     short read_decision imag_big:
; real is above 44
        sub     ax,( 66 * 256 )
        mov     i_error,ax mov     dec_i,( 66 * 256 )
        or      bl,0ch
        jmp     short read_decision i_negative_24:
        cmp     ax,( -44 * 256 )
        jle     imag_lil add     ax,( 22 * 256 )
        mov     i_error,ax
```

```
                mov     dec_i,( -22 * 256 )
                or      bl,4
                jmp     short read_decision imag_lil:
                add     ax,( 66 * 256 )
                mov     i_error,ax mov     dec_i,( -66 * 256 )
                jmp     short read_decision decision_1200:
                or      ax,ax
                js      r_neg_1200 sub     ax,( 49 * 256 )
                mov     r_error,ax mov     dec_r,( 49 * 256 )
                mov     bl,3
                jmp     short i_1200 r_neg_1200:
                add     ax,( 49 * 256 )
                mov     r_error,ax mov     dec_r,( -49 * 256 )
                xor     bl,bl i_1200:
                mov     ax,iym
                or      ax,ax
                js      i_neg_1200 sub     ax,( 49 * 256 )
                mov     i_error,ax mov     dec_i,( 49 * 256 )
                or      bl,0ch
                jmp     short read_decision i_neg_1200:
                add     ax,( 49 * 256 )
                mov     i_error,ax mov     dec_i,( -49 * 256 )

read_decision:
                mov     al,decision_table[bx]
                mov     recv_data,al
```

100

```
;***************************************************
;*
;*    counter rotate the error vector and multiply
;*    by alpha
;*
;*    equation = alpha * (( r_error + j i_error ) * ( cosphi - j sinphi))
;*
;*    aren = alpha * (( r_error * cosphi ) + ( i_error * sinphi ))
;*    aien = alpha * (( i_error * cosphi ) - ( r_error * sinphi ))
;*
;***************************************************
        mov     cx,alpha            ; CX = alpha mov     ax,r_error
        imul    cosine
        mov     bx,dx
        mov     ax,i_error
        imul    sine
        add     bx,dx
        sal     bx,1
        mov     ax,bx
        imul    cx
        sal     dx,1
        mov     aren,dx mov     ax,i_error
        imul    cosine
        mov     bx,dx
        mov     ax,r_error
        imul    sine
        sub     bx,dx
        sal     bx,1
        mov     ax,bx
        imul    cx
        sal     dx,1
        mov     aien,dx ;***************************************************
;*
;*    tap update loop
;*
;*    equation = rw - (( rx * aren ) + ( ix * aien ))
;*               iw - (( rx * aien ) - ( ix * aren ))
;*
;***************************************************

; SI = Real delay line
; DI = Imaginary delay line
; BX = aren
; CX = aien
```

```
            mov     ax,baud_count
            and     ax,0fh
            jz      bleed
            jmp     do_tap_update
    bleed:
            push    ds
            pop     es
            lea     si,real_taps
            mov     di,si
            mov     bl,0f8h
            mov     bh,04h REPT 28
            bleed_tap
        ENDM
            jmp     rotate do_tap_update:
            mov     cx,aien
            mov     bx,aren
            mov     si,equalizer_in
            mov     di,si
            add     si,offset eqr_delay
            add     di,offset eqi_delay ; real tap 0
            mov     ax,ds:[si-2]            ; eqr
            imul    bx                      ; * aren
            mov     bp,dx
            mov     ax,ds:[di-2]            ; eqi
            imul    cx                      ; * aien
            add     dx,bp
            sal     dx,1
            sub     real_taps[0],dx ; real tap 1
            mov     ax,ds:[si-4]            ; eqr
            imul    bx                      ; * aren
            mov     bp,dx
            mov     ax,ds:[di-4]            ; eqi
            imul    cx                      ; * aien
            add     dx,bp
            sal     dx,1
            sub     real_taps[2],dx ; real tap 2
            mov     ax,ds:[si-6]            ; eqr
            imul    bx                      ; * aren
            mov     bp,dx
```

102

```
        mov     ax,ds:[di-6]          ; eqi
        imul    cx                    ; * aien
        add     dx,bp
        sal     dx,1
        sub     real_taps[4],dx ; real tap 3
        mov     ax,ds:[si-8]          ; eqr
        imul    bx                    ; * aren
        mov     bp,dx
        mov     ax,ds:[di-8]          ; eqi
        imul    cx                    ; * aien
        add     dx,bp
        sal     dx,1
        sub     real_taps[6],dx ; real tap 4
        mov     ax,ds:[si-10]         ; eqr
        imul    bx                    ; * aren
        mov     bp,dx
        mov     ax,ds:[di-10]         ; eqi
        imul    cx                    ; * aien
        add     dx,bp
        sal     dx,1
        sub     real_taps[8],dx ; real tap 5
        mov     ax,ds:[si-12]         ; eqr
        imul    bx                    ; * aren
        mov     bp,dx
        mov     ax,ds:[di-12]         ; eqi
        imul    cx                    ; * aien
        add     dx,bp
        sal     dx,1
        sub     real_taps[10],dx ; real tap 6
        mov     ax,ds:[si-14]         ; eqr
        imul    bx                    ; * aren
        mov     bp,dx
        mov     ax,ds:[di-14]         ; eqi
        imul    cx                    ; * aien
        add     dx,bp
        sal     dx,1
        sub     real_taps[12],dx ; real tap 7
        mov     ax,ds:[si-16]         ; eqr
        imul    bx                    ; * aren
        mov     bp,dx
```

```
        mov     ax,ds:[di-16]           ; eqi
        imul    cx                      ; * aien
        add     dx,bp
        sal     dx,1
        sub     real_taps[14],dx ; real tap 8
        mov     ax,ds:[si-18]           ; eqr
        imul    bx                      ; * aren
        mov     bp,dx
        mov     ax,ds:[di-18]           ; eqi
        imul    cx                      ; * aien
        add     dx,bp
        sal     dx,1
        sub     real_taps[16],dx ; real tap 9
        mov     ax,ds:[si-20]           ; eqr
        imul    bx                      ; * aren
        mov     bp,dx
        mov     ax,ds:[di-20]           ; eqi
        imul    cx                      ; * aien
        add     dx,bp
        sal     dx,1
        sub     real_taps[18],dx ; real tap 10
        mov     ax,ds:[si-22]           ; eqr
        imul    bx                      ; * aren
        mov     bp,dx
        mov     ax,ds:[di-22]           ; eqi
        imul    cx                      ; * aien
        add     dx,bp
        sal     dx,1
        sub     real_taps[20],dx comment !
; real tap 11
        mov     ax,ds:[si-24]           ; eqr
        imul    bx                      ; * aren
        mov     bp,dx
        mov     ax,ds:[di-24]           ; eqi
        imul    cx                      ; * aien
        add     dx,bp
        sal     dx,1
        sub     real_taps[22],dx ; real tap 12
        mov     ax,ds:[si-26]           ; eqr
        imul    bx                      ; * aren
```

```
            mov     bp,dx
            mov     ax,ds:[di-26]           ; eqi
            imul    cx                      ; * aien
            add     dx,bp
    sal     dx,1
            sub     real_taps[24],dx ; real tap 13
            mov     ax,ds:[si-28]           ; eqr
            imul    bx                      ; * aren
            mov     bp,dx
            mov     ax,ds:[di-28]           ; eqi
            imul    cx                      ; * aien
            add     dx,bp
            sal     dx,1
            sub     real_taps[26],dx
            !

; Process the imaginary taps
    ;               iw - (( rx * aien ) - ( ix * aren ))

; imaginary tap 0
            mov     ax,ds:[di-2]            ; eqi
            imul    bx                      ; * aren
            mov     bp,dx
            mov     ax,ds:[si-2]            ; eqr
            imul    cx                      ; * aien
            sub     dx,bp
            sal     dx,1
            sub     imaginary_taps[0],dx ; imaginary tap 1
            mov     ax,ds:[di-4]            ; eqi
            imul    bx                      ; * aren
            mov     bp,dx
            mov     ax,ds:[si-4]            ; eqr
            imul    cx                      ; * aien
            sub     dx,bp
            sal     dx,1
            sub     imaginary_taps[2],dx ; imaginary tap 2
            mov     ax,ds:[di-6]            ; eqi
            imul    bx                      ; * aren
            mov     bp,dx
            mov     ax,ds:[si-6]            ; eqr
            imul    cx                      ; * aien
            sub     dx,bp
            sal     dx,1
            sub     imaginary_taps[4],dx
```

105

```
; imaginary tap 3
        mov     ax,ds:[di-8]            ; eqi
        imul    bx                      ; * aren
        mov     bp,dx
        mov     ax,ds:[si-8]            ; eqr
        imul    cx                      ; * aien
        sub     dx,bp
        sal     dx,1
        sub     imaginary_taps[6],dx ; imaginary tap 4
        mov     ax,ds:[di-10]           ; eqi
        imul    bx                      ; * aren
        mov     bp,dx
        mov     ax,ds:[si-10]           ; eqr
        imul    cx                      ; * aien
        sub     dx,bp
        sal     dx,1
        sub     imaginary_taps[8],dx ; imaginary tap 5
        mov     ax,ds:[di-12]           ; eqi
        imul    bx                      ; * aren
        mov     bp,dx
        mov     ax,ds:[si-12]           ; eqr
        imul    cx                      ; * aien
        sub     dx,bp
        sal     dx,1
        sub     imaginary_taps[10],dx ; imaginary tap 6
        mov     ax,ds:[di-14]           ; eqi
        imul    bx                      ; * aren
        mov     bp,dx
        mov     ax,ds:[si-14]           ; eqr
        imul    cx                      ; * aien
        sub     dx,bp
        sal     dx,1
        sub     imaginary_taps[12],dx ; imaginary tap 7
        mov     ax,ds:[di-16]           ; eqi
        imul    bx                      ; * aren
        mov     bp,dx
        mov     ax,ds:[si-16]           ; eqr
        imul    cx                      ; * aien
        sub     dx,bp
        sal     dx,1
        sub     imaginary_taps[14],dx
```

106

```
;   imaginary tap 8
        mov     ax,ds:[di-18]           ; eqi
        imul    bx                      ; * aren
        mov     bp,dx
        mov     ax,ds:[si-18]           ; eqr
        imul    cx                      ; * aien
        sub     dx,bp
        sal     dx,1
        sub     imaginary_taps[16],dx ;   imaginary tap 9
        mov     ax,ds:[di-20]           ; eqi
        imul    bx                      ; * aren
        mov     bp,dx
        mov     ax,ds:[si-20]           ; eqr
        imul    cx                      ; * aien
        sub     dx,bp
        sal     dx,1
        sub     imaginary_taps[18],dx ;   imaginary tap 10
        mov     ax,ds:[di-22]           ; eqi
        imul    bx                      ; * aren
        mov     bp,dx
        mov     ax,ds:[si-22]           ; eqr
        imul    cx                      ; * aien
        sub     dx,bp
        sal     dx,1
        sub     imaginary_taps[20],dx comment     !
;   imaginary tap 11
        mov     ax,ds:[di-24]           ; eqi
        imul    bx                      ; * aren
        mov     bp,dx
        mov     ax,ds:[si-24]           ; eqr
        imul    cx                      ; * aien
        sub     dx,bp
        sal     dx,1
        sub     imaginary_taps[22],dx ;   imaginary tap 12
        mov     ax,ds:[di-26]           ; eqi
        imul    bx                      ; * aren
        mov     bp,dx
        mov     ax,ds:[si-26]           ; eqr
        imul    cx                      ; * aien
        sub     dx,bp
        sal     dx,1
        sub     imaginary_taps[24],dx
```

```
; imaginary tap 13
        mov     ax,ds:[di-28]           ; eqi
        imul    bx                      ; * aren
        mov     bp,dx
        mov     ax,ds:[si-28]           ; eqr
        imul    cx                      ; * aien
        sub     dx,bp
        sal     dx,1
        sub     imaginary_taps[26],dx
        !

;*****************************************************
;*
;*      rotate the imaginary eye to the real plane
;*
;*      equation = ( rym + j iym ) * ( dec_r - j dec_i )
;*      ierr = j (( iym * dec_r ) - ( rym * dec_i )) * 2
;*
;*****************************************************
rotate:
; IERR is used in the phase corrector
        mov     ax,iym
        imul    dec_r
        mov     bx,dx
        mov     ax,rym
        imul    dec_i
        sub     bx,dx
        sal     bx,2            ; adjust for the multiply and add a gain of 2
        mov     ierr,bx ;*********************************************************************
*
;*
;*      new phase corrector (carrier pll update) aln 9/23/88
;*
;*      equations:
;*              phcor = phcor + (ierr * Cbetal)
;*              phi = phi + (phcor*Cbeta2 + ierr*Calpha)
;*         Cbetal= input coefficient to loop's 2nd order integrator
;*         Cbeta2= output coefficent of 2nd int for frequency lock limit
;*         Calpha= 1st order loop coefficent. 2nd order term is not nested
;*         inside 1st order term in this configuration.
;*         NOTE: Cbetal and Calpha must be negative values for stable loop
;*********************************************************************
* phase_update:
;* for V.22bis mode only. loop parameters can be determined with PLL2.BAS
;* current choices for variables are:
```

```
            mov     ax,Cbetal
            imul    bx              ; ierr * Cbetal
            sal     dx,1
            add     phase_corr,dx   ; phase_corr + ( ierr * Cbetal )
    5       mov     ax,Calpha
            imul    bx              ; ierr * Calpha
            mov     bx,dx
            mov     ax,Cbeta2
            imul    phase_corr      ; phase_corr * Cbeta2
    10      add     bx,dx
            sal     bx,1
            add     bx,phi
            mov     phi,bx 15  ; sine and cosine routine
            mov     bl,bh
            xor     bh,bh
            sal     bx,1
            mov     ax,cosine_table[bx]
    20      mov     cx,sine_table[bx]
            sar     ax,1
            mov     cosine,ax
            sar     cx,1
            mov     sine,cx
    25
    ;*********************************************************************
    *
    ;*********************************************************************
    *
    30
    sl_detect:
            mov     bx,equalizer_in
            mov     ax,eqr_delay[bx-2]   ; z0
            sub     ax,eqr_delay[bx-10]  ; z4
    35      jns     band_pass_pos
            neg     ax
    band_pass_pos:
            sub     ax,(20 * 256)
            js      add_one
    40      sub     sl_counter,4
            jns     data_decode
            mov     sl_counter,0
    add_one:
            inc     sl_counter
    45      cmp     sl_counter,20
            jl      data_decode
            mov     sl_counter,20
            or      recv_flags,b4
```

```
;**********************************************************************
*
;**********************************************************************
* data_decode:
; do differential decode
        xor     ax,ax
        mov     al,recv_data
        ror     ax,2
        mov     bl,al           ; save top two bits
        sub     al,prev_y3y2
        mov     prev_y3y2,bl
; gray decode
        test    al,bl
        jnz     no_gray
        xor     al,1
no_gray:
        and     al,3 test    recv_flags,b2       ; is there 1200 baud data from
        jnz     combine_1200_data ; the prev.baud time rol     ax,2                ; restore bl,b0 test    recv_flags,b1       ; are we at 2400 baud?
        jnz     descramble_4 and     al,0ch
        mov     data_1200,al
        or      recv_flags,4
        jmp     equalizer_full_check combine_1200_data:
        and     recv_flags,0fffbh
        or      al,data_1200
        xor     ah,ah
descramble_4:
        mov     bx,ax
        xor     dx,dx
        mov     al,reverse_table[bx]    ; put oldest bit in ax.0
        mov     dh,al           ; save for delay line
        mov     bx,descram_1_17
        xor     ax,bx
        shr     bx,3
        xor     ax,bx
        shr     bx,1
        or      bh,descram_0
        and     ax,0fh              ; descrambled data
        rol     dx,5                ; dx.0 is the last bit
```

```
                and     bx,1fffh
                or      bh,dh
                mov     descram_1_17,bx
                mov     descram_0,0
        test    dx,b0
                jz      no_bit_0
                mov     descram_0,10h
        no_bit_0:
                comment    !
                cmp     al,09h
                jg      hex_nums
                or      al,30h
                jmp     short print_it
        hex_nums:
                sub     al,0ah
                add     al,'A'
        print_it:
                mov     dl,al
                mov     ah,02h
                int     21h
                !

receive_parser:
                cmp     r_parse_jmp,0
                je      check_for_start mov     bx,r_parse_jmp
                jmp     bx check_for_start:
                cmp     ax,0fh
                jne     got_start_bit
                jmp     equalizer_full_check got_start_bit:
                mov     r_parse_data,ax
                mov     r_parse_jmp,offset parse_8
                jmp     equalizer_full_check parse_8:
                shl     ax,4
                or      r_parse_data,ax
                mov     r_parse_jmp,offset parse_12
                jmp     equalizer_full_check parse_12:
                mov     r_parse_jmp,0       ; default
                shl     ax,8
                or      ax,r_parse_data     ; last three baud times of data
                mov     cx,3                ; number of bits left in the high nybble
```

```
                shr     ax,1
                jnc     got_start
                dec     cx
                shr     ax,1
        5       jnc     got_start
                dec     cx
                shr     ax,1
                jnc     got_start
                shr     ax,1
       10       dec     cx
        got_start:                      ; the parsed character is in al
                mov     di,rx_char_in
                mov     es,ds_segment
                stosb
       15       cmp     di,offset rx_char_buf_end
                jne     no_rollover
                mov     di,offset rx_char_buf_start
        no_rollover:
                cmp     di,rx_char_out    ; is the buffer full
       20       je      no_update
                mov     rx_char_in,di
        no_update:
                jcxz    equalizer_full_check
                dec     cx
       25       jcxz    test_one_bit
                dec     cx
                jcxz    test_two_bits
        test_three_bits:
                test    ah,1h
       30       jz      insert_bit
                test    ah,2h
                jz      insert_bit        ; AH = xxxxxd01
                test    ah,4h
                jnz     equalizer_full_check
       35   insert_bit:
                shl     ah,1              ; AH = xxxxxdd0
                or      ah,1h
                mov     al,ah
                xor     ah,ah
       40       mov     r_parse_data,ax
                mov     r_parse_jmp,offset parse_8
                jmp     equalizer_full_check test_one_bit:
       45       test    ah,1h
                jnz     equalizer_full_check
                mov     r_parse_data,07h  ; AH = xxxxxxx0
                mov     r_parse_jmp,offset parse_8
                jmp     short equalizer_full_check
       50
```

```
test_two_bits:
        test    ah,1h
        jz      insert_two_bits         ; AH = xxxxxxd0
        test    ah,2h
        jnz     equalizer_full_check
                                        ; AH = xxxxxx01
insert_two_bits:
        shl     ah,2
        or      ax,3h
        mov     al,ah
        xor     ah,ah
        mov     r_parse_data,ax
        mov     r_parse_jmp,offset parse_8 equalizer_full_check:
        cmp     equalizer_in,( equalizer_length * 2 )
        jne     not_full ; shift the last eight samples in the equalizer delay line to the beginning
; and reset the input pointer.

mov     es,ds_segment
        mov     di,offset eqr_delay
;       mov     si,offset ( eqr_end - 16 )
        mov     si,offset ( eqr_end - 24 )
        mov     cx,12
        rep     movsw mov     di,offset eqi_delay
;       mov     si,offset ( eqi_end - 16 )
        mov     si,offset ( eqi_end - 24 )
        mov     cx,12
        rep     movsw mov     equalizer_in,24 not_full:
        jmp     equalizer_buf_check

DEMOD ENDP
;
;%%%%%%%%%%%%%%%%%%%%%%%%%%%%%%%%%%%%%%%%%%%%%%%%%%
;
INIT_RECV       PROC    NEAR mov     agc_average,0
        mov     agc_speed,3h            ; 4 baud times
        mov     equalizer_in,24         ; 12 into the delay line at start
        mov     rx_out,0
        mov     rx_in,0
```

```
        mov    delay_ptr,0
        mov    alpha,1000h mov    recv_sample_count,16
        mov    processed_cnt,24
        mov    energy_threshold,receive_high_thresh
        test   recv_flags,b0
        jnz    clr_taps
        mov    recv_sample_count,8
        mov    processed_cnt,12
        mov    energy_threshold,receive_low_thresh
clr_taps:
; clear the taps
        push   ds
        pop    es
        lea    di,real_taps
        mov    cx,28
        xor    ax,ax
        rep    stosw mov    baud_count,ax ; zero the baud loop out
        mov    baud_sum,ax
        mov    loop2_int,ax
        mov    loop2_cnt,10
        mov    buffer_in,ax
        mov    buffer_out,ax
        mov    interp_a1,ax
        mov    interp_a0,7fffh
        mov    quad_count,32
        mov    baudlp_vector,offset save_s1 mov    dbox_routine,offset send_eye
        mov    tap_offset,10
;       mov    dbox_routine,offset tap_routine
        mov    real_taps+12,0100000000000000b    ; center tap to 1/2 mov    rx_char_in,offset rx_char_buf
        mov    rx_char_out,offset rx_char_buf mov    r_parse_jmp,0 ret

INIT_RECV   ENDP
;
;*********************************************
;
DBOX_ROUTINES    PROC    NEAR
```

```
send_eye:
        mov     ax,rym
        mov     bx,iym
        ret
equ_in0:
        mov     bx,equalizer_in
        mov     ax,eqr_delay[bx-2]
        mov     bx,eqi_delay[bx-2]
        ret equ_in1:
        mov     bx,equalizer_in
        mov     ax,eqr_delay[bx-4]
        mov     bx,eqi_delay[bx-4]
        ret tap_routine:
        mov     bx,tap_offset
        mov     ax,real_taps[bx]
        mov     bx,imaginary_taps[bx]
        ret sl_routine:
        mov     bx,aien
        sal     bx,6
        mov     ax,aren
        sal     ax,6
;       mov     ah,al
        ret p_routine:
        mov     bx,interp_al
        mov     ax,baud_count
        mov     ah,al
        ret phi_routine:
        mov     bx,sine
        mov     ax,cosine
        ret baud_loop1_routine:
        mov     bx,baud_sum
        sal     bx,3
        mov     ax,baud_count
        mov     ah,al
        ret baud_loop2_routine:
```

```
                mov     bx,loop2_int
                sal     bx,2
                mov     ax,baud_count
                mov     ah,al
 5              ret send_temp:
                mov     ax,temp_x
                mov     bx,temp_y
10              ret baud_loop_routine:
                mov     bx,equalizer_in
                mov     bx,eqr_delay[bx-2]
15              mov     ax,baud_count
                mov     ah,al
                ret DBOX_ROUTINES   ENDP
20      ;
        ;%%%%%%%%%%%%%%%%%%%%%%%%%%%%%%%%%%%%%%%%%%%%%%%%
        ;
        DBOX_ADDRESS    PROC    NEAR 25              mov     al,vid_mode ; restore the initial video mode
                mov     ah,0
                int     10h mov     dx,offset eye_menu
30              mov     ah,09h
                int     21h get_key_in:
                mov     ah,0            ; get a key
35              int     16h cmp     al,31h
                jne     chk_2

40              mov     dbox_routine,offset send_eye
                jmp     address_done chk_2:
                cmp     al,32h
45              jne     chk_3 mov     dbox_routine,offset equ_in0
                jmp     short address_done 50      chk_3:
```

116

```
        cmp     al,33h
        jne     chk_4 mov     dbox_routine,offset equ_in1
        jmp     short address_done chk_4:
        cmp     al,34h
        jne     chk_5
get_again:
        mov     ah,09
        mov     dx,offset tap_question
        int     21h mov     ah,0
        int     16h mov     ah,'0'
        cmp     al,'0'
        jl      get_again
        cmp     al,'9'+1
        jb      got_num
        and     al,0dfh             ; convert to upper case
        cmp     al,'A'
        jb      get_again
        cmp     al,'D'
        ja      get_again
        mov     ah,'A'-10 got_num:
        sub     al,ah
        sal     al,1
        xor     ah,ah
        mov     tap_offset,ax mov     dbox_routine,offset tap_routine
        jmp     short address_done chk_5:
        cmp     al,35h
        jne     chk_6
        mov     dbox_routine,offset sl_routine
        jmp     short address_done chk_6:
        cmp     al,36h
        jne     chk_7
        mov     dbox_routine,offset p_routine
        jmp     short address_done
```

```
chk_7:
        cmp     al,37h
        jne     chk_8 mov     dbox_routine,offset phi_routine
        jmp     short address_done chk_8:
        cmp     al,38h
        jne     chk_9 mov     dbox_routine,offset baud_loop1_routine
        jmp     short address_done chk_9:
        cmp     al,39h
        je      send_loop2
        jmp     get_key_in
send_loop2:
        mov     dbox_routine,offset baud_loop2_routine address_done:
        call    init_dbox ret

DBOX_ADDRESS    ENDP
        END

.model small
        .286

;%%%%%%%%%%%%%%%%%%%%%%%%%%%%%%%%%%%%%%%%%%%%%%%%%
;
;       DBOX --- Display box routines
;
;       DBOX initializes the screen to 640 X 350 graphics mode and
;       draws a picture of an oscilloscope display.  The routine plot_point
;       is then used to place a point on the oscilloscope.
;
;%%%%%%%%%%%%%%%%%%%%%%%%%%%%%%%%%%%%%%%%%%%%%%%%% include         equates
BLACK           equ     0
BLUE            equ     1
GREEN           equ     2
CYAN            equ     3
RED             equ     4
```

```
        MAGENTA             equ    5
        BROWN       equ     6
        LIGHTGRAY   equ     7
        DARKGRAY    equ     8
5       LIGHTBLUE   equ     9
        LIGHTGREEN  equ     10
        LIGHTCYAN   equ     11
        LIGHTRED    equ     12
        LIGHTMAGENTA        equ    13
10      YELLOW              equ    14
        WHITE       equ     15 public      init_dbox,plot_point,x,y 15
        set_color   macro new_color push    ax
                push    dx
20              mov     dx,3ceh             ; clear mode 0 using set/reset
                xor     al,al
                mov     ah,new_color        ; init SET/RESET to color
                out     dx,ax
                pop     dx
25              pop     ax endm 30      scope_point struc
        center              dw      0ffffh
        xy          dw      0               ; the point
        bit_position        db      0

35      center_lg   db      0               ; light gray
        up_lg       db      0
        down_lg             db      0
        side_center_lg      db      0
        side_up_lg  db      0
40      side_down_lg        db      0 center_dg   db      0               ; dark gray
        up_dg       db      0
        down_dg             db      0
45      side_center_dg      db      0
        side_up_dg  db      0
        side_down_dg        db      0 center_b    db      0               ; blue
50      up_b        db      0
```

```
        down_b              db      0
        side_center_b       db      0
        side_up_b    db     0
        side_down_b  db     0 scope_point ends

.data color        db     ?

; defines the display box
        left         dw     ?
        top          dw     ?
        right        dw     ?
        bottom              dw      ?
        vert_top     dw     ?
        vert_dif     dw     ?

; x = horizontal point  y = vertical
        x            db     ?
        y            db     ?

delta_x             db     ?
        delta_y             db     ?
        point_ptr    dw     ?

point0              scope_point <>
        point1              scope_point <>
        point2              scope_point <>
        point3              scope_point <>
        point4              scope_point <>
        point5              scope_point <>
        point6              scope_point <>
        point7              scope_point <> dbox_menu_start     label byte
        dbox_menu    db     ' F1  --- Display Menu',cr,lf
                     db     ' F2  --- Terminal Mode',cr,lf
                     db     ' F10 --- Hangup'
        dbox_menu_end       label byte dbox_label_start    label byte
        dbox_label   db     'SOFTMODEM DISPLAY BOX'
        dbox_label_end      label byte .code
;
;%%%%%%%%%%%%%%%%%%%%%%%%%%%%%%%%%%%%%%%%%%%%%%%
```

```
        ;
        INIT_DBOX   PROC  NEAR mov   cx,8
 5              call  zero_points
                mov   point_ptr,0 call  scope         ; display the oscilloscope

10      ;       mov   dx,3ceh
        ;       mov   ax,1005h
        ;       out   dx,ax mov   dx,3ceh       ; enable set/reset all planes
15              mov   ax,0001h
                out   dx,ax mov   ax,1300h
                mov   bh,0
20              mov   bl,(YELLOW XOR LIGHTGRAY OR 80h )
                mov   cx,dbox_menu_end-dbox_menu_start
                mov   dx,0000h
                push  ds
                pop   es
25              mov   bp,offset dbox_menu
                int   10h mov   cx,dbox_label_end-dbox_label_start
                mov   dx,171dh
30              mov   bp,offset dbox_label
                int   10h mov   dx,3ceh       ; enable set/reset all planes
                mov   ax,0f01h
35              out   dx,ax mov   color,YELLOW
                ret 40      INIT_DBOX   ENDP
        ;
        ;%%%%%%%%%%%%%%%%%%%%%%%%%%%%%%%%%%%%%%%%%%%%%%%%%
        ;
        SQUARE      PROC  NEAR
45
                push  ax
                push  bx
                push  cx
                push  dx
50              push  di
```

```
        mov     dx,3ceh         ; clear mode 0 using set/reset
        xor     al,al
        mov     ah,color        ; init SET/RESET to color
        out     dx,ax mov     bx,top          ; up two from the corner
        sub     bx,2
        mov     ax,80           ; convert top to byte address
        imul    bx mov     di,ax
        mov     ax,left
        shr     ax,3            ; /8
        dec     ax              ; left corner begins one byte earlier
        add     di,ax
        mov     vert_top,di     ; save for double line mov     dx,03ceh        ; enable right two pixels
        mov     ax,0308h
        out     dx,ax ; put in the two pixels that make up the upper left corner of the box
        mov     bl,es:[di]
        stosb
        push    di              ; di is the start of the solid line
        add     di,79           ; go to next line
        mov     bl,es:[di]
; second line
        stosb
        pop     di mov     ax,0ff08h       ; enable all pixels  dx = 03ceh
        out     dx,ax mov     cx,right        ; get the number of bytes across
        sub     cx,left
        shr     cx,3            ; /8
        mov     vert_dif,cx     ; save for double line
        inc     vert_dif push    di
        push    cx
        rep     stosb           ; top line
        pop     cx
        pop     di push    cx
        add     di,80
```

```
        rep     stosb       ; next line
        pop     cx mov     dx,03ceh    ; enable left two pixels
        mov     ax,0c008h
        out     dx,ax ; put in the two pixels that make up the upper right corner of the box
        mov     dl,es:[di]
        stosb
        sub     di,81
        mov     dl,es:[di]
; second line
        stosb mov     bx,bottom
        inc     bx          ; one past the bottom of the box
        mov     ax,80       ; get the bottom left point
        imul    bx
        mov     di,ax
        mov     ax,left
        shr     ax,3
        dec     ax          ; one byte left of the box
        add     di,ax mov     dx,03ceh    ; enable right two pixels
        mov     ax,0308h
        out     dx,ax mov     dl,es:[di]
        stosb
        add     di,79       ; next line
        mov     dl,es:[di]
; second line
        stosb mov     dx,03ceh    ; enable all the pixels
        mov     ax,0ff08h
        out     dx,ax push    di          ; second bottom line
        push    cx
        rep     stosb
        pop     cx
        pop     di sub     di,80       ; second bottom line
        rep     stosb mov     dx,03ceh    ; enable left two pixels
```

```
                mov     ax,0c008h
                out     dx,ax mov     dl,es:[di]
 5              stosb
                add     di,79           ; one line down
                mov     dl,es:[di]
        ; second line
                stosb
10
        ; set up the map mask register to RED and also the set/reset register to reset ; the 0 and 3 planes 15              mov     dx,03ceh        ; enable pixels 1 and 0
                mov     ax,0308h
                out     dx,ax ; to change the pixels to a new color must enable them in
20      ; the MAP MASK register.  Use SET/RESET reg to clear or set the new color.
        ; Use the bit mask to enable the correct bits ;       mov     dx,3c4h         ; set map mask to the three planes
                ;                               ; that need to change
25              ;       mov     ax,0f02h        ; color = 4 ... RED
                ;       out     dx,ax ;       mov     dx,3ceh         ; ENABLE SET/RESET 3 planes that are zero
                ;       mov     ax,0f01h
30              ;       out     dx,ax ;       mov     ah,color
                ;       xor     al,al           ; set the SET/RESET register to clear
                ;       out     dx,ax           ; the enabled planes
35
                add     vert_top,160    ; point to first line under top/left
                mov     di,vert_top
                mov     bx,vert_top
                mov     ax,bottom       ; line count
40              sub     ax,top
                inc     ax
                mov     cx,ax
                add     bx,vert_dif     ; get first line under top/right
                push    cx
45      vert_loop1:
                mov     dl,es:[di]
                mov     es:[di],al
                add     di,80
                loop    vert_loop1
50
```

```
                mov     dx,03ceh        ; change bit mask to the two left bits
                mov     ax,0c008h
                out     dx,ax pop     cx
                mov     al,03h
        vert_loop2:
                mov     dh,es:[bx]
                mov     es:[bx],al
                add     bx,80
                loop    vert_loop2 pop     di
                pop     dx
                pop     cx
                pop     bx
                pop     ax ret SQUARE          ENDP
        ;
        ;$$$$$$$$$$$$$$$$$$$$$$$$$$$$$$$$$$$$$$$$$$$$$$$$$$$
        ;
        HORIZ_LINE  PROC  NEAR push    ax
                push    bx
                push    cx
                push    dx
                push    di mov     dx,03ceh        ; enable all the pixels
                mov     ax,0ff08h
                out     dx,ax mov     ah,color        ; enable SET/RESET to the color
                xor     al,al
                out     dx,ax mov     ax,0f01h        ; enable SET/RESET all planes
                out     dx,ax mov     ax,80           ; convert top to byte address
                imul    top
                mov     di,ax
                mov     ax,left
                shr     ax,3            ; /8
                add     di,ax
```

125

```
                mov     ax,right        ; get the number of bytes across
                sub     ax,left
                shr     ax,3            ; /8
                mov     cx,ax           ; byte count
5
                rep     stosb           ; draw the line pop     di
                pop     dx
10              pop     cx
                pop     bx
                pop     ax ret
15
        HORIZ_LINE  ENDP
        ;
        ;%%%%%%%%%%%%%%%%%%%%%%%%%%%%%%%%%%%%%%%%%%%%%%%%%%
        ;
20      VERT_LINE   PROC    NEAR push    ax
                push    bx
                push    cx
25              push    dx
                push    di mov     dx,03ceh        ; enable the left most pixel
                mov     ax,08008h
30              out     dx,ax mov     ah,color        ; enable SET/RESET to the color
                xor     al,al
                out     dx,ax
35
                mov     ax,0f01h        ; enable SET/RESET all planes
                out     dx,ax mov     ax,80           ; convert top to byte address
40              imul    top
                mov     di,ax
                mov     ax,left
                shr     ax,3
                add     di,ax
45
                mov     cx,bottom       ; get the number of bytes down
                sub     cx,top
                inc     cx 50      vert_loop3:
```

```
            mov     dl,es:[di]
            mov     es:[di],al
            add     di,80
            loop    vert_loop3
 5
            mov     dx,03ceh        ; enable all the pixels
            mov     ax,0ff08h
            out     dx,ax 10          pop     di
            pop     dx
            pop     cx
            pop     bx
            pop     ax
15
            ret VERT_LINE   ENDP
    ;
20  ;%%%%%%%%%%%%%%%%%%%%%%%%%%%%%%%%%%%%%%%%%%%%%%%%%%%
    ;
    SCOPE PROC  NEAR push    ax
25          push    bx
            push    cx
            push    dx
            push    di
            push    es
30
            mov     ax,16           ; 640 x 350 graphics mode
            int     10h mov     dx,0a000h       ; segment for diaplay adapter
35          mov     es,dx ; This routine changes the color of the screen using SET/RESET REGISTERS mov     dx,3ceh         ; enable set/reset all planes
40          mov     ax,0f01h
            out     dx,ax xor     al,al           ; clear mode 0 using set/reset
            mov     ah,LIGHTGRAY
45          out     dx,ax mov     ax,1005h        ; set to mode 0
            out     dx,ax

50  ; CLS
```

```
            xor     di,di
            xor     ax,ax           ; write to each location
            mov     cx,14000
            rep     stosw comment         !
    ; insert a grid
            mov     dx,03ceh        ; enable all the pixels
            mov     ax,08008h
            out     dx,ax mov     ah,RED          ; enable SET/RESET to the color
            xor     al,al
            out     dx,ax mov     ax,0f01h        ; enable SET/RESET all planes
            out     dx,ax mov     cx,28000
            mov     di,0
    vert_loop4:
            mov     dl,es:[di]
            stosb
            loop    vert_loop4
            !

; center the display box on the screen
            mov     left,64
            mov     right,64+512
            mov     top,48
            mov     bottom,48+255 mov     color,BLUE
            call    square mov     bx,bottom
            inc     bx
            sub     bx,top
            shr     bx,3            ; 1/8
            mov     cx,7
            push    top             ; save top for the square
            mov     color,DARKGRAY line_loop:
            add     top,bx
            cmp     cx,4            ; skip the center line
            je      no_line1
            call    horiz_line      ; line uses top,left,right
    no_line1:
            loop    line_loop
```

```
                pop     top
                push    left            ; save left
                mov     bx,right
                sub     bx,left
 5              shr     bx,3            ; 1/8
                mov     cx,7
        vline_loop:
                add     left,bx
                cmp     cx,4            ; skip the center line
10              je      no_line2
                call    vert_line       ; vline uses top, bottom, and left
        no_line2:
                loop    vline_loop 15      ; write the center lines
                pop     left
                mov     color,BLUE
                push    top
                mov     bx,top
20              mov     ax,bottom
                sub     ax,top
                sar     ax,1            ; 1/2
                add     ax,bx
                mov     top,ax
25              call    horiz_line
                pop     top mov     bx,left
                mov     ax,right
30              sub     ax,bx
                sar     ax,1            ; 1/2
                add     ax,bx
                push    left
                mov     left,ax
35              call    vert_line
                pop     left pop     es
                pop     di
40              pop     dx
                pop     cx
                pop     bx
                pop     ax 45              ret SCOPE ENDP
                ;
                ;%%%%%%%%%%%%%%%%%%%%%%%%%%%%%%%%%%%%%%%%%%%%%%%%%%
50              ;
```

```
        PLOT_POINT  PROC  NEAR push  ax
                push  bx
  5             push  cx
                push  dx
                push  di
                push  es 10             mov   dx,0a000h    ; segment for diaplay adapter
                mov   es,dx call  restore_old 15             mov   ax,127
                sub   al,y
                add   ax,top
                mov   bx,80
                imul  bx
 20             mov   di,ax        ; row byte count mov   ax,128
                add   al,x
                sal   ax,1         ; 512 pixels accross
 25             add   ax,left
        ; divide by eight and leave the remainder in dl
                mov   dl,al
                and   dl,7h
                shr   ax,3         ; /8
 30             add   di,ax        ; offset to correct byte ; upon entry di has the pixel address and dl has the bit position
                call  save_new     ; save the new one
                add   point_ptr,2
 35             and   point_ptr,0fh set_color color ; write the new pixel
 40     ; dl has the bit count in the correct byte
                xor   bh,bh
                mov   bl,dl
                mov   ch,dl        ; save ch = 0,2,4,6
                mov   ah,center_0[bx]
 45
                mov   al,8
                mov   dx,03ceh     ; enable the pixel
                out   dx,ax 50             mov   cl,es:[di]   ; center line
```

130

```
                mov     es:[di],cl mov     ah,center_0[bx+1]
                out     dx,ax add     di,80
                cmp     y,-128
                je      skip_bottom
                mov     cl,es:[di]      ; lower line
                mov     es:[di],cl skip_bottom:
                sub     di,160
                cmp     y,127
                je      skip_top
                mov     cl,es:[di]      ; upper line
                mov     es:[di],cl skip_top:
        ; If the center pixel is near the left or right side then we
        ; must fill in the pixels in the adjoining byte
        ; Because we only plot on even pixels...ch can equal 0,2,4,6
        ; pixels 2 and 4 are in the center of the byte so no extra work.

cmp     x,-128          ; if on the left edge of the display box...skip
                je      not_left_side cmp     ch,0
                jne     not_left_side mov     ah,00000001b    ; setup right most pixel
                out     dx,ax dec     di              ; one left of upper row
                cmp     y,127
                je      skip_top1
                mov     cl,es:[di]      ; upper line
                mov     es:[di],cl
        skip_top1:
                add     di,160
                cmp     y,-128
                je      skip_bottom1
                mov     cl,es:[di]      ; lower line
                mov     es:[di],cl
        skip_bottom1:
                sub     di,80
                mov     ah,00000011b
                out     dx,ax
                mov     cl,es:[di]      ; center line
                mov     es:[di],cl
```

131

```
                jmp     short not_right_side not_left_side:
                cmp     x,127           ; if on right edge....skip
                je      not_right_side cmp     ch,6
                jne     not_right_side cmp     y,-128
                je      not_right_side mov     ah,10000000b    ; setup left most pixel
                out     dx,ax add     di,81           ; one row down one right
                mov     cl,es:[di]      ; lower line
                mov     es:[di],cl not_right_side:
                pop     es
                pop     di
                pop     dx
                pop     cx
                pop     bx
                pop     ax ret .data center_0        db      11100000b       ; first line is center row of the dot
                        db      11000000b       ; second is the upper and lower lines center_2        db      11111000b
                        db      01110000b center_4        db      00111110b
                        db      00011100b center_6        db      00001111b
                        db      00000111b .code
        PLOT_POINT      ENDP
        ;
        ;%%%%%%%%%%%%%%%%%%%%%%%%%%%%%%%%%%%%%%%%%%%%%%
        ;
        RESTORE_OLD PROC NEAR
```

```
          push  ax
          push  bx
          push  cx
          push  dx
    5     push  di
          push  si lea   si,points
          add   si,point_ptr
   10     mov   ax,ds:[si]
          mov   si,ax
          lodsw
          mov   di,ax 15     lodsw             ; get the point
          mov   cx,ax       ; scope point lodsb
          xor   bh,bh
   20     mov   bl,al       ; bit position set_color LIGHTGRAY
          call  do_color 25     set_color DARKGRAY
          call  do_color set_color BLUE
          call  do_color
   30
   no_point:
          pop   si
          pop   di
          pop   dx
   35     pop   cx
          pop   bx
          pop   ax ret
   40
   .data
   points      dw    offset point0
          dw    offset point1
          dw    offset point2
   45     dw    offset point3
          dw    offset point4
          dw    offset point5
          dw    offset point6
          dw    offset point7
   50
```

```
        .code
        RESTORE_OLD ENDP
        ;
        ;%%%%%%%%%%%%%%%%%%%%%%%%%%%%%%%%%%%%%%%%%%%%%%%%%%
        ;
        DO_COLOR    PROC    NEAR
        ; upon entry:
        ;       DI - center byte address
        ;       SI - center byte color content address
        ;       CH - x
        ;       CL - y
        ;       BL - bit position within byte push    di          ; save center location
                push    si ; check all six sides for any dots.... if not exit
                push    si
                push    cx
                xor     ah,ah
                mov     cx,6
        any_color_loop:
                lodsb
                cmp     al,0
                jne     yes_restore
                loop    any_color_loop pop     cx
                pop     si          ; leave si at next address
                jmp     restore_exit yes_restore:
                pop     cx
                pop     si mov     dx,03ceh    ; graphics 1 and 2 address lodsb               ; center pixels
                cmp     al,0
                je      no_center mov     ah,al
                mov     al,08h
                out     dx,ax mov     al,es:[di]  ; center restore
                mov     es:[di],al no_center:
                sub     di,80       ; upper line
```

```
        lodsb cmp     al,0
        je      no_up
        cmp     cl,127          ; upper edge?
        je      no_up mov     ah,al
        mov     al,08h
        out     dx,ax           ; enable the LIGHTGRAY pixels mov     al,es:[di]      ; upper restore
        mov     es:[di],al
no_up:
        add     di,160
        lodsb cmp     al,0
        je      no_down cmp     cl,-128
        je      no_down mov     ah,al
        mov     al,08h
        out     dx,ax           ; enable the LIGHTGRAY pixels mov     al,es:[di]      ; lower restore
        mov     es:[di],al no_down:
        lodsb                   ; side center byte
        cmp     bl,0            ; left edge
        je      left_3_bytes cmp     bl,6
        jne     restore_exit
; since the old dot is at location 6 just restore the right center byte
        sub     di,79           ; one line up, one right cmp     al,0
        je      restore_exit cmp     ch,127
        je      restore_exit mov     ah,al
        mov     al,08h
```

```
        out     dx,ax mov     al,es:[di]   ; lower restore
        mov     es:[di],al jmp     short restore_exit ; here the dot is on the leftmost side so restore the left three bytes
left_3_bytes:
        cmp     ch,-128
        je      restore_exit sub     di,81        ; one row up, one byte left
        cmp     al,0
        je      left_up mov     ah,al
        mov     al,08h
        out     dx,ax mov     al,es:[di]   ; lower restore
        mov     es:[di],al left_up:
        sub     di,80
        lodsb cmp     cl,127
        je      no_side_up cmp     al,0
        je      no_side_up mov     ah,al
        mov     al,08h
        out     dx,ax mov     al,es:[di]   ; lower restore
        mov     es:[di],al no_side_up:
        add     di,160
        lodsb cmp     cl,-128
        je      restore_exit cmp     al,0
        je      restore_exit
```

```
                mov     ah,al
                mov     al,08h
                out     dx,ax 5               mov     al,es:[di]      ; lower restore
                mov     es:[di],al restore_exit:
                pop     si
10              add     si,6            ; next color block
                pop     di
                ret DO_COLOR    ENDP
15      ;
        ;%%%%%%%%%%%%%%%%%%%%%%%%%%%%%%%%%%%%%%%%%%%%%%%%%%
        ;
        SAVE_NEW    PROC    NEAR
        ; upon entry:
20      ;       DI = center byte address
        ;       DL = bit offset inside the byte lea     bx,points
25              add     bx,point_ptr
                mov     ax,ds:[bx]
                mov     bx,ax
                mov     ds:[bx],di      ; center address
                mov     ah,x
30              mov     al,y
                mov     ds:[bx+2],ax    ; xy
                mov     ds:[bx+4],dl    ; bit offset lea     si,center_0     ; SI = the bit pattern
35              xor     dh,dh
                add     si,dx
        ; zero out all the color information
                add     bx,5            ; start of the color information
                mov     cx,18
40              xor     al,al
                push    bx
        zero_loop:
                mov     ds:[bx],al
                inc     bx
45              loop    zero_loop
                pop     bx push    dx
                mov     dx,3ceh
50              mov     ax,1805h
```

```
                out     dx,ax
        ;       mov     al,05
        ;       out     dx,al
        ;       inc     dx
 5      ;       in      al,dx
        ;       or      al,08h
        ;       mov     ah,al
        ;       mov     al,05h
        ;       dec     dx
10      ;       out     dx,ax
        ;       mov     ax,1005h        ; read mode 1... color compare
        ;       out     dx,ax mov     ax,0f07h
15              out     dx,ax           ; color don't care register mov     ah,LIGHTGRAY    ; set the color compare register
                mov     al,02
                out     dx,ax
20              pop     dx ;       jmp     exit
                call    get_color 25              push    dx
                mov     dx,03ceh
                mov     ah,DARKGRAY     ; set the color compare register
                mov     al,02
                out     dx,ax
30              pop     dx call    get_color push    dx
35              mov     dx,03ceh
                mov     ah,BLUE         ; set the color compare register
                mov     al,02
                out     dx,ax
                pop     dx
40
                call    get_color exit:
                ret
45
        SAVE_NEW        ENDP
        ;
        ;%%%%%%%%%%%%%%%%%%%%%%%%%%%%%%%%%%%%%%%%%%%%%
        ;
50      GET_COLOR       PROC    NEAR
```

```
            push    bx              ; save the address
            push    di mov     al,es:[di]      ; get the pixels whixh are the desired color
    5       and     al,ds:[si]      ; only save the bits that will change
            mov     ds:[bx],al sub     di,80
            cmp     y,127
    10      je      no_upper mov     al,es:[di]
            and     al,ds:[si+1]
            mov     ds:[bx+1],al
    15
    no_upper:
            add     di,160
            cmp     y,-128
            je      chk_bit_cnt
    20
            mov     al,es:[di]
            and     al,ds:[si+1]
            mov     ds:[bx+2],al 25  chk_bit_cnt:
            cmp     dl,0
            je      get_left_3 cmp     dl,6
    30      jne     save_exit cmp     x,127
            je      save_exit 35      sub     di,79           ; up one, right one mov     al,es:[di]
            and     al,10000000b
            mov     ds:[bx+3],al
    40
            jmp     short save_exit get_left_3:
            cmp     x,-128
    45      je      save_exit sub     di,81           ; up one, left one mov     al,es:[di]
    50      and     al,00000011b
```

139

```
        mov     ds:[bx+3],al sub     di,80 cmp     y,127
        je      no_left_up mov     al,es:[di]
        and     al,00000001b
        mov     ds:[bx+4],al no_left_up:
        add     di,160
        cmp     y,-128
        je      save_exit mov     al,es:[di]
        and     al,00000001b
        mov     ds:[bx+5],al save_exit:
        pop     di
        pop     bx
        add     bx,6 ret

GET_COLOR   ENDP
;
;%%%%%%%%%%%%%%%%%%%%%%%%%%%%%%%%%%%%%%%%%%%
;
ZERO_POINTS PROC  NEAR
; upon entry CX - number of points to zero
        push    es
        push    ds
        pop     es cld
        lea     di,point0
        xor     ax,ax
point_loop:
        push    cx
        mov     cx,23
        rep     stosb
        pop     cx
        loop    point_loop pop     es
        ret
```

```
        ZERO_POINTS ENDP

END
        .MODEL SMALL
        .286
        ;%%%%%%%%%%%%%%%%%%%%%%%%%%%%%%%%%%%%%%%%%%%%%
        ;
        ;       Main transmitter
        ;
        ;       This code checks to see if the baud time is done.  If it is
        ;       then it modulates either marks or user data.  It uses a transmit
        ;       buffer which is 8K long.
        ;
        ;%%%%%%%%%%%%%%%%%%%%%%%%%%%%%%%%%%%%%%%%%%%%% include     equates public      init_tx,tx1224,tx_flags
                public      get_tx_data,reverse_table
                public      tx_char_in,tx_char_buf_start
                public      tx_char_buf_end,tx_char_out
                public      tx_in_ptr,tx_out_ptr
                public      setup_sample_cnt,sample_count extrn tx_dma_on:near extrn rx_sample_cnt:word
                extrn rx_in:word,recv_flags:word
                extrn recv_sample_count:word
                extrn tx_sample_segment:word
                extrn rx_sample_segment:word
                extrn tx_dma_ala16:word
                extrn aic_cmd1:word,aic_cmd2:word extrn processed:byte .data
                data_count  db      ?
                data_1200   db      ?
                prev_q1q0   db      ?
                tx_baud_count   dw  ?
                baud_data   dw      ?       ; data to transmit tx_flags    dw      ?
        ;
        ;       tx_flags.0 = 1    tx high band
        ;       tx_flags.1 = 1  tx 2400
        ;       tx_flags.2 = 1    scrambler is on
```

```
     ;     tx_flags.3 - 1    1200 baud data available
     ;     tx_flags.4 - 1    send marks
     ;     tx_flags.5 - 1    send S1 ( 1100 )
     ;     tx_flags.8 - 1 send AIC cmds
5    ;     tx_flags.9 - 1 AIC cmds went out
     ;
           tx_bit_count       db     ?

scrambler_1_16     dw     ?
10         scrambler_0 db     ?

tx_in_ptr    dw    ?
           tx_out_ptr   dw    ?

15         sample_count       dw    ?     ; if number of samples is less
                                          ; than this then compute more sample_num  dw     ?    ; number of samples to calculate
                                   ; per baud time
20
           an0_ptr            dw    ?    ; an sample pointers
           an1_ptr            dw    ?
           an2_ptr            dw    ?

25         bn0_ptr            dw    ?    ; bn sample pointers
           bn1_ptr            dw    ?
           bn2_ptr            dw    ?

temp_tx_buf0       dw    16 dup(?)
30
           t_parse_jmp dw     ?
           tx_char_in   dw    ?
           tx_char_out dw     ?

35         tx_char_buf_start label byte
           tx_char_buf db     2000 dup(?)
           tx_char_buf_end          label byte send_data    db    ?
40   .code

INIT_TX      PROC  NEAR

; don't affect which band to transmit in
45         and   tx_flags,1h
           or    tx_flags,4h         ; turn on the scrambler
           mov   tx_char_in,offset tx_char_buf
           mov   tx_char_out,offset tx_char_buf 50         xor   ax,ax
```

142

```
                mov     tx_in_ptr,ax
                mov     tx_out_ptr,ax
                mov     t_parse_jmp,ax
                mov     an0_ptr,ax
                mov     an1_ptr,ax
                mov     an2_ptr,ax
                mov     bn0_ptr,ax
                mov     bn1_ptr,ax
                mov     bn2_ptr,ax
                mov     tx_baud_count,ax call    setup_sample_cnt ret INIT_TX     ENDP
        ;
        ;%%%%%%%%%%%%%%%%%%%%%%%%%%%%%%%%%%%%%%%%%%%%%%%%
        ;
        SETUP_SAMPLE_CNT    PROC    NEAR test    tx_flags,b0
                jnz     high_band
                mov     sample_num,8
        ;       mov     sample_count,12
        ;       test    recv_flags,b0
        ;       jnz     counts_done
        ;       mov     sample_count,20         ; use larger count for tones and also
                                                ; safety at 12 and 2400 baud
                mov     sample_count,100        ; 20 ms delay for safety
                ret high_band:
                mov     sample_num,16
        ;       mov     sample_count,24
        ;       test    recv_flags,b0
        ;       jnz     counts_done
        ;       mov     sample_count,40
                mov     sample_count,200
        ;counts_done:
                ret SETUP_SAMPLE_CNT    ENDP
        ;
        ;%%%%%%%%%%%%%%%%%%%%%%%%%%%%%%%%%%%%%%%%%%%%%%%%
        ;
        GET_TX_DATA PROC    NEAR mov     ax,tx_in_ptr
                sub     ax,tx_out_ptr
```

```
            jns     not_neg
            add     ax,buf_len
      not_neg:
            shr     ax,1                    ; word count
  5         cmp     ax,recv_sample_count
            stc
            jle     no_data                 ; doesn't use the Carry flag... so OK mov     di,rx_in
 10         mov     si,tx_out_ptr
            mov     cx,recv_sample_count    ; transfer just the samples needed mov     ax,rx_sample_segment
            mov     bx,tx_sample_segment
 15
            push    ds
            push    es
            mov     ds,bx
            mov     es,ax
 20         rep     movsw
            pop     es
            pop     ds cmp     si,buf_len
 25         jne     no_tx_wrap
            xor     si,si
      no_tx_wrap:

cmp     di,buf_len
 30         jne     no_rx_wrap
            xor     di,di
      no_rx_wrap:
            mov     tx_out_ptr,si
            mov     rx_in,di
 35         clc                             ; flag got data no_data:
            ret 40
      GET_TX_DATA ENDP
      ;
      ;%%%%%%%%%%%%%%%%%%%%%%%%%%%%%%%%%%%%%%%%%%%%
      ;
 45   TX1224      PROC  NEAR IF board
            mov     dx,wr_clr_byte_ptr      ; init flag to low byte
            out     dx,al
 50         jmp     $+2
```

```
        mov     dx,dma_5_address
        in      al,dx
        mov     cl,al
        jmp     $+2
        in      al,dx
        mov     ch,al
        jmp     $+2

; check to see if the low byte rolled over
        mov     dx,wr_clr_byte_ptr      ; init flag to low byte
        out     dx,al
        jmp     $+2 mov     dx,dma_5_address
        in      al,dx
        cmp     al,cl
        je      no_roll
        mov     cl,al
        jmp     $+2
        in      al,dx
        mov     ch,al
        jmp     $+2 no_roll:
        mov     ax,tx_in_ptr            ; calculate the tx buffer address
        shr     ax,1                    ; word address
        add     ax,tx_dma_a1a16
        sub     ax,cx
        jns     pos_diff
        add     ax,( buf_len / 2 )
pos_diff:
        cmp     ax,sample_count
        jl      do_tx
        ret ELSE
        mov     ax,tx_in_ptr
        sub     ax,tx_out_ptr
        jns     pos_diff
        add     ax,buf_len
pos_diff:
        shr     ax,1                    ; word count
        cmp     ax,sample_count
        jl      do_tx
        ret
    ENDIF do_tx:
        add     ax,sample_num           ; this will prevent further calls to TX
        cmp     ax,sample_count
```

```
              jge     no_processed
              or      processed,02h
      no_processed:
              and     tx_flags,NOT b9
  5           test    tx_flags,(b4 OR b5)
              jnz     send_marks test    tx_flags,b3
              jnz     get_1200_data
 10
      check_tx_data:
      ; parse next data here
              cmp     t_parse_jmp,0           ; any data left to parse
              je      check_tx_char
 15           mov     ax,t_parse_jmp
              call    ax
              jmp     short scrambler check_tx_char:
 20           mov     ax,tx_char_in
              mov     si,tx_char_out
              cmp     ax,si
              je      send_marks
      get_tx_char:
 25           lodsb                           ; get the character to transmit
              cmp     si,offset tx_char_buf_end
              jne     save_tx_ptr
              lea     si,tx_char_buf_start
      save_tx_ptr:
 30           mov     tx_char_out,si
              shl     ax,1                    ; insert start bit
              mov     bl,al
              and     bx,0fh
              shr     ax,4
 35           mov     send_data,al
              mov     t_parse_jmp,offset parse_4_2_data
              jmp     short scrambler get_1200_data:
 40           and     tx_flags,0fff7h
              mov     al,data_1200
              shl     al,2
              and     al,0ch
              or      al,01h
 45           jmp     short gray_encode send_marks:
              mov     bx,0fh
              test    tx_flags,b5             ; send 1100 ?
 50           jz      scrambler
```

```
            mov     bx,0c0h scrambler:
    ; data to be scrambled should be in the lower 4 bits of BX
5   ; THERE IS NO SCRAMBLER LOCKUP DETECTOR
            and     bx,0fh
            test    tx_flags,b2
            jz      no_scrambler 10          mov     ax,scrambler_1_16
            xor     bx,ax
            shr     ax,3
            xor     bx,ax               ; scrambled data is in BX.0 to BX.3

15          or      ah,scrambler_0
            shr     ax,1
            and     bx,0fh
            mov     cx,bx               ; save in CX
            shl     bx,13
20          or      ax,bx               ; shift scrambled data into the delay
            mov     scrambler_1_16,ax   ; line
            mov     bx,cx               ; restore data
            mov     scrambler_0,0
            test    bx,b3
25          jz      no_scrambler
            mov     scrambler_0,20h
    no_scrambler:
            mov     al,reverse_table[bx]

30  check_1200:
            test    tx_flags,b1
            jnz     gray_encode mov     data_1200,al
35          and     al,0ch
            or      al,01h
            or      tx_flags,08h gray_encode:
40          test    al,b3
            jnz     diff_encode
            xor     al,4
    diff_encode:
            and     prev_q1q0,0ch
45          add     al,prev_q1q0
            and     ax,0fh              ; clear AH also
            mov     prev_q1q0,al filter_routine:
50          shl     ax,1                ; word offset
```

```
            mov     bx,ax
            test    tx_flags,b0
            jz      low_band_filter
            jmp     high_band_filter low_band_filter:
            mov     ax,low_band_bn[bx]
            mov     bn0_ptr,ax mov     ax,low_band_an[bx]
            mov     an0_ptr,ax mov     si,ax               ; SI = AN0 pointer
            mov     di,an1_ptr          ; DI = AN1 pointer
            mov     bx,an2_ptr          ; BX = AN2 pointer ; take care of the AIC and the receivers baud loop
            mov     cx,0fffch           ; AIC mov     ax,n0_low_p1[si]    ; cosine sample 0
            add     ax,n1_low_p1[di]
            add     ax,n2_low_p1[bx]
            mov     temp_tx_buf0,ax         ; cos = +1 mov     ax,n0_low_p1[si+2]      ; cosine sample 1
            add     ax,n1_low_p1[di+2]
            add     ax,n2_low_p1[bx+2]
            neg     ax                  ; cos = -1
            mov     temp_tx_buf0+2,ax mov     ax,n0_low_p1[si+4]      ; cosine sample 2
            add     ax,n1_low_p1[di+4]
            add     ax,n2_low_p1[bx+4]
            neg     ax                  ; cos = -1
            mov     temp_tx_buf0+4,ax mov     ax,n0_low_p1[si+6]      ; cosine sample 3
            add     ax,n1_low_p1[di+6]
            add     ax,n2_low_p1[bx+6]
            mov     temp_tx_buf0+6,ax ; cos = +1 mov     ax,n0_low_p1[si+8]      ; cosine sample 4
            add     ax,n1_low_p1[di+8]
            add     ax,n2_low_p1[bx+8]
            mov     temp_tx_buf0+8,ax ; cos = +1 mov     ax,n0_low_p1[si+10]     ; cosine sample 5
            add     ax,n1_low_p1[di+10]
            add     ax,n2_low_p1[bx+10]
            neg     ax                  ; cos = -1
```

```
        mov     temp_tx_buf0+10,ax mov     ax,n0_low_pl[si+12]     ; cosine sample 6
        add     ax,n1_low_pl[di+12]
5       add     ax,n2_low_pl[bx+12]
        neg     ax                      ; cos = -1
        mov     temp_tx_buf0+12,ax mov     ax,n0_low_pl[si+14]     ; cosine sample 7
10      add     ax,n1_low_pl[di+14]
        add     ax,n2_low_pl[bx+14]
        mov     temp_tx_buf0+14,ax      ; cos = +1 mov     si,bn0_ptr              ; SI = BN0 pointer
15      mov     di,bn1_ptr              ; DI = BN1 pointer
        mov     bx,bn2_ptr              ; BX = BN2 pointer mov     ax,n0_low_pl[si]        ; sine sample 0
        add     ax,n1_low_pl[di]
20      add     ax,n2_low_pl[bx]
        sub     temp_tx_buf0,ax         ; sine = -1
        and     temp_tx_buf0,cx mov     ax,n0_low_pl[si+2]      ; sine sample 1
25      add     ax,n1_low_pl[di+2]
        add     ax,n2_low_pl[bx+2]
        sub     temp_tx_buf0+2,ax  ; sine = -1
        and     temp_tx_buf0+2,cx 30      mov     ax,n0_low_pl[si+4]      ; sine sample 2
        add     ax,n1_low_pl[di+4]
        add     ax,n2_low_pl[bx+4]
        add     temp_tx_buf0+4,ax  ; sine = +1
        and     temp_tx_buf0+4,cx
35
        mov     ax,n0_low_pl[si+6]      ; sine sample 3
        add     ax,n1_low_pl[di+6]
        add     ax,n2_low_pl[bx+6]
        add     temp_tx_buf0+6,ax  ; sine = +1
40      and     temp_tx_buf0+6,cx mov     ax,n0_low_pl[si+8]      ; sine sample 4
        add     ax,n1_low_pl[di+8]
        add     ax,n2_low_pl[bx+8]
45      sub     temp_tx_buf0+8,ax  ; sine = -1
        and     temp_tx_buf0+8,cx mov     ax,n0_low_pl[si+10]     ; sine sample 5
        add     ax,n1_low_pl[di+10]
50      add     ax,n2_low_pl[bx+10]
```

```
            sub     temp_tx_buf0+10,ax      ; sine = -1
            and     temp_tx_buf0+10,cx mov     ax,n0_low_p1[si+12]     ; sine sample 6
            add     ax,n1_low_p1[di+12]
            add     ax,n2_low_p1[bx+12]
            add     temp_tx_buf0+12,ax      ; sine = +1
            and     temp_tx_buf0+12,cx mov     ax,n0_low_p1[si+14]     ; sine sample 7
            add     ax,n1_low_p1[di+14]
            add     ax,n2_low_p1[bx+14]
            add     temp_tx_buf0+14,ax      ; sine = +1
            and     temp_tx_buf0+14,cx
    ;
    ;   All the transmit samples are in the temp buffer.
    ;   Now shift them over to the transmit buffer.
    ;
            lea     si,temp_tx_buf0
            mov     es,tx_sample_segment
            mov     di,tx_in_ptr cmp     di,(buf_len-16)         ; near the end of the buffer?
            jl      no_wrap mov     cx,buf_len
            sub     cx,di
            sar     cx,1                    ; number of samples to fill buffer
            mov     bx,8
            sub     bx,cx                   ; number left rep     movsw xor     di,di
            mov     cx,bx rep     movsw jmp     short save_ptr ; This routine is for the switch from 7200 to 9600 recv sample rate during
    ; call progress
    send_aic_cmds:
            cmp     di,(buf_len-22)         ; near the end of the buffer?
            jge     move_data or      tx_flags,b9
            and     tx_flags,NOT b8 lodsw
```

```
                or      ax,3
                stosw
                mov     ax,aic_cmd1
                stosw
5               lodsw
                or      ax,3
                stosw
                mov     ax,aic_cmd2
                stosw
10              mov     cx,6
                rep     movsw
                jmp     short save_ptr no_wrap:
15              test    tx_flags,b8     ; any AIC cmds?
                jnz     send_aic_cmds
        move_data:
                mov     cx,8
                rep     movsw
20
        save_ptr:
                mov     tx_in_ptr,di ; shift the an,bn delay lines
25              mov     ax,an1_ptr
                mov     an2_ptr,ax
                mov     ax,an0_ptr
                mov     an1_ptr,ax 30              mov     ax,bn1_ptr
                mov     bn2_ptr,ax
                mov     ax,bn0_ptr
                mov     bn1_ptr,ax 35              inc     tx_baud_count
                cmp     tx_baud_count,2
                jl      ok_leave_low ; enable DMA channel 1
40              call    tx_dma_on ok_leave_low:
                ret 45      ;%%%%%%%%%%%%%%%%%%%%%%%%%%%%%%%%%%%%%%%%%%%%%%%
        high_band_filter:
                mov     ax,high_band_bn[bx]
                mov     bn0_ptr,ax 50              mov     ax,high_band_an[bx]
```

```
            mov     an0_ptr,ax mov     si,ax              ; SI = AN0 pointer
            mov     di,an1_ptr         ; DI = AN1 pointer
5           mov     bx,an2_ptr         ; BX = AN2 pointer ; AIC and baud loop variables
            mov     cx,0fffch 10          mov     ax,n0_high_p1[si]  ; cosine sample 0
            add     ax,n1_high_p1[di]
            add     ax,n2_high_p1[bx]
            and     ax,cx
            mov     temp_tx_buf0,ax    ; cos = +1
15
            mov     ax,n0_high_p1[si+4]    ; cosine sample 2
            add     ax,n1_high_p1[di+4]
            add     ax,n2_high_p1[bx+4]
            neg     ax                 ; cos = -1
20          and     ax,cx
            mov     temp_tx_buf0+4,ax  ; skip sample 1 mov     ax,n0_high_p1[si+8]    ; cosine sample 4
            add     ax,n1_high_p1[di+8]
25          add     ax,n2_high_p1[bx+8]
            and     ax,cx
            mov     temp_tx_buf0+8,ax  ; cos = +1 mov     ax,n0_high_p1[si+12]   ; cosine sample 6
30          add     ax,n1_high_p1[di+12]
            add     ax,n2_high_p1[bx+12]
            neg     ax                 ; cos = -1
            and     ax,cx
            mov     temp_tx_buf0+12,ax
35
            mov     ax,n0_high_p1[si+16]   ; cosine sample 8
            add     ax,n1_high_p1[di+16]
            add     ax,n2_high_p1[bx+16]
            and     ax,cx
40          mov     temp_tx_buf0+16,ax ; cos = +1 mov     ax,n0_high_p1[si+20]   ; cosine sample 10
            add     ax,n1_high_p1[di+20]
            add     ax,n2_high_p1[bx+20]
45          neg     ax                 ; cos = -1
            and     ax,cx
            mov     temp_tx_buf0+20,ax mov     ax,n0_high_p1[si+24]   ; cosine sample 12
50          add     ax,n1_high_p1[di+24]
```

```
        add     ax,n2_high_p1[bx+24]
        and     ax,cx
        mov     temp_tx_buf0+24,ax      ; cos = +1

5      mov     ax,n0_high_p1[si+28]    ; cosine sample 14
        add     ax,n1_high_p1[di+28]
        add     ax,n2_high_p1[bx+28]
        neg     ax                      ; cos = -1
        and     ax,cx
10      mov     temp_tx_buf0+28,ax mov     si,bn0_ptr              ; SI = BN0 pointer
        mov     di,bn1_ptr              ; DI = BN1 pointer
        mov     bx,bn2_ptr              ; BX = BN2 pointer
15
        mov     ax,n0_high_p1[si+2]     ; sine sample 0
        add     ax,n1_high_p1[di+2]
        add     ax,n2_high_p1[bx+2]
        neg     ax
20      and     ax,cx
        mov     temp_tx_buf0+2,ax mov     ax,n0_high_p1[si+6]     ; sine sample 1
        add     ax,n1_high_p1[di+6]
25      add     ax,n2_high_p1[bx+6]
        and     ax,cx
        mov     temp_tx_buf0+6,ax mov     ax,n0_high_p1[si+10]    ; sine sample 2
30      add     ax,n1_high_p1[di+10]
        add     ax,n2_high_p1[bx+10]
        neg     ax
        and     ax,cx
        mov     temp_tx_buf0+10,ax
35
        mov     ax,n0_high_p1[si+14]    ; sine sample 3
        add     ax,n1_high_p1[di+14]
        add     ax,n2_high_p1[bx+14]
        and     ax,cx
40      mov     temp_tx_buf0+14,ax mov     ax,n0_high_p1[si+18]    ; sine sample 4
        add     ax,n1_high_p1[di+18]
        add     ax,n2_high_p1[bx+18]
45      neg     ax
        and     ax,cx
        mov     temp_tx_buf0+18,ax mov     ax,n0_high_p1[si+22]    ; sine sample 5
50      add     ax,n1_high_p1[di+22]
```

```
        add     ax,n2_high_p1[bx+22]
        and     ax,cx
        mov     temp_tx_buf0+22,ax 5      mov     ax,n0_high_p1[si+26]    ; sine sample 6
        add     ax,n1_high_p1[di+26]
        add     ax,n2_high_p1[bx+26]
        neg     ax
        and     ax,cx
10      mov     temp_tx_buf0+26,ax mov     ax,n0_high_p1[si+30]    ; sine sample 7
        add     ax,n1_high_p1[di+30]
        add     ax,n2_high_p1[bx+30]
15      and     ax,cx
        mov     temp_tx_buf0+30,ax
;
;       All the transmit samples are in the temp buffer.
;       Now shift them over to the transmit buffer.
20 ;
        mov     cx,16
        lea     si,temp_tx_buf0
        mov     es,tx_sample_segment
        mov     di,tx_in_ptr
25
        rep     movsw cmp     di,buf_len
        jne     save_in_ptr
30      xor     di,di
save_in_ptr:
        mov     tx_in_ptr,di ; shift the an,bn delay lines
35      mov     ax,an1_ptr
        mov     an2_ptr,ax
        mov     ax,an0_ptr
        mov     an1_ptr,ax 40      mov     ax,bn1_ptr
        mov     bn2_ptr,ax
        mov     ax,bn0_ptr
        mov     bn1_ptr,ax 45      inc     tx_baud_count
        cmp     tx_baud_count,2
        jl      ok_leave_high ; enable DMA channel 1
50      call    tx_dma_on
```

```
        ok_leave_high:
                ret

5      .data
        reverse_table    db      00h
                 db      08h
                 db      04h
                 db      0ch
10               db      02h
                 db      0ah
                 db      06h
                 db      0eh
                 db      01h
15               db      09h
                 db      05h
                 db      0dh
                 db      03h
                 db      0bh
20               db      07h
                 db      0fh
        ;
        ;%%%%%%%%%%%%%%%%%%%%%%%%%%%%%%%%%%%%%%%%%%%%%%%%
        ;
25      high_band_an     dw      n0_high_p1 - n0_high_p1
                 dw      n0_high_p3 - n0_high_p1
                 dw      n0_high_p1 - n0_high_p1
                 dw      n0_high_p3 - n0_high_p1
                 dw      n0_high_m1 - n0_high_p1
30               dw      n0_high_m1 - n0_high_p1
                 dw      n0_high_m3 - n0_high_p1
                 dw      n0_high_m3 - n0_high_p1
                 dw      n0_high_m1 - n0_high_p1
                 dw      n0_high_m3 - n0_high_p1
35               dw      n0_high_m1 - n0_high_p1
                 dw      n0_high_m3 - n0_high_p1
                 dw      n0_high_p1 - n0_high_p1
                 dw      n0_high_p1 - n0_high_p1
                 dw      n0_high_p3 - n0_high_p1
40               dw      n0_high_p3 - n0_high_p1 high_band_bn     dw      n0_high_p1 - n0_high_p1
                 dw      n0_high_p1 - n0_high_p1
                 dw      n0_high_p3 - n0_high_p1
45               dw      n0_high_p3 - n0_high_p1
                 dw      n0_high_p1 - n0_high_p1
                 dw      n0_high_p3 - n0_high_p1
                 dw      n0_high_p1 - n0_high_p1
                 dw      n0_high_p3 - n0_high_p1
50               dw      n0_high_m1 - n0_high_p1
```

```
              dw      n0_high_m1 - n0_high_p1
              dw      n0_high_m3 - n0_high_p1
              dw      n0_high_m3 - n0_high_p1
              dw      n0_high_m1 - n0_high_p1
              dw      n0_high_m3 - n0_high_p1
              dw      n0_high_m1 - n0_high_p1
              dw      n0_high_m3 - n0_high_p1 low_band_an   dw      n0_low_p1 - n0_low_p1
              dw      n0_low_p3 - n0_low_p1
              dw      n0_low_p1 - n0_low_p1
              dw      n0_low_p3 - n0_low_p1
              dw      n0_low_m1 - n0_low_p1
              dw      n0_low_m1 - n0_low_p1
              dw      n0_low_m3 - n0_low_p1
              dw      n0_low_m3 - n0_low_p1
              dw      n0_low_m1 - n0_low_p1
              dw      n0_low_m3 - n0_low_p1
              dw      n0_low_m1 - n0_low_p1
              dw      n0_low_m3 - n0_low_p1
              dw      n0_low_p1 - n0_low_p1
              dw      n0_low_p1 - n0_low_p1
              dw      n0_low_p3 - n0_low_p1
              dw      n0_low_p3 - n0_low_p1 low_band_bn   dw      n0_low_p1 - n0_low_p1
              dw      n0_low_p1 - n0_low_p1
              dw      n0_low_p3 - n0_low_p1
              dw      n0_low_p3 - n0_low_p1
              dw      n0_low_p1 - n0_low_p1
              dw      n0_low_p3 - n0_low_p1
              dw      n0_low_p1 - n0_low_p1
              dw      n0_low_p3 - n0_low_p1
              dw      n0_low_m1 - n0_low_p1
              dw      n0_low_m1 - n0_low_p1
              dw      n0_low_m3 - n0_low_p1
              dw      n0_low_m3 - n0_low_p1
              dw      n0_low_m1 - n0_low_p1
              dw      n0_low_m3 - n0_low_p1
              dw      n0_low_m1 - n0_low_p1
              dw      n0_low_m3 - n0_low_p1
;
;%%%%%%%%%%%%%%%%%%%%%%%%%%%%%%%%%%%%%%%%%%%%%%%%
;
n0_high_p1    dw      -4              ; high band +1 point
              dw      -12
              dw      -28
              dw      -52
              dw      -84
              dw      -120
```

```
                    dw      -152
                    dw      -180
                    dw      -192
                    dw      -180
 5                  dw      -140
                    dw      -56
                    dw      68
                    dw      244
                    dw      464
10                  dw      728 n0_high_m1  dw      4               ; high band -1 point
                    dw      12
                    dw      28
15                  dw      52
                    dw      84
                    dw      120
                    dw      152
                    dw      180
20                  dw      192
                    dw      180
                    dw      140
                    dw      56
                    dw      -68
25                  dw      -244
                    dw      -464
                    dw      -728 n0_high_p3  dw      3 * -4          ; high band +3 point
30                  dw      3 * -12
                    dw      3 * -28
                    dw      3 * -52
                    dw      3 * -84
                    dw      3 * -120
35                  dw      3 * -152
                    dw      3 * -180
                    dw      3 * -192
                    dw      3 * -180
                    dw      3 * -140
40                  dw      3 * -56
                    dw      3 * 68
                    dw      3 * 244
                    dw      3 * 464
                    dw      3 * 728
45
        n0_high_m3  dw      3 * 4           ; high band -3 point
                    dw      3 * 12
                    dw      3 * 28
                    dw      3 * 52
50                  dw      3 * 84
```

```
                    dw      3 * 120
                    dw      3 * 152
                    dw      3 * 180
                    dw      3 * 192
                    dw      3 * 180
                    dw      3 * 140
                    dw      3 * 56
                    dw      3 * -68
                    dw      3 * -244
                    dw      3 * -464
                    dw      3 * -728
;
;%%%%%%%%%%%%%%%%%%%%%%%%%%%%%%%%%%%%%%%%%%%%%%%%%%%%%
;
nl_high_p1          dw      1028            ; high band anl +1 point
                    dw      1344
                    dw      1668
                    dw      1976
                    dw      2248
                    dw      2472
                    dw      2628
                    dw      2712
                    dw      2712
                    dw      2628
                    dw      2472
                    dw      2248
                    dw      1976
                    dw      1668
                    dw      1344
                    dw      1028 nl_high_m1          dw      -1028           ; high band anl -1 point
                    dw      -1344
                    dw      -1668
                    dw      -1976
                    dw      -2248
                    dw      -2472
                    dw      -2628
                    dw      -2712
                    dw      -2712
                    dw      -2628
                    dw      -2472
                    dw      -2248
                    dw      -1976
                    dw      -1668
                    dw      -1344
                    dw      -1028 nl_high_p3          dw      3 * 1028        ; high band anl +3 point
                    dw      3 * 1344
```

158

```
            dw      3 * 1668
            dw      3 * 1976
            dw      3 * 2248
            dw      3 * 2472
            dw      3 * 2628
            dw      3 * 2712
            dw      3 * 2712
            dw      3 * 2628
            dw      3 * 2472
            dw      3 * 2248
            dw      3 * 1976
            dw      3 * 1668
            dw      3 * 1344
            dw      3 * 1028
n1_high_m3  dw      3 * -1028       ; high band an1 -3 point
            dw      3 * -1344
            dw      3 * -1668
            dw      3 * -1976
            dw      3 * -2248
            dw      3 * -2472
            dw      3 * -2628
            dw      3 * -2712
            dw      3 * -2712
            dw      3 * -2628
            dw      3 * -2472
            dw      3 * -2248
            dw      3 * -1976
            dw      3 * -1668
            dw      3 * -1344
            dw      3 * -1028
;
;%%%%%%%%%%%%%%%%%%%%%%%%%%%%%%%%%%%%%%%%%%%%%%%%%%%%%
;
n2_high_p1  dw      728             ; an2,bn2 +1 points
            dw      464
            dw      244
            dw      68
            dw      -56
            dw      -140
            dw      -180
            dw      -192
            dw      -180
            dw      -152
            dw      -120
            dw      -84
            dw      -52
            dw      -28
            dw      -12
            dw      -4
```

```
n2_high_m1   dw    -728          ; an2,bn2 -1 points
             dw    -464
             dw    -244
             dw    -68
             dw    56
             dw    140
             dw    180
             dw    192
             dw    180
             dw    152
             dw    120
             dw    84
             dw    52
             dw    28
             dw    12
             dw    4 n2_high_p3   dw    3 * 728        ; an2,bn2 +3 points
             dw    3 * 464
             dw    3 * 244
             dw    3 * 68
             dw    3 * -56
             dw    3 * -140
             dw    3 * -180
             dw    3 * -192
             dw    3 * -180
             dw    3 * -152
             dw    3 * -120
             dw    3 * -84
             dw    3 * -52
             dw    3 * -28
             dw    3 * -12
             dw    3 * -4 n2_high_m3   dw    3 * -728       ; an2,bn2 -3 points
             dw    3 * -464
             dw    3 * -244
             dw    3 * -68
             dw    3 * 56
             dw    3 * 140
             dw    3 * 180
             dw    3 * 192
             dw    3 * 180
             dw    3 * 152
             dw    3 * 120
             dw    3 * 84
             dw    3 * 52
             dw    3 * 28
             dw    3 * 12
             dw    3 * 4
```

```
;
;%%%%%%%%%%%%%%%%%%%%%%%%%%%%%%%%%%%%%%%%%%%%%%%%%
;
n0_low_p1   dw      -8          ; an0,bn0 +1 points
            dw      -40
            dw      -100
            dw      -168
            dw      -188
            dw      -104
            dw      152
            dw      592 n0_low_m1   dw      8           ; an0,bn0 -1 points
            dw      40
            dw      100
            dw      168
            dw      188
            dw      104
            dw      -152
            dw      -592 n0_low_p3   dw      3 * -8      ; an0,bn0 +3 points
            dw      3 * -40
            dw      3 * -100
            dw      3 * -168
            dw      3 * -188
            dw      3 * -104
            dw      3 * 152
            dw      3 * 592 n0_low_m3   dw      3 * 8       ; an0,bn0 -3 points
            dw      3 * 40
            dw      3 * 100
            dw      3 * 168
            dw      3 * 188
            dw      3 * 104
            dw      3 * -152
            dw      3 * -592
;
;%%%%%%%%%%%%%%%%%%%%%%%%%%%%%%%%%%%%%%%%%%%%%%%%%
;
n1_low_p1   dw      1184        ; an1,bn1 +1 points
            dw      1824
            dw      2368
            dw      2680
            dw      2680
            dw      2368
            dw      1824
            dw      1184
```

161

```
        n1_low_m1   dw      -1184       ; an1,bn1 -1 points
                    dw      -1824
                    dw      -2368
                    dw      -2680
    5               dw      -2680
                    dw      -2368
                    dw      -1824
                    dw      -1184

10   n1_low_p3   dw      3 * 1184    ; an1,bn1 +3 points
                    dw      3 * 1824
                    dw      3 * 2368
                    dw      3 * 2680
                    dw      3 * 2680
   15               dw      3 * 2368
                    dw      3 * 1824
                    dw      3 * 1184 n1_low_m3   dw      3 * -1184   ; an1,bn1 -3 points
   20               dw      3 * -1824
                    dw      3 * -2368
                    dw      3 * -2680
                    dw      3 * -2680
                    dw      3 * -2368
   25               dw      3 * -1824
                    dw      3 * -1184
        ;
        ;%%%%%%%%%%%%%%%%%%%%%%%%%%%%%%%%%%%%%%%%%%%%%%
        ;
   30   n2_low_p1   dw      592         ; an2,bn2 +1 points
                    dw      152
                    dw      -104
                    dw      -188
                    dw      -168
   35               dw      -100
                    dw      -40
                    dw      -8 n2_low_m1   dw      -592        ; an2,bn2 -1 points
   40               dw      -152
                    dw      104
                    dw      188
                    dw      168
                    dw      100
   45               dw      40
                    dw      8 n2_low_p3   dw      3 * 592     ; an2,bn2 +3 points
                    dw      3 * 152
   50               dw      3 * -104
```

```
                    dw      3 * -188
                    dw      3 * -168
                    dw      3 * -100
                    dw      3 * -40
                    dw      3 * -8 n2_low_m3       dw      3 * -592        ; an2,bn2 -3 points
                    dw      3 * -152
                    dw      3 * 104
                    dw      3 * 188
                    dw      3 * 168
                    dw      3 * 100
                    dw      3 * 40
                    dw      3 * 8

TX1224          ENDP
    ;
    ;%%%%%%%%%%%%%%%%%%%%%%%%%%%%%%%%%%%%%%%%%%%%%%
    ;
    .code
    PARSE_DATA      PROC    NEAR parse_4_0_data:
            mov     t_parse_jmp,0
            jmp     short parse_it
    parse_4_2_data:
            mov     t_parse_jmp,offset parse_2_data
            jmp     short parse_it
    parse_4_4_data:
            mov     t_parse_jmp,offset parse_4_0_data
            jmp     short parse_it
    parse_it:
            mov     al,send_data
            mov     bl,al
            shr     al,4
            or      al,0f0h
            mov     send_data,al
            ret parse_2_data:
            mov     al,send_data
            or      al,0eh          ; insert stop bits
            mov     bl,al
            mov     ax,tx_char_in   ; any more chars to go out?
            mov     si,tx_char_out
            sub     ax,si
            jnz     get_next_char
            mov     t_parse_jmp,0
            ret
    get_next_char:
```

```
              lodsb                   ; get the character to transmit
              cmp     si,offset tx_char_buf_end
              jne     ok_done
              lea     si,tx_char_buf_start
      ok_done:
              mov     tx_char_out,si
              and     bl,03h
              shl     ax,3             ; insert start bit into ax.2
              or      bl,al
              shr     ax,4
              or      al,80h           ; insert the stop bit
              mov     send_data,al
              mov     t_parse_jmp,offset parse_4_4_data
              ret PARSE_DATA   ENDP
      ;
      ;%%%%%%%%%%%%%%%%%%%%%%%%%%%%%%%%%%%%%%%%%%%%%%%
      ;
      TX_COMMANDS PROC   NEAR send_s1:
              and     tx_flags,1111111111001001b    ; 1200, no_scrambler, no marks
              or      tx_flags,0000000000100000b
              ret send_scr_marks:
              and     tx_flags,1111111111001011b    ; no S1
              or      tx_flags,0000000000010100b    ; scrambler on , send marks
              ret tx_data_on:
              and     tx_flags,1111111111001111b
              ret

TX_COMMANDS ENDP
              END

.model small
      .286
      ;%%%%%%%%%%%%%%%%%%%%%%%%%%%%%%%%%%%%%%%%%%%%%%%
      ;
      ;       Tone generation
      ;
      ;       This program generates all sine waves.
      ;       The cosine and sine are read from two tables each 256
      ;       words long.
      ;
      ;%%%%%%%%%%%%%%%%%%%%%%%%%%%%%%%%%%%%%%%%%%%%%%%
```

```
            include   equates public    cosine_table,sine_table
            public    send_tones,freq,dial,freq_sum,tone_int
5           public    freq2,freq_sum2,dtmf_int,dtmf extrn     set_aic_bands:near,init_dma:near
            extrn     setup_sample_cnt:near,init_timer:near
            extrn     speaker_on:near,speaker_off:near
10          extrn     on_hook:near,off_hook:near
            extrn     tx_dma_off:near,nul_routine:near
            extrn     window_flip:near,tx_dma_on:near extrn     tx_flags:word,tx_vector:word
15          extrn     tx_in_ptr:word,tx_sample_segment:word
            extrn     sample_count:word,tx_dma_ala16:word
            extrn     timer_10ms:word,recv_flags:word
            extrn     display_segment:word,tx_out_ptr:word 20          extrn     dial_menu:byte
            extrn     processed:byte .data
25              freq        dw    ?
                freq2       dw    ?
                freq_sum    dw    ?
                freq_sum2   dw    ?
        .code
30      ;
        ;%%%%%%%%%%%%%%%%%%%%%%%%%%%%%%%%%%%%%%%%%%%%%%%
        ;
        SEND_TONES  PROC  NEAR
        ; upon entry freq will hold the desired frequency to be sent
35              push   ax
                mov    freq_sum,0
                or     tx_flags,1      ; high band
                call   setup_sample_cnt 40              mov    tx_in_ptr,0

IF board
                call   set_aic_bands
45              call   init_dma
                pop    ax
                call   init_timer
                mov    tx_vector,offset tone_int
            ELSE
50              pop    ax
```

```
            ENDIF tone_loop:
            IF board
 5              test  recv_flags,b5
                jnz   end_tone
            ELSE
                call  tone_int
            ENDIF
10              mov   ah,1
                int   16h
                jz    tone_loop mov   ah,0
15              int   16h
            IF board
        end_tone:
                call  tx_dma_off
                mov   tx_vector,offset nul_routine
20          ENDIF
                ret SEND_TONES  ENDP
        ;
25      ;%%%%%%%%%%%%%%%%%%%%%%%%%%%%%%%%%%%%%%%%%%%%%%%%%%%
        ;
        TONE_INT    PROC  NEAR IF board
30              call  tx_buf_cnt
                jc    do_tone
                ret
            ELSE
                mov   ax,tx_in_ptr
35              sub   ax,tx_out_ptr
                jns   no_rollover
                add   ax,buf_len
        no_rollover:
                shr   ax,1
40              cmp   ax,16
                jl    do_tone
                ret
            ENDIF
        do_tone:
45              mov   processed,0ffh mov   es,tx_sample_segment
                mov   di,tx_in_ptr
                mov   cx,16         ; loop counter
50              mov   dx,0fffch
```

```
        sample_loop:
              mov    bx,freq_sum
              add    bx,freq
              mov    freq_sum,bx
  5           mov    bl,bh
              xor    bh,bh
              sal    bx,1
              mov    ax,cosine_table[bx]
              sar    ax,1
 10           and    ax,dx
              stosw
              loop   sample_loop cmp    di,buf_len
 15           jne    save_ptr
              xor    di,di
        save_ptr:
              mov    tx_in_ptr,di 20        IF board
        ; enable DMA channel 1
              call   tx_dma_on
           ENDIF 25           ret TONE_INT   ENDP
        ;
        ;%%%%%%%%%%%%%%%%%%%%%%%%%%%%%%%%%%%%%%%%%%%%%%%
 30     ;
        DTMF  PROC  NEAR
        ; BX contains the digit to send
        ; AX contains the time to send the tone in 10ms counts
        ; This routine will abort if a key is hit and Carry will be set
 35           push   ax
              sal    bx,1
              mov    ax,low_table[bx]
              mov    freq,ax
              mov    ax,high_table[bx]
 40           mov    freq2,ax
              mov    freq_sum,0
              mov    freq_sum2,0 or     tx_flags,1        ; high band
 45           call   setup_sample_cnt mov    tx_in_ptr,0

IF board
 50           call   set_aic_bands
```

```
                call    init_dma
                pop     ax                      ; get the timer value
                call    init_timer
                mov     tx_vector,offset dtmf_int
        ENDIF wait_loop:
                test    recv_flags,b5
                jnz     timed_out
        IFE board
                call    dtmf_int
        ENDIF
                mov     ah,1
                int     16h
                jz      wait_loop mov     ah,0
                int     16h
                stc
                jmp     short dtmf_done
        timed_out:
                clc dtmf_done:
        IF board
                call    tx_dma_off
                mov     tx_vector,offset nul_routine    ; turn off the tone
        ENDIF
                ret
        .data
        low_table   dw      1941            ; 0
                    dw      1697            ; 1
                    dw      1697            ; 2
                    dw      1697            ; 3
                    dw      1770            ; 4
                    dw      1770            ; 5
                    dw      1770            ; 6
                    dw      1852            ; 7
                    dw      1852            ; 8
                    dw      1852            ; 9
                    dw      1941            ; #
                    dw      1941            ; *
                    dw      1697            ; a
                    dw      1770            ; b
                    dw      1852            ; c
                    dw      1941            ; d high_table  dw      h1336           ; 0
                    dw      h1209           ; 1
                    dw      h1336           ; 2
```

```
                    dw      h1477           ; 3
                    dw      h1209           ; 4
                    dw      h1336           ; 5
                    dw      h1477           ; 6
                    dw      h1209           ; 7
                    dw      h1336           ; 8
                    dw      h1477           ; 9
                    dw      h1477           ; #
                    dw      h1209           ; *
                    dw      h1663           ; a
                    dw      h1663           ; b
                    dw      h1663           ; c
                    dw      h1663           ; d

DTMF    ENDP
        ;
        ;%%%%%%%%%%%%%%%%%%%%%%%%%%%%%%%%%%%%%%%%%%%%%%%%%%%%
        ;
        .code
        DTMF_INT    PROC    NEAR IF board
                call    tx_buf_cnt
                jc      do_dtmf
                ret
        do_dtmf:
            ENDIF
                mov     processed,0ffh mov     es,tx_sample_segment
                mov     di,tx_in_ptr
                mov     cx,16           ; loop counter dtmf_loop:
                mov     bx,freq_sum
                add     bx,freq
                mov     freq_sum,bx
                mov     bl,bh
                xor     bh,bh
                sal     bx,1
                mov     dx,cosine_table[bx]
                sar     dx,1            ; 1/2
                mov     bx,freq_sum2
                add     bx,freq2
                mov     freq_sum2,bx
                mov     bl,bh
                xor     bh,bh
                sal     bx,1
                mov     ax,cosine_table[bx]
                sar     ax,1            ; 1/2
```

```
                add     ax,dx
                and     ax,0fffch
                stosw
                loop    dtmf_loop cmp     di,buf_len
                jne     save_in_ptr
                xor     di,di
        save_in_ptr:
                mov     tx_in_ptr,di IF board
        ; enable DMA channel 1
                call    tx_dma_on
            ENDIF ret DTMF_INT    ENDP
        ;
        ;%%%%%%%%%%%%%%%%%%%%%%%%%%%%%%%%%%%%%%%%%%%%%%%
        ;
        TX_BUF_CNT  PROC  NEAR IF board
                mov     dx,wr_clr_byte_ptr      ; init flag to low byte
                out     dx,al
                jmp     $+2 mov     dx,dma_5_address
                in      al,dx
                mov     cl,al
                jmp     $+2
                in      al,dx
                mov     ch,al
                jmp     $+2

; check for low byte roll over
                mov     dx,wr_clr_byte_ptr      ; init flag to low byte
                out     dx,al
                jmp     $+2 mov     dx,dma_5_address
                in      al,dx
                cmp     al,cl
                je      no_roll
                mov     cl,al
                jmp     $+2
                in      al,dx
                mov     ch,al
```

```
                jmp     $+2 no_roll:
                mov     ax,tx_in_ptr    ; calculate the tx buffer address
                shr     ax,1            ; word address
                add     ax,tx_dma_ala16
                sub     ax,cx
                jns     pos_diff
                add     ax,( buf_len / 2 )
        pos_diff:
                cmp     ax,sample_count
                jl      do_buf
                clc
                ret
        do_buf:
                stc
                ret
            ENDIF TX_BUF_CNT  ENDP
        ;
        ;%%%%%%%%%%%%%%%%%%%%%%%%%%%%%%%%%%%%%%%%%%%%%%%%%%%%%%
        ;
                .data
        cosine_table    dw      32767,32757,32728,32678,32609,32521
                        dw      32412,32285,32137,31971,31785
                        dw      31580,31356,31113,30852,30571
                        dw      30273,29956,29621,29268,28898
                        dw      28510,28105,27683,27245,26790
                        dw      26319,25832,25329,24811,24279
                        dw      23731,23170,22594,22005,21403
                        dw      20787,20159,19519,18868,18204
                        dw      17530,16846,16151,15446,14732
                        dw      14010,13279,12539,11793,11039
                        dw      10278,9512,8739,7962,7179
                        dw      6393,5602,4808,4011,3212
                        dw      2410,1608,804,0,-803
                        dw      -1607,-2410,-3211,-4010,-4807
                        dw      -5601,-6392,-7179,-7961,-8739
                        dw      -9511,-10278,-11038,-11792,-12539
                        dw      -13278,-14009,-14732,-15446,-16150
                        dw      -16845,-17530,-18204,-18867,-19519
                        dw      -20159,-20787,-21402,-22005,-22594
                        dw      -23169,-23731,-24278,-24811,-25329
                        dw      -25832,-26319,-26790,-27245,-27683
                        dw      -28105,-28510,-28898,-29268,-29621
                        dw      -29956,-30273,-30571,-30852,-31113
                        dw      -31356,-31580,-31785,-31971,-32137
                        dw      -32285,-32412,-32521,-32609,-32678
                        dw      -32728,-32757,-32767,-32757,-32728
```

```
            dw    -32678,-32609,-32521,-32412,-32285
            dw    -32137,-31971,-31785,-31580,-31356
            dw    -31113,-30852,-30571,-30273,-29956
            dw    -29621,-29268,-28898,-28510,-28105
5           dw    -27683,-27245,-26790,-26319,-25832
            dw    -25329,-24811,-24278,-23731,-23169
            dw    -22594,-22005,-21402,-20787,-20159
            dw    -19519,-18867,-18204,-17530,-16845
            dw    -16150,-15446,-14732,-14009,-13278
10          dw    -12539,-11792,-11038,-10278,-9511
            dw    -8739,-7961,-7179,-6392,-5601
            dw    -4807,-4010,-3211,-2410,-1607
            dw    -803,0,804,1608,2410
            dw    3212,4011,4808,5602,6393
15          dw    7179,7962,8739,9512,10278
            dw    11039,11793,12539,13279,14010
            dw    14732,15446,16151,16846,17530
            dw    18204,18868,19519,20159,20787
            dw    21403,22005,22594,23170,23731
20          dw    24279,24811,25329,25832,26319
            dw    26790,27245,27683,28105,28510
            dw    28898,29268,29621,29956,30273
            dw    30571,30852,31113,31356,31580
            dw    31785,31971,32137,32285,32412
25          dw    32521,32609,32678,32728,32757 sine_table dw    0,804,1608,2410,3212,4011
            dw    4808,5602,6393,7179,7962
            dw    8739,9512,10278,11039,11793
30          dw    12539,13279,14010,14732,15446
            dw    16151,16846,17530,18204,18868
            dw    19519,20159,20787,21403,22005
            dw    22594,23170,23731,24279,24811
            dw    25329,25832,26319,26790,27245
35          dw    27683,28105,28510,28898,29268
            dw    29621,29956,30273,30571,30852
            dw    31113,31356,31580,31785,31971
            dw    32137,32285,32412,32521,32609
            dw    32678,32728,32757,32767,32757
40          dw    32728,32678,32609,32521,32412
            dw    32285,32137,31971,31785,31580
            dw    31356,31113,30852,30571,30273
            dw    29956,29621,29268,28898,28510
            dw    28105,27683,27245,26790,26319
45          dw    25832,25329,24811,24279,23731
            dw    23170,22594,22005,21403,20787
            dw    20159,19519,18868,18204,17530
            dw    16846,16151,15446,14732,14010
            dw    13279,12539,11793,11039,10278
50          dw    9512,8739,7962,7179,6393
```

```
                dw      5602,4808,4011,3212,2410
                dw      1608,804,0,-803,-1607
                dw      -2410,-3211,-4010,-4807,-5601
                dw      -6392,-7179,-7961,-8739,-9511
                dw      -10278,-11038,-11792,-12539,-13278
                dw      -14009,-14732,-15446,-16150,-16845
                dw      -17530,-18204,-18867,-19519,-20159
                dw      -20787,-21402,-22005,-22594,-23169
                dw      -23731,-24278,-24811,-25329,-25832
                dw      -26319,-26790,-27245,-27683,-28105
                dw      -28510,-28898,-29268,-29621,-29956
                dw      -30273,-30571,-30852,-31113,-31356
                dw      -31580,-31785,-31971,-32137,-32285
                dw      -32412,-32521,-32609,-32678,-32728
                dw      -32757,-32767,-32757,-32728,-32678
                dw      -32609,-32521,-32412,-32285,-32137
                dw      -31971,-31785,-31580,-31356,-31113
                dw      -30852,-30571,-30273,-29956,-29621
                dw      -29268,-28898,-28510,-28105,-27683
                dw      -27245,-26790,-26319,-25832,-25329
                dw      -24811,-24278,-23731,-23169,-22594
                dw      -22005,-21402,-20787,-20159,-19519
                dw      -18867,-18204,-17530,-16845,-16150
                dw      -15446,-14732,-14009,-13278,-12539
                dw      -11792,-11038,-10278,-9511,-8739
                dw      -7961,-7179,-6392,-5601,-4807
                dw      -4010,-3211,-2410,-1607,-803
;
;%%%%%%%%%%%%%%%%%%%%%%%%%%%%%%%%%%%%%%%%%%%%%%%%%%%%
;
.code
DIAL    PROC    NEAR
.data
        dial_buffer  db     41 dup(?)
        buffer_pointer   dw     ?
.code
        lea     si,dial_menu
        call    window_flip ; position the cursor
        mov     ah,02h
        xor     bh,bh
        mov     dh,8
        mov     dl,31
        int     10h mov     es,display_segment
        mov     di,((( 8 * 80 ) + 31 ) * 2 )
        xor     bx,bx
```

```
        key_loop:
                mov     ah,0
                int     16h 5               mov     cl,al           ; for printing
                cmp     al,cr
                je      dial_string_done cmp     al,bs
10              jne     no_backspace cmp     bx,0
                je      key_loop 15              mov     al,' '
                sub     di,2
                mov     es:[di],al
                dec     dl
                mov     ah,02h
20              int     10h
                dec     bx
                jmp     short key_loop no_backspace:
25              cmp     al,'0'
                jb      not_digit
                cmp     al,'9'
                ja      not_digit 30              sub     al,'0'
                jmp     short buffer_insert
        not_digit:
                cmp     al,'#'
                jne     chk_star
35              mov     al,0ah
                jmp     short buffer_insert chk_star:
                cmp     al,'*'
40              jne     chk_letter
                mov     al,0bh
                jmp     short buffer_insert chk_letter:
45              cmp     al,'A'
                jb      key_loop
                cmp     al,'D'
                ja      chk_lower
                sub     al,'A'- 0ch
50              jmp     short buffer_insert
```

```
chk_lower:
        cmp     al,'a'
        jb      key_loop
        cmp     al,'d'
        ja      key_loop
        sub     al,'a' - 0ch buffer_insert:
        cmp     bx,40
        je      key_loop mov     dial_buffer[bx],al
        inc     bx mov     al,cl
        stosb               ; print the character to the screen
        inc     di ; move the cursor
        mov     ah,02h
        inc     dl
        int     10h ;       cmp     bx,40
;       jne     key_loop ;       dec     bx
;       dec     dl
;       int     10h
;       sub     di,2
        jmp     key_loop dial_string_done:
        mov     dial_buffer[bx],0ffh IF board
        call    off_hook
        call    speaker_on
        mov     ax,2 * 100      ; 2 sec.
        call    init_timer off_hook_wait:
        test    recv_flags,b5
        jz      off_hook_wait mov     buffer_pointer,0
dial_loop:
        mov     bx,buffer_pointer
        mov     bl,dial_buffer[bx]
        inc     buffer_pointer
```

```
                cmp     bl,0ffh
                je      dial_done
                mov     ax,7            ; 70 ms
                call    dtmf
 5              jc      dial_done mov     ax,7            ; 70 ms
                call    init_timer 10      inter_digit_wait:
                test    recv_flags,b5
                jz      inter_digit_wait jmp     short dial_loop
15      dial_done:
            ENDIF
        ; clear out the input line
                mov     es,display_segment
20              mov     di,((( 8 * 80 ) + 30 ) * 2 )
                mov     al,' '
                mov     cx,41
        clear_loop:
                stosb
25              inc     di
                loop    clear_loop lea     si,dial_menu
                call    window_flip
30
        ; hide the cursor
                mov     ah,02h
                xor     bh,bh
                mov     dh,25
35              mov     dl,0
                int     10h ret

40      DIAL    ENDP
                END

.model small
        .286
45      ;%%%%%%%%%%%%%%%%%%%%%%%%%%%%%%%%%%%%%%%%%%%
        ;
        ;       Callp Progress
        ;
        ;       This program does all the call progress finctions.
50      ;       It uses a 7200 Hz. receive sample to detect answer tone,
```

```
        ;       busy, ringing, voice, and dial tone.
        ;       This file also contains all the filter routines.
        ;
        ;%%%%%%%%%%%%%%%%%%%%%%%%%%%%%%%%%%%%%%%%%%%%%%%%%
5
                include         equates public          callp_main,touch_tone_detect
                public          aic_cmd1,aic_cmd2,init_callp,get_callp
10              public          get_touch_tone extrn   init_aic:near,init_dma:near
                extrn   window_flip:near,nul_routine:near
                extrn   tone_int:near,get_tx_data:near
15              extrn   tx1224:near,init_tx:near,setup_sample_cnt:near
                extrn   init_tx_dma:near,tx_dma_off:near
                extrn   rx_dma_on:near,rx_dma_off:near
                extrn   dtmf_int:near 20              extrn   rx_sample_segment:word,rx_out:word
                extrn   init_aic_tx48_rx72:word,recv_flags:word
                extrn   recv_vector:word,rx_dma_ala16:word
                extrn   display_segment:word,freq:word,freq_sum:word
                extrn   rx_in:word,tx_in_ptr:word,tx_out_ptr:word
25              extrn   recv_sample_count:word,timer_10ms:word
                extrn   sreg:word,tx_flags:word,tx_vector:word
                extrn   freq2:word,freq_sum2:word extrn   ttone_detect_win:byte
30              extrn   callp_win:byte
                extrn   timer_tic:byte,timer_reload:byte .data
        ;***************** DC NOTCH COEFF
35              notch0_1scalar  dw      7979h
                notch0_1b1      dw      7333h ;***************** CALL PROGRESS COEFF
                callp_1scalar   dw      0db2h
40              callp_1a1       dw      -578fh
                callp_1b1       dw      5db0h           ; 1/2
                callp_1b2       dw      -4dd8h callp_2scalar   dw      1333h
45              callp_2a1       dw      4240h
                callp_2b1       dw      5b20h           ; 1/2
                callp_2b2       dw      -6e18h comment         !
50      ;***************** VOICE COEFF
```

```
        voice_1scalar     dw    4873h
        voice_1a1    dw    -6470h              ; 1/2
        voice_1b1    dw    63f8h
        voice_1b2    dw    -43bah voice_2scalar     dw    347bh
        voice_2a1    dw    -7464h              ; 1/2
        voice_2b1    dw    4ffch       ; 1/2
        voice_2b2    dw    -72b6h voice_3scalar     dw    49fch
        !

;**************** ANSWER TONE COEFF
        ans_tone_1scalar dw   251h
        ans_tone_1b1    dw    -6208h
        ans_tone_1b2    dw    -7c28h ans_tone_2scalar dw   10a4h
        ans_tone_2b1    dw    -59b0h
        ans_tone_2b2    dw    -7c28h ;**************** TOUCH TONE DETECT COEFF
        hz697_770_1scalar dw  1c29h
        hz697_770_1a1    dw   -6fc3h           ; 1/2
        hz697_770_1b1    dw   67bfh     ; 1/2
        hz697_770_1b2    dw   -7b23h hz697_770_2scalar dw  3852h
        hz697_770_2a1    dw   -5bceh           ; 1/2
        hz697_770_2b1    dw   6184h     ; 1/2
        hz697_770_2b2    dw   -7b23h hz1209_1336_1scalar dw 199ah
        hz1209_1336_1a1   dw  -4db3h           ; 1/2
        hz1209_1336_1b1   dw  7df0h
        hz1209_1336_1b2   dw  -799ah hz1209_1336_2scalar dw 4148h
        hz1209_1336_2a1   dw  -43e0h
        hz1209_1336_2b1   dw  5f36h
        hz1209_1336_2b2   dw  -799ah sample            dw  ?
; call progress delay line variables
        notch0_10    dw    ?
        notch0_11    dw    ?
        notch0_21    dw    ?

comment      !
```

```
        voice_11    dw      ?
        voice_12    dw      ?
        voice_21    dw      ?
        voice_22    dw      ?
  5     voice_31    dw      ?
        voice_32    dw      ?
        voice_41    dw      ?
        voice_42    dw      ?
        voice_51    dw      ?
 10     !

callp_11    dw      ?
        callp_12    dw      ?
        callp_21    dw      ?
 15     callp_22    dw      ?
        callp_31    dw      ?
        callp_32    dw      ?
        callp_41    dw      ?
        callp_42    dw      ?
 20
        ans_tone_11 dw      ?
        ans_tone_12 dw      ?
        ans_tone_21 dw      ?
        ans_tone_22 dw      ?
 25     ans_tone_31 dw      ?
        ans_tone_32 dw      ?
        ans_tone_41 dw      ?
        ans_tone_42 dw      ?

30     no_filter_sum_high      dw      ?
        no_filter_sum_low  dw   ?
      ; voice_sum_high          dw      ?
      ; voice_sum_low           dw      ?
        callp_sum_high          dw      ?
 35     callp_sum_low           dw      ?
        ans_tone_sum_high  dw   ?
        ans_tone_sum_low   dw   ?

old_no_filt_high   dw   ?
 40     old_no_filt_low         dw      ?
      ; old_voice_high          dw      ?
      ; old_voice_low           dw      ?
        old_callp_high          dw      ?
        old_callp_low           dw      ?
 45     old_atone_high          dw      ?
        old_atone_low           dw      ?

sample_count    dw      ?
        scount_reload   dw      ?
 50
```

```
; Touch Tone detect variables
        hz697_770_11    dw      ?
        hz697_770_12    dw      ?
        hz697_770_21    dw      ?
        hz697_770_22    dw      ?
        hz697_770_31    dw      ?
        hz697_770_32    dw      ?
        hz697_770_41    dw      ?
        hz697_770_42    dw      ?

hz1209_1336_11  dw      ?
        hz1209_1336_12  dw      ?
        hz1209_1336_21  dw      ?
        hz1209_1336_22  dw      ?
        hz1209_1336_31  dw      ?
        hz1209_1336_32  dw      ?
        hz1209_1336_41  dw      ?
        hz1209_1336_42  dw      ?

fil697_sum_high         dw      ?
        fil697_sum_low          dw      ?
        old_fil697_high         dw      ?
        old_fil697_low          dw      ?

fil1209_sum_high  dw    ?
        fil1209_sum_low         dw      ?
        old_fil1209_high  dw    ?
        old_fil1209_low         dw      ?

ascii_converter         db      '0','1','2','3','4','5','6','7','8','9'
                        db      'A','B','C','D','E','F' aic_cmd1        dw      ?
        aic_cmd2        dw      ?

.code
;
;$$$$$$$$$$$$$$$$$$$$$$$$$$$$$$$$$$$$$$$$$$$$$$$$$$$$
;
CALLP_FILTERS   PROC    NEAR call    chk_sample_count
        jnc     do_callp
        ret end_atone_routine:
; answer tone mean square
        mov     ax,bx           ; output ^ 2
        imul    bx
        mov     bx,dx           ; DX:AX already divided by 2
```

```
                and     bx,0fh              ; shift right by 4 to get one 32nd
                rol     bx,4
                sar     dx,4
                shr     ax,4
5               or      ah,bl
                add     ans_tone_sum_low,ax
                adc     ans_tone_sum_high,dx
                jmp     count_it 10      do_callp:
                mov     es,rx_sample_segment
                mov     si,rx_out    ; filter sample pointer
        filter_loop:
                mov     ax,es:[si]   ; input sample
15              add     si,2 mov     sample,ax
                test    recv_flags,b8
                jnz     answer_tone_filter
20
        ; Remove any DC from the sample ---- NOTCH 0
                mov     bx,notch0_11
                neg     bx                  ; -1
                imul    notch0_1scalar
25              sal     dx,1
                mov     notch0_11,dx
                add     bx,dx
                mov     ax,notch0_21
                imul    notch0_1b1
30              sal     dx,1
                add     bx,dx
                mov     notch0_21,bx
                mov     sample,bx 35      ; No filter averaging
                mov     ax,bx        ; output ^ 2
                imul    bx
                sal     ax,1         ; adjust for the multiply
                rcl     dx,1
40              mov     al,ah        ; divide by 256
                mov     ah,dl
                mov     dl,dh
                xor     dh,dh        ; result is positive
                add     no_filter_sum_low,ax
45              adc     no_filter_sum_high,dx ; Answer tone filter
        answer_tone_filter:
                mov     bx,ans_tone_12
50              mov     ax,ans_tone_11
```

```
        mov     ans_tone_12,ax
        sar     ax,2
        neg     ax
        add     ax,ans_tone_11          ; .75 * ans_tone_11
 5      sub     bx,ax
        mov     ax,sample
        imul    ans_tone_1scalar
        sal     dx,1
        mov     ans_tone_11,dx
10      add     bx,dx
        mov     ax,ans_tone_22
        imul    ans_tone_1b2
        sal     dx,1
        add     bx,dx
15      mov     ax,ans_tone_21
        mov     ans_tone_22,ax
        imul    ans_tone_1b1
        sal     dx,1
        add     bx,dx
20      mov     ans_tone_21,bx          ; output of the first filter stage mov     ax,bx
        imul    ans_tone_2scalar
        sal     dx,1
25      mov     bx,ans_tone_32
        mov     ax,ans_tone_31
        mov     ans_tone_32,ax
        sar     ax,2
        add     ax,ans_tone_31
30      add     bx,ax
        mov     ans_tone_31,dx
        add     bx,dx
        mov     ax,ans_tone_42
        imul    ans_tone_2b2
35      sal     dx,1
        add     bx,dx
        mov     ax,ans_tone_41
        mov     ans_tone_42,ax
        imul    ans_tone_2b1
40      sal     dx,1
        add     bx,dx                   ; second stage output   BX - output
        mov     ans_tone_41,bx test    recv_flags,b8
45      jz      do_mean_square
        jmp     end_atone_routine
do_mean_square:
; answer tone mean square
        mov     ax,bx           ; output ^ 2
50      imul    bx
```

```
           sal    ax,1          ; adjust for the multiply
           rcl    dx,1
           mov    al,ah         ; divide by 256
           mov    ah,dl
 5         mov    dl,dh
           xor    dh,dh         ; result is positive
           add    ans_tone_sum_low,ax
           adc    ans_tone_sum_high,dx 10         comment    !
       ; Voice filter
           mov    bx,voice_12
           mov    ax,voice_11
           mov    voice_12,ax
15         imul   voice_1a1
           sal    dx,2          ; * 2
           add    bx,dx
           mov    ax,sample
           imul   voice_1scalar
20         sal    dx,1
           mov    voice_11,dx
           add    bx,dx mov    ax,voice_22
25         imul   voice_1b2
           sal    dx,1
           add    bx,dx
           mov    ax,voice_21
           mov    voice_22,ax
30         imul   voice_1b1
           sal    dx,1
           add    bx,dx         ; 1st stage output
           mov    voice_21,bx 35         mov    ax,bx
           imul   voice_2scalar
           sal    dx,1
           mov    bx,voice_32
           mov    ax,voice_31
40         mov    voice_32,ax
           mov    voice_31,dx
           add    bx,dx
           imul   voice_2a1
           sal    dx,2          ; * 2
45         add    bx,dx mov    ax,voice_42
           imul   voice_2b2
           sal    dx,1
50         add    bx,dx
```

```
        mov     ax,voice_41
        mov     voice_42,ax
        imul    voice_2b1
        sal     dx,2            ; * 2
        add     bx,dx           ; 2nd stage output
        mov     voice_41,bx mov     ax,bx
        imul    voice_3scalar
        sal     dx,2            ; * 2
        mov     ax,voice_51
        mov     voice_51,dx
        sub     dx,ax           ; dx - output ; voice mean square
        mov     ax,dx           ; output ^ 2
        imul    dx
        sal     ax,1            ; adjust for the multiply
        rcl     dx,1
        mov     al,ah           ; divide by 256
        mov     ah,dl
        mov     dl,dh
        xor     dh,dh           ; result is positive
        add     voice_sum_low,ax
        adc     voice_sum_high,dx
        !

; Call Progress filter
        mov     bx,callp_12
        mov     ax,callp_11
        mov     callp_12,ax
        imul    callp_1a1
        sal     dx,1
        add     bx,dx
        mov     ax,sample
        imul    callp_1scalar
        sal     dx,1
        mov     callp_11,dx
        add     bx,dx mov     ax,callp_22
        imul    callp_1b2
        sal     dx,1
        add     bx,dx
        mov     ax,callp_21
        mov     callp_22,ax
        imul    callp_1b1
        sal     dx,2
        add     bx,dx
        mov     callp_21,bx     ; 1st stage output
```

```
        mov     ax,bx
        imul    callp_2scalar
        sal     dx,1
        mov     bx,callp_32
5       mov     ax,callp_31
        mov     callp_32,ax
        mov     callp_31,dx
        add     bx,dx
        imul    callp_2a1
10      sal     dx,1
        add     bx,dx mov     ax,callp_42
        imul    callp_2b2
15      sal     dx,1
        add     bx,dx
        mov     ax,callp_41
        mov     callp_42,ax
        imul    callp_2b1
20      sal     dx,2
        add     bx,dx
        mov     callp_41,bx     ; BX = output ; call progress mean square
25      mov     ax,bx           ; output ^ 2
        imul    bx
        sal     ax,1            ; adjust for the multiply
        rcl     dx,1
        mov     al,ah           ; divide by 256
30      mov     ah,dl
        mov     dl,dh
        xor     dh,dh           ; result is positive
        add     callp_sum_low,ax
        adc     callp_sum_high,dx
35
count_it:
        dec     sample_count
        jnz     check_samples
40      or      recv_flags,b7 mov     ax,scount_reload
        mov     sample_count,ax 45      xor     dx,dx mov     ax,no_filter_sum_low
        mov     bx,no_filter_sum_high
        mov     old_no_filt_low,ax
50      mov     old_no_filt_high,bx
```

185

```
              mov     no_filter_sum_low,dx
              mov     no_filter_sum_high,dx comment   !
 5            mov     ax,voice_sum_low
              mov     bx,voice_sum_high
              mov     old_voice_low,ax
              mov     old_voice_high,bx
              mov     voice_sum_low,dx
10            mov     voice_sum_high,dx
              !

mov     ax,callp_sum_low
              mov     bx,callp_sum_high
15            mov     old_callp_low,ax
              mov     old_callp_high,bx
              mov     callp_sum_low,dx
              mov     callp_sum_high,dx 20            mov     ax,ans_tone_sum_low
              mov     bx,ans_tone_sum_high
              mov     old_atone_low,ax
              mov     old_atone_high,bx
              mov     ans_tone_sum_low,dx
25            mov     ans_tone_sum_high,dx check_samples:
              cmp     si,rx_samples_length
              jne     no_wrap
30            xor     si,si
      no_wrap:
              dec     cx
              jcxz    no_samples
              jmp     filter_loop
35    no_samples:
              mov     rx_out,si
              ret CALLP_FILTERS   ENDP
40    ;
      ;%%%%%%%%%%%%%%%%%%%%%%%%%%%%%%%%%%%%%%%%%%%%%%%
      ;
      DTMF_FILTERS    PROC    NEAR 45            call    chk_sample_count
              jnc     do_ttone
              ret do_ttone:
50            mov     es,rx_sample_segment
```

```
                mov     si,rx_out       ; filter sample pointer
        ttone_filter_loop:
                mov     ax,es:[si]      ; input sample
                add     si,2
 5
                mov     sample,ax ; Remove any DC from the sample ---- NOTCH 0
                mov     bx,notch0_11
10              neg     bx              ; -1
                imul    notch0_1scalar
                sal     dx,1
                mov     notch0_11,dx
                add     bx,dx
15              mov     ax,notch0_21
                imul    notch0_1b1
                sal     dx,1
                add     bx,dx
                mov     notch0_21,bx
20              mov     sample,bx ; No filter averaging
                mov     ax,bx           ; output ^ 2
                imul    bx
25              sal     ax,1            ; adjust for the multiply
                rcl     dx,1
                mov     al,ah           ; divide by 256
                mov     ah,dl
                mov     dl,dh
30              xor     dh,dh           ; result is positive
                add     no_filter_sum_low,ax
                adc     no_filter_sum_high,dx ; 697 - 770 Hz filter
35      filter_697:
                mov     bx,hz697_770_12
                mov     ax,hz697_770_11
                mov     hz697_770_12,ax
                imul    hz697_770_1a1
40              sal     dx,2            ; * 2
                add     bx,dx
                mov     ax,sample
                imul    hz697_770_1scalar
                sal     dx,1
45              mov     hz697_770_11,dx
                add     bx,dx
                mov     ax,hz697_770_22
                imul    hz697_770_1b2
                sal     dx,1
50              add     bx,dx
```

```
        mov     ax,hz697_770_21
        mov     hz697_770_22,ax
        imul    hz697_770_1b1
        sal     dx,2                    ; * 2
    5   add     bx,dx
        mov     hz697_770_21,bx         ; output of the first filter stage mov     ax,bx
   10   imul    hz697_770_2scalar
        sal     dx,1
        mov     bx,hz697_770_32
        mov     ax,hz697_770_31         ; shift the delay line
        mov     hz697_770_32,ax
   15   add     bx,dx
        mov     hz697_770_31,dx         ; store the input * scalar
        imul    hz697_770_2a1
        sal     dx,2                    ; * 2
        add     bx,dx
   20   mov     ax,hz697_770_42
        imul    hz697_770_2b2
        sal     dx,1
        add     bx,dx
        mov     ax,hz697_770_41
   25   mov     hz697_770_42,ax
        imul    hz697_770_2b1
        sal     dx,2                    ; * 2
        add     bx,dx
        mov     hz697_770_41,bx         ; second stage output  BX = output
   30
    ; fil 697 - 770 mean square
        mov     ax,bx           ; output ^ 2
        imul    bx
        sal     ax,1            ; adjust for the multiply
   35   rcl     dx,1
        mov     al,ah           ; divide by 256
        mov     ah,dl
        mov     dl,dh
        xor     dh,dh           ; result is positive
   40   add     fil697_sum_low,ax
        adc     fil697_sum_high,dx ; 1209 - 1336 Hz filter
    filter_1209:
   45   mov     bx,hz1209_1336_12
        mov     ax,hz1209_1336_11
        mov     hz1209_1336_12,ax
        imul    hz1209_1336_1a1
        sal     dx,2            ; * 2
   50   add     bx,dx

188
```

```
            mov     ax,sample
            imul    hz1209_1336_1scalar
            sal     dx,1
            mov     hz1209_1336_11,dx
 5          add     bx,dx mov     ax,hz1209_1336_22
            imul    hz1209_1336_1b2
            sal     dx,1
10          add     bx,dx
            mov     ax,hz1209_1336_21
            mov     hz1209_1336_22,ax
            imul    hz1209_1336_1b1
            sal     dx,1
15          add     bx,dx
            mov     hz1209_1336_21,bx       ; output of the first filter stage mov     ax,bx
            imul    hz1209_1336_2scalar
20          sal     dx,1
            mov     bx,hz1209_1336_32
            mov     ax,hz1209_1336_31       ; shift the delay line
            mov     hz1209_1336_32,ax
            mov     hz1209_1336_31,dx       ; store the input * scalar
25          add     bx,dx
            imul    hz1209_1336_2a1
            sal     dx,1
            add     bx,dx
            mov     ax,hz1209_1336_42
30          imul    hz1209_1336_2b2
            sal     dx,1
            add     bx,dx
            mov     ax,hz1209_1336_41
            mov     hz1209_1336_42,ax
35          imul    hz1209_1336_2b1
            sal     dx,1
            add     bx,dx                   ; second stage output  BX - output
            mov     hz1209_1336_41,bx 40      ; fil 1209 - 1336 mean square
            mov     ax,bx           ; output ^ 2
            imul    bx
            sal     ax,1            ; adjust for the multiply
            rcl     dx,1
45          mov     al,ah           ; divide by 256
            mov     ah,dl
            mov     dl,dh
            xor     dh,dh           ; result is positive
            add     fil1209_sum_low,ax
50          adc     fil1209_sum_high,dx
```

189

```
count_sample:
        dec     sample_count
        jnz     check_sample_buf
        or      recv_flags,b7 mov     ax,scount_reload
        mov     sample_count,ax xor     dx,dx mov     ax,no_filter_sum_low
        mov     bx,no_filter_sum_high
        mov     old_no_filt_low,ax
        mov     old_no_filt_high,bx
        mov     no_filter_sum_low,dx
        mov     no_filter_sum_high,dx mov     ax,fil697_sum_low
        mov     bx,fil697_sum_high
        mov     old_fil697_low,ax
        mov     old_fil697_high,bx
        mov     fil697_sum_low,dx
        mov     fil697_sum_high,dx mov     ax,fil1209_sum_low
        mov     bx,fil1209_sum_high
        mov     old_fil1209_low,ax
        mov     old_fil1209_high,bx
        mov     fil1209_sum_low,dx
        mov     fil1209_sum_high,dx check_sample_buf:
        cmp     si,rx_samples_length
        jne     no_end
        xor     si,si
no_end:
        dec     cx
        jcxz    no_more_samples
        jmp     ttone_filter_loop
no_more_samples:
        mov     rx_out,si
        ret DTMF_FILTERS       ENDP
;
;%%%%%%%%%%%%%%%%%%%%%%%%%%%%%%%%%%%%%%%%%%%%%%%
;
CALLP_INIT PROC  NEAR IF board
```

```
                lea     si,init_aic_tx48_rx72   ; tx 4800 rx 7200
                call    init_aic
                call    init_dma
        ELSE
                xor     ax,ax
                mov     tx_in_ptr,ax
                mov     tx_out_ptr,ax
                mov     rx_in,ax
        ENDIF mov     rx_out,0
                mov     sample_count,256
                mov     scount_reload,256
                ret CALLP_INIT  ENDP
    ;
    ;%%%%%%%%%%%%%%%%%%%%%%%%%%%%%%%%%%%%%%%%%%%%%%%%%%%%%%
    ;
    CALLP_MAIN  PROC    NEAR
    .data
            atone_cnt   dw      ?
    .code
            call    callp_init lea     si,callp_win
            call    window_flip IF board
            mov     ax,sreg+9
            mov     atone_cnt,ax mov     ax,sreg+7
            mov     bx,50
            mul     bx
            cli
            mov     timer_10ms,ax
            mov     timer_tic,9
            mov     timer_reload,9
            and     recv_flags,NOT( b5 OR b7 OR b8 )
            mov     recv_vector,offset callp_filters
            sti ; enable DMA channel 2   RECV DMA
            call    rx_dma_on
        ELSE
            mov     recv_sample_count,16
            mov     freq,20252      ; 2225 Hz at a 7200 Hz sample rate
    ;       mov     freq,3231       ; 1210
            mov     freq_sum,0
```

```
            ENDIF callp_loop:
            IFE     board
  5             mov     cx,20000
        here:
                loop    here
                call    tone_int
                call    get_tx_data
 10             call    callp_filters
            ELSE
                test    recv_flags,b5
                jnz     callp_exit
            ENDIF
 15         test    recv_flags,b7
            jz      callp_loop and     recv_flags,NOT b7

20     IF board
        ; check the thresholds
                cmp     old_atone_high,0
                jne     got_atone
                cmp     old_atone_low,4000h
 25             jb      no_atone
        got_atone:
        ; is ans_tone > no_filt/4 ?
                mov     ax,old_no_filt_high
                mov     bx,old_no_filt_low
 30             sar     ax,1
                rcr     bx,1
                sar     ax,1
                rcr     bx,1
                cmp     old_atone_high,ax
 35             jl      no_atone
                jg      got_it
                cmp     old_atone_low,bx        ; high parts are equal
                jb      no_atone
        got_it:
 40             dec     atone_cnt
                jz      get_end_atone
                jmp     short display_levels
        no_atone:
                mov     ax,sreg+9
 45             mov     atone_cnt,ax
        display_levels:
            ENDIF
                call    print_callp 50             mov     ah,1
```

```
                int     16h
                jz      callp_loop mov     ah,0
5               int     16h callp_exit:
                lea     si,callp_win
                call    window_flip
10
        call_exit:
           IF board
        ; disable DMA channel 2 RECV DMA
                call    rx_dma_off
15              mov     recv_vector,offset nul_routine
           ENDIF stc
                ret
20
           IF board
        get_end_atone:
        ; look for 4.44 ms samples
                cli
25              mov     sample_count,32
                mov     scount_reload,32
                mov     ans_tone_sum_low,0
                mov     ans_tone_sum_high,0
                or      recv_flags,b8           ; end of answer tone
30              sti mov     atone_cnt,17            ; this is the success flag
                mov     ax,old_atone_low
                mov     bx,old_atone_high
35              sar     bx,1
                rcr     ax,1
                sar     bx,1
                rcr     ax,1                    ; BX,AX holds end answer tone threshold 40              push    ax
                push    bx lea     si,callp_win
                call    window_flip
45
                call    init_tx_dma
                and     tx_flags,0fffeh         ; tx low
                call    init_tx 50              mov     tx_vector,offset tx1224 ; start the transmitter
```

```
                pop     bx
                pop     ax end_atone_loop:
                test    recv_flags,b5
                jnz     callp_exit
                test    recv_flags,b7
                jz      end_atone_loop and     recv_flags,NOT b7
                mov     dx,old_atone_high
                mov     cx,old_atone_low
                sub     cx,ax
                sbb     dx,bx
                js      got_end push    ax
                mov     ah,1
                int     16h
                pop     ax
                jz      end_atone_loop mov     ah,0
                int     16h mov     tx_vector,offset nul_routine
                call    tx_dma_off jmp     call_exit
        got_end:
        ; disable DMA channel 2 RECV DMA
                call    rx_dma_off
                mov     recv_vector,offset nul_routine mov     aic_cmd1,383ch
                mov     aic_cmd2,3c72h
                or      tx_flags,b8 wait1:
                test    tx_flags,b8
                jnz     wait1 wait2:
                test    tx_flags,b9
                jnz     wait2 clc
                ret
```

```
        ENDIF
    CALLP_MAIN  ENDP
    ;
    ;%%%%%%%%%%%%%%%%%%%%%%%%%%%%%%%%%%%%%%%%%%%%%%%%%
    ;
    PRINT_WORD  PROC  NEAR
    ; upon entry DI - screen offset, CL - attribute, and DX - word to print
            mov    bl,dh
            ror    bl,4
            and    bl,0fh
            xor    bh,bh
            mov    al,byte ptr ascii_converter[bx]
            stosw
            mov    bl,dh
            and    bl,0fh
            mov    al,byte ptr ascii_converter[bx]
            stosw
            mov    bl,dl
            ror    bl,4
            and    bl,0fh
            mov    al,byte ptr ascii_converter[bx]
            stosw
            mov    bl,dl
            and    bl,0fh
            mov    al,byte ptr ascii_converter[bx]
            stosw
            ret PRINT_WORD  ENDP
    ;
    ;%%%%%%%%%%%%%%%%%%%%%%%%%%%%%%%%%%%%%%%%%%%%%%%%%
    ;
    PRINT_CALLP PROC  NEAR ; print the result in the callp progress window
            mov    di,((( 9 * 80 ) + 47 ) * 2 )    ; screen offset
            xor    bx,bx
            mov    es,display_segment
            mov    ah,31h                          ; attribute
            mov    dx,old_no_filt_high
            call   print_word
            mov    dx,old_no_filt_low
            call   print_word mov    di,((( 10 * 80 ) + 47 ) * 2 )
            mov    dx,old_callp_high
            call   print_word
            mov    dx,old_callp_low
            call   print_word
```

```
            comment     !
            mov     di,((( 9 * 80 ) + 44 ) * 2 )
            mov     dx,old_voice_high
            call    print_word
  5         mov     dx,old_voice_low
            call    print_word
            !

mov     di,((( 11 * 80 ) + 47 ) * 2 )
 10         mov     dx,old_atone_high
            call    print_word
            mov     dx,old_atone_low
            call    print_word
            ret
 15
      PRINT_CALLP ENDP
      ;
      ;%%%%%%%%%%%%%%%%%%%%%%%%%%%%%%%%%%%%%%%%%%%%%%%%%
      ;
 20   TOUCH_TONE_DETECT PROC   NEAR lea     si,ttone_detect_win
            call    window_flip 25         call    setup_dtmf_detect ; main loop
      ttone_detect_loop:
        IFE board
 30         mov     cx,40000
      here2:
            loop    here2
            call    dtmf_int
            call    get_tx_data
 35         call    dtmf_filters
        ENDIF
            test    recv_flags,b7
            jz      ttone_detect_loop 40         and     recv_flags,NOT b7 call    print_dtmf mov     ah,1
 45         int     16h
            jz      ttone_detect_loop mov     ah,0
            int.    16h
 50
```

```
                lea     si,ttone_detect_win
                call    window_flip IF board
;       disable DMA channel 2 RECV DMA
                call    rx_dma_off
                mov     recv_vector,offset nul_routine
        ENDIF
                stc
                ret TOUCH_TONE_DETECT ENDP
        ;
        ;%%%%%%%%%%%%%%%%%%%%%%%%%%%%%%%%%%%%%%%%%%%%%%%%%%
        ;
        PRINT_DTMF   PROC   NEAR ; print the result in the callp progress window
                mov     di,((( 10 * 80 ) + 47 ) * 2 ) ; screen offset
                xor     bx,bx
                mov     es,display_segment
                mov     ah,31h                        ; attribute
                mov     dx,old_no_filt_high
                call    print_word
                mov     dx,old_no_filt_low
                call    print_word mov     di,((( 11 * 80 ) + 47 ) * 2 ) ; screen offset
                xor     bx,bx
                mov     es,display_segment
                mov     ah,31h                        ; attribute
                mov     dx,old_fil697_high
                call    print_word
                mov     dx,old_fil697_low
                call    print_word mov     di,((( 12 * 80 ) + 47 ) * 2 ) ; screen offset
                xor     bx,bx
                mov     es,display_segment
                mov     ah,31h                        ; attribute
                mov     dx,old_fil1209_high
                call    print_word
                mov     dx,old_fil1209_low
                call    print_word ret PRINT_DTMF   ENDP
        ;
        ;%%%%%%%%%%%%%%%%%%%%%%%%%%%%%%%%%%%%%%%%%%%%%%%%%%
```

```
;
CHK_SAMPLE_COUNT  PROC  NEAR

IF board
        mov    dx,wr_clr_byte_ptr      ; init flag to low byte
        out    dx,al
        jmp    $+2

; how many words are there in the receive buffer?
        mov    dx,dma_6_address     ; get RX in
        in     al,dx
        mov    cl,al
        jmp    $+2
        in     al,dx
        mov    ch,al
        jmp    $+2 mov    dx,wr_clr_byte_ptr      ; init flag to low byte
        out    dx,al
        jmp    $+2 mov    dx,dma_6_address
        in     al,dx
        cmp    cl,al
        je     read_ok
        mov    cl,al
        in     al,dx
        mov    ch,al
read_ok:
        mov    ax,rx_out
        shr    ax,1
        add    ax,rx_dma_a1a16
        sub    cx,ax
        jns    pos_diff
        add    cx,(rx_samples_length/2)
pos_diff:
        jnz    do_funct
        stc
        ret ELSE
        mov    cx,rx_in
        sub    cx,rx_out
        jns    no_rollover
        add    cx,rx_samples_length
no_rollover:
        shr    cx,1        ; word count
        jnz    do_funct
        stc
        ret
```

```
            ENDIF
        do_funct:
                clc
                ret
    CHK_SAMPLE_COUNT  ENDP
    ;
    ;%%%%%%%%%%%%%%%%%%%%%%%%%%%%%%%%%%%%%%%%%%%%%
    ;
    INIT_CALLP  PROC  NEAR call   callp_init cli
                and    recv_flags,NOT( b5 OR b7 OR b8 )
                mov    recv_vector,offset callp_filters
                sti ; enable DMA channel 2   RECV DMA
                call   rx_dma_on ret
    INIT_CALLP  ENDP
    ;
    ;%%%%%%%%%%%%%%%%%%%%%%%%%%%%%%%%%%%%%%%%%%%%%
    ;
    GET_CALLP   PROC  NEAR answer_loop:
                test   recv_flags,b7
                jz     answer_loop and    recv_flags,NOT b7 call   print_callp xor    al,al
                mov    bx,old_callp_high
                cmp    bx,0h
                je     no_callp
                or     al,1
    no_callp:
                ret GET_CALLP   ENDP
    ;
    ;%%%%%%%%%%%%%%%%%%%%%%%%%%%%%%%%%%%%%%%%%%%%%
    ;
    SETUP_DTMF_DETECT PROC  NEAR
                call   callp_init
```

```
                mov     recv_sample_count,16
            IFE board
                mov     freq,1697_72s
        ;       mov     freq,0
 5              mov     freq2,h1336_72s
        ;       mov     freq2,0
        ;       mov     freq,tone_2225_72s
        ;       mov     freq2,tone_2225_72s-200
                mov     freq_sum,0
10              mov     freq_sum2,0
            ELSE
                cli
                and     recv_flags,NOT( b5 OR b7 OR b8 )
                mov     recv_vector,offset dtmf_filters
15              sti ; enable DMA channel 2   RECV DMA
                call    rx_dma_on
            ENDIF
20              ret
        SETUP_DTMF_DETECT ENDP
        ;
        ;%%%%%%%%%%%%%%%%%%%%%%%%%%%%%%%%%%%%%%%%%%%%%%%%%%
        ;
25      GET_TOUCH_TONE    PROC   NEAR call    setup_dtmf_detect ; main loop
30      detect_loop:
                mov     ah,1
                int     16h
                jnz     abort_out
                test    recv_flags,b7
35              jz      detect_loop and     recv_flags,NOT b7

; check the thresholds
40              cmp     old_fil697_high,100h
                jl      detect_loop got_ttone:
        ; is ans_tone > no_filt/4 ?
45              mov     ax,old_no_filt_high
                mov     bx,old_no_filt_low
                sar     ax,1
                rcr     bx,1
                sar     ax,1
50              rcr     bx,1
```

```
        cmp     old_fil697_high,ax
        jl      detect_loop
got_697:
        cmp     old_fil1209_high,ax
        jl      detect_loop end_loop:
        mov     ah,1
        int     16h
        jnz     abort_out
        test    recv_flags,b7
        jz      end_loop and     recv_flags,NOT b7

; check the thresholds
        cmp     old_fil697_high,100h
        jg      end_loop
        jmp     short ok_end abort_out:
        mov     ah,0
        int     16h
ok_end:
    IF board
; disable DMA channel 2 RECV DMA
        call    rx_dma_off
        mov     recv_vector,offset nul_routine
    ENDIF
        stc
        ret

GET_TOUCH_TONE    ENDP
        END

.286
.model    small
;%%%%%%%%%%%%%%%%%%%%%%%%%%%%%%%%%%%%%%%%%%%%%
;
;       WIN is the pop-up window manager
;
;       WIN uses window_init to decompress the windows into RAM.
;       Window_flip and window_up actually print the desired window to the
;       screen.
;
;%%%%%%%%%%%%%%%%%%%%%%%%%%%%%%%%%%%%%%%%%%%%% include equates public    init_screen
```

```
            public      window_flip
            public      main_menu,start_message,end_message
            public      dial_menu,online_msg,window_up
            public      outgoing_msg,recording_msg,callp_win
 5          public      ttone_detect_win extrn display_segment:word extrn attribute:byte
10
    window      macro corner_x,corner_y,x,y db      corner_x,corner_y,x,y
            dw      x*y dup     (?)
15
            endm ; definitions for the compress window macros 20  .data
            corner      dw    ?

include     sft_wins.inc

25  .code
    ;
    ;%%%%%%%%%%%%%%%%%%%%%%%%%%%%%%%%%%%%%%%%%%%%%%%
    ;
    INIT_SCREEN PROC   NEAR
30
            mov     al,'*'
            mov     ah,attribute
            call    fill_screen 35          lea     si,top_menu
            call    window_up lea     si,bottom_menu
            call    window_up
40
            ret INIT_SCREEN ENDP
    ;
45  ;%%%%%%%%%%%%%%%%%%%%%%%%%%%%%%%%%%%%%%%%%%%%%%%
    ;
    FILL_SCREEN PROC   NEAR mov     cx,2000
50          mov     es,display_segment
```

```
                xor     di,di
                rep     stosw
                ret FILL_SCREEN ENDP
        ;
        ;------------------------
        ;
        WINDOW_FLIP PROC  NEAR mov     bx,si ; calculate the offset into the display
                xor     ax,ax
                mov     al,[bx]             ;( row + column) * 2
                mov     cl,80
                imul    cl
                mov     cl,[bx+1]
                xor     ch,ch
                add     ax,cx
                shl     ax,1
                mov     di,ax
                mov     corner,ax
                mov     ax,display_segment
                mov     es,ax xor     cx,cx
                mov     cl,[bx][2]          ; window rows
                add     si,4                ; point to the window
        new_row:
                push    cx
                mov     cl,[bx][3]          ; columns
        mov_loop:
                lodsw
                xchg    ax,es:[di]
                mov     ds:[si][-2],ax
                add     di,2
                loop    mov_loop mov     ax,corner
                add     ax,160              ; add a line
                mov     di,ax
                mov     corner,ax pop     cx
                loop    new_row ret
```

```
        WINDOW_FLIP ENDP
        ;
        ;------------------------
        ;
        WINDOW_UP   PROC   NEAR mov    bx,si ; calculate the offset into the display
              xor    ax,ax
              mov    al,[bx]                 ;( row + column) * 2
              mov    cl,80
              imul   cl
              mov    cl,[bx+1]
              xor    ch,ch
              add    ax,cx
              shl    ax,1
              mov    di,ax
              mov    corner,ax
              mov    ax,display_segment
              mov    es,ax xor    cx,cx
              mov    cl,[bx][2]              ; window rows
              add    si,4                    ; point to the window new_row2:
              push   cx
              mov    cl,[bx][3]              ; columns
        ;mov_loop:
        ;     lodsw
        ;     xchg   ax,es:[di]
        ;     mov    ds:[si][-2],ax
        ;     add    di,2
        ;     loop   mov_loop
              rep    movsw mov    ax,corner
              add    ax,160                  ; add a line
              mov    di,ax
              mov    corner,ax pop    cx
              loop   new_row2 ret

WINDOW_UP   ENDP
                    END
```

```
                .data
                outfile         db      'sft_wins.inc',0 windows         label byte

; window macro format is :
                ;       input_str --- label of compressed window
                ;       name      --- name that the application uses for the window
                ;       corner_x,y -- upper left corner
                ;       x,y       --- rows and columns of the window
                top_menu    label byte
                        window  top_menu_str,'top_menu',0,0,1,80
                                                ; format is w,x,y,z
                                                ; w,x - row,column of the
                                                ; upper left corner
                                                ; y,z - row,column of window
                bottom_menu label byte
                        window  bottom_menu_str,'bottom_menu',24,0,1,80 main_menu   label byte
                        window  main_menu_str,'main_menu',7,21,11,38 start_message   label byte
                        window  start_message_str,'start_message',3,23,3,35 end_message label byte
                        window  end_message_str,'end_message',3,23,3,34 dial_menu   label byte
                        window  dial_menu_str,'dial_menu',7,7,3,66 online_msg  label byte
                        window  online_msg_str,'online_msg',0,0,1,80 outgoing_msg    label byte
                        window  outgoing_msg_str,'outgoing_msg',7,25,3,27 recording_msg   label byte
                        window  recording_msg_str,'recording_msg',7,25,3,30 callp_win   label byte
                        window  callp_win_str,'callp_win',8,24,5,33 ttone_detect_win label   byte
                        window  ttone_detect_str,'ttone_detect_win',9,24,5,33
                        dw      0ffffh bottom_menu_str db      attrib,05bh
                                        db      ' USRobotics Softmodem (c)1989        Pate'
                                        db      'nt Pending        By: Robert C. Suffern '
```

```
                db      0ffh top_menu_str    db      attrib,05bh
                db      '| Off Line | 8 bits |    No Parity   | 1 '
                db      'Stop Bit | Auto Answer Mode --- Voice |'
                db      0ffh online_msg_str  db      attrib,05bh
                db      '| On Line  | 8 bits |    No Parity   | 1 '
                db      'Stop Bit | 1200 Baud Originate Mode  |'
                db      0ffh main_menu_str   db      attrib,01bh
                db      '┌',copy,36,'┐'
                db      '|    F1 --- Data Mode',copy,17,' ||'
                db      '|    F2 --- Record a Message              |'
                db      '|    F3 --- Play Back a Message           |'
                db      '|    F4 --- Send a Tone',copy,15,' ||'
                db      '|    F5 --- Dial a Number                 |'
                db      '|    F6 --- Execute Call Progress         |'
                db      '|    F7 --- Execute Touch-Tone Detect     |'
                db      '|    F8 --- Execute Message List          |'
                db      '|    F10 -- Exit',copy,22,' ||'
                db      '└',copy,36,'┘'
                db      0ffh start_message_str db    attrib,01bh
                db      '┌',copy,33,'┐'
                db      '|   Hit a Key to Begin Recording  ||'
                db      '└',copy,33,'┘'
                db      0ffh end_message_str db      attrib,01bh
                db      '┌',copy,32,'┐'
                db      '|   Hit a Key to Stop Recording  ||'
                db      '└',copy,32,'┘'
                db      0ffh dial_menu_str   db      attrib,01bh
                db      '┌',copy,64,'┐'
                db      '|   Enter Phone Number:',copy,42,' ||'
                db      '└',copy,64,'┘'
                db      0ffh outgoing_msg_str db     attrib,01bh
                db      '┌',copy,25,'┐'
                db      '|    Sending Your Message  ||'
                db      '└',copy,25,'┘'
                db      0ffh
```

```
            recording_msg_str db      attrib,01bh
                        db      '┌',copy,28,'┐'
                        db      '│   Recording Your Message    │'
                        db      '└',copy,28,'┘'
                        db      0ffh callp_win_str   db      attrib,01bh
                        db      '┌',copy,31,'┐'
                        db      '│ No Filter Level:              │'
                        db      '│ Call Progress Level:          │'
                        db      '│ Answer Tone Level:            │'
                        db      '└',copy,31,'┘'
                        db      0ffh ttone_detect_str db     attrib,01bh
                        db      '┌',copy,31,'┐'
                        db      '│ No Filter:                    │'
                        db      '│ 697-770 Hz Filter:            │'
                        db      '│ 1209-1336 Hz Filter:          │'
                        db      '└',copy,31,'┘'
                        db      0ffh ; Window output file
.data top_menu    db      00h,00h,01h,50h
                        db      0b3h,5bh,20h,5bh,4fh,5bh,66h,5bh,66h,5bh
                        db      20h,5bh,4ch,5bh,69h,5bh,6eh,5bh,65h,5bh
                        db      20h,5bh,0b3h,5bh,20h,5bh,38h,5bh,20h,5bh
                        db      62h,5bh,69h,5bh,74h,5bh,73h,5bh,20h,5bh
                        db      0b3h,5bh,20h,5bh,20h,5bh,20h,5bh,20h,5bh
                        db      4eh,5bh,6fh,5bh,20h,5bh,50h,5bh,61h,5bh
                        db      72h,5bh,69h,5bh,74h,5bh,79h,5bh,20h,5bh
                        db      20h,5bh,20h,5bh,0b3h,5bh,20h,5bh,31h,5bh
                        db      20h,5bh,53h,5bh,74h,5bh,6fh,5bh,70h,5bh
                        db      20h,5bh,42h,5bh,69h,5bh,74h,5bh,20h,5bh
                        db      0b3h,5bh,20h,5bh,41h,5bh,75h,5bh,74h,5bh
                        db      6fh,5bh,20h,5bh,41h,5bh,6eh,5bh,73h,5bh
                        db      77h,5bh,65h,5bh,72h,5bh,20h,5bh,4dh,5bh
                        db      6fh,5bh,64h,5bh,65h,5bh,20h,5bh,2dh,5bh
                        db      2dh,5bh,2dh,5bh,20h,5bh,56h,5bh,6fh,5bh
                        db      69h,5bh,63h,5bh,65h,5bh,20h,5bh,0b3h,5bh bottom_menu db      18h,00h,01h,50h
                        db      20h,5bh,55h,5bh,53h,5bh,52h,5bh,6fh,5bh
                        db      62h,5bh,6fh,5bh,74h,5bh,69h,5bh,63h,5bh
                        db      73h,5bh,20h,5bh,53h,5bh,6fh,5bh,66h,5bh
                        db      74h,5bh,6dh,5bh,6fh,5bh,64h,5bh,65h,5bh
                        db      6dh,5bh,20h,5bh,28h,5bh,63h,5bh,29h,5bh
```

```
            db      31h,5bh,39h,5bh,38h,5bh,39h,5bh,20h,5bh
            db      20h,5bh,20h,5bh,20h,5bh,20h,5bh,20h,5bh
            db      20h,5bh,50h,5bh,61h,5bh,74h,5bh,65h,5bh
            db      6eh,5bh,74h,5bh,20h,5bh,50h,5bh,65h,5bh
            db      6eh,5bh,64h,5bh,69h,5bh,6eh,5bh,67h,5bh
            db      20h,5bh,20h,5bh,20h,5bh,20h,5bh,20h,5bh
            db      20h,5bh,20h,5bh,20h,5bh,42h,5bh,79h,5bh
            db      3ah,5bh,20h,5bh,52h,5bh,6fh,5bh,62h,5bh
            db      65h,5bh,72h,5bh,74h,5bh,20h,5bh,43h,5bh
            db      2eh,5bh,20h,5bh,53h,5bh,75h,5bh,66h,5bh
            db      66h,5bh,65h,5bh,72h,5bh,6eh,5bh,20h,5bh main_menu   db      07h,15h,0bh,26h
            db      0c9h,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0bbh,1bh,0bah,1bh,20h,1bh
            db      20h,1bh,20h,1bh,46h,1bh,31h,1bh,20h,1bh
            db      2dh,1bh,2dh,1bh,2dh,1bh,20h,1bh,44h,1bh
            db      61h,1bh,74h,1bh,61h,1bh,20h,1bh,4dh,1bh
            db      6fh,1bh,64h,1bh,65h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      0bah,1bh,0bah,1bh,20h,1bh,20h,1bh,20h,1bh
            db      46h,1bh,32h,1bh,20h,1bh,2dh,1bh,2dh,1bh
            db      2dh,1bh,20h,1bh,52h,1bh,65h,1bh,63h,1bh
            db      6fh,1bh,72h,1bh,64h,1bh,20h,1bh,61h,1bh
            db      20h,1bh,4dh,1bh,65h,1bh,73h,1bh,73h,1bh
            db      61h,1bh,67h,1bh,65h,1bh,20h,1bh,20h,1bh
            db      20h,1bh,20h,1bh,20h,1bh,20h,1bh,20h,1bh
            db      20h,1bh,20h,1bh,20h,1bh,0bah,1bh,0bah,1bh
            db      20h,1bh,20h,1bh,20h,1bh,46h,1bh,33h,1bh
            db      20h,1bh,2dh,1bh,2dh,1bh,2dh,1bh,20h,1bh
            db      50h,1bh,6ch,1bh,61h,1bh,79h,1bh,20h,1bh
            db      42h,1bh,61h,1bh,63h,1bh,6bh,1bh,20h,1bh
            db      61h,1bh,20h,1bh,4dh,1bh,65h,1bh,73h,1bh
            db      73h,1bh,61h,1bh,67h,1bh,65h,1bh,20h,1bh
            db      20h,1bh,20h,1bh,20h,1bh,20h,1bh,20h,1bh
            db      20h,1bh,0bah,1bh,0bah,1bh,20h,1bh,20h,1bh
            db      20h,1bh,46h,1bh,34h,1bh,20h,1bh,2dh,1bh
            db      2dh,1bh,2dh,1bh,20h,1bh,53h,1bh,65h,1bh
            db      6eh,1bh,64h,1bh,20h,1bh,61h,1bh,20h,1bh
            db      54h,1bh,6fh,1bh,6eh,1bh,65h,1bh,20h,1bh
            db      20h,1bh,20h,1bh,20h,1bh,20h,1bh,20h,1bh
            db      20h,1bh,20h,1bh,20h,1bh,20h,1bh,20h,1bh
```

```
                db      20h,1bh,20h,1bh,20h,1bh,20h,1bh,0bah,1bh
                db      0bah,1bh,20h,1bh,20h,1bh,20h,1bh,46h,1bh
                db      35h,1bh,20h,1bh,2dh,1bh,2dh,1bh,2dh,1bh
                db      20h,1bh,44h,1bh,69h,1bh,61h,1bh,6ch,1bh
5               db      20h,1bh,61h,1bh,20h,1bh,4eh,1bh,75h,1bh
                db      6dh,1bh,62h,1bh,65h,1bh,72h,1bh,20h,1bh
                db      20h,1bh,20h,1bh,20h,1bh,20h,1bh,20h,1bh
                db      20h,1bh,20h,1bh,20h,1bh,20h,1bh,20h,1bh
                db      20h,1bh,20h,1bh,0bah,1bh,0bah,1bh,20h,1bh
10              db      20h,1bh,20h,1bh,46h,1bh,36h,1bh,20h,1bh
                db      2dh,1bh,2dh,1bh,2dh,1bh,20h,1bh,45h,1bh
                db      78h,1bh,65h,1bh,63h,1bh,75h,1bh,74h,1bh
                db      65h,1bh,20h,1bh,43h,1bh,61h,1bh,6ch,1bh
                db      6ch,1bh,20h,1bh,50h,1bh,72h,1bh,6fh,1bh
15              db      67h,1bh,72h,1bh,65h,1bh,73h,1bh,73h,1bh
                db      20h,1bh,20h,1bh,20h,1bh,20h,1bh,20h,1bh
                db      0bah,1bh,0bah,1bh,20h,1bh,20h,1bh,20h,1bh
                db      46h,1bh,37h,1bh,20h,1bh,2dh,1bh,2dh,1bh
                db      2dh,1bh,20h,1bh,45h,1bh,78h,1bh,65h,1bh
20              db      63h,1bh,75h,1bh,74h,1bh,65h,1bh,20h,1bh
                db      54h,1bh,6fh,1bh,75h,1bh,63h,1bh,68h,1bh
                db      2dh,1bh,54h,1bh,6fh,1bh,6eh,1bh,65h,1bh
                db      20h,1bh,44h,1bh,65h,1bh,74h,1bh,65h,1bh
                db      63h,1bh,74h,1bh,20h,1bh,0bah,1bh,0bah,1bh
25              db      20h,1bh,20h,1bh,20h,1bh,46h,1bh,38h,1bh
                db      20h,1bh,2dh,1bh,2dh,1bh,2dh,1bh,20h,1bh
                db      45h,1bh,78h,1bh,65h,1bh,63h,1bh,75h,1bh
                db      74h,1bh,65h,1bh,20h,1bh,4dh,1bh,65h,1bh
                db      73h,1bh,73h,1bh,61h,1bh,67h,1bh,65h,1bh
30              db      20h,1bh,4ch,1bh,69h,1bh,73h,1bh,74h,1bh
                db      20h,1bh,20h,1bh,20h,1bh,20h,1bh,20h,1bh
                db      20h,1bh,0bah,1bh,0bah,1bh,20h,1bh,20h,1bh
                db      20h,1bh,46h,1bh,31h,1bh,30h,1bh,20h,1bh
                db      2dh,1bh,2dh,1bh,20h,1bh,45h,1bh,78h,1bh
35              db      69h,1bh,74h,1bh,20h,1bh,20h,1bh,20h,1bh
                db      20h,1bh,20h,1bh,20h,1bh,20h,1bh,20h,1bh
                db      20h,1bh,20h,1bh,20h,1bh,20h,1bh,20h,1bh
                db      20h,1bh,20h,1bh,20h,1bh,20h,1bh,20h,1bh
                db      20h,1bh,20h,1bh,20h,1bh,20h,1bh,0bah,1bh
40              db      0c8h,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
45              db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0bch,1bh start_message   db      03h,17h,03h,23h
50              db      0c9h,1bh,0cdh,1bh,0cdh,1bh,0cdh,1bh,0cdh,1bh
```

```
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0bbh,1bh
              db      0bah,1bh,20h,1bh,20h,1bh,20h,1bh,48h,1bh
              db      69h,1bh,74h,1bh,20h,1bh,61h,1bh,20h,1bh
              db      4bh,1bh,65h,1bh,79h,1bh,20h,1bh,74h,1bh
              db      6fh,1bh,20h,1bh,42h,1bh,65h,1bh,67h,1bh
              db      69h,1bh,6eh,1bh,20h,1bh,52h,1bh,65h,1bh
              db      63h,1bh,6fh,1bh,72h,1bh,64h,1bh,69h,1bh
              db      6eh,1bh,67h,1bh,20h,1bh,20h,1bh,0bah,1bh
              db      0c8h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0bch,1bh end_message   db      03h,17h,03h,22h
              db      0c9h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0bbh,1bh,0bah,1bh
              db      20h,1bh,20h,1bh,20h,1bh,48h,1bh,69h,1bh
              db      74h,1bh,20h,1bh,61h,1bh,20h,1bh,4bh,1bh
              db      65h,1bh,79h,1bh,20h,1bh,74h,1bh,6fh,1bh
              db      20h,1bh,53h,1bh,74h,1bh,6fh,1bh,70h,1bh
              db      20h,1bh,52h,1bh,65h,1bh,63h,1bh,6fh,1bh
              db      72h,1bh,64h,1bh,69h,1bh,6eh,1bh,67h,1bh
              db      20h,1bh,20h,1bh,0bah,1bh,0c8h,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0bch,1bh dial_menu     db      07h,07h,03h,42h
              db      0c9h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
```

```
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0bbh,1bh,0bah,1bh,20h,1bh,20h,1bh,20h,1bh
            db      45h,1bh,6eh,1bh,74h,1bh,65h,1bh,72h,1bh
            db      20h,1bh,50h,1bh,68h,1bh,6fh,1bh,6eh,1bh
            db      65h,1bh,20h,1bh,4eh,1bh,75h,1bh,6dh,1bh
            db      62h,1bh,65h,1bh,72h,1bh,3ah,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      20h,1bh,0bah,1bh,0c8h,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0bch,1bh online_msg  db      00h,00h,01h,50h
            db      0b3h,5bh,20h,5bh,4fh,5bh,6eh,5bh,20h,5bh
            db      4ch,5bh,69h,5bh,6eh,5bh,65h,5bh,20h,5bh
            db      20h,5bh,0b3h,5bh,20h,5bh,38h,5bh,20h,5bh
            db      62h,5bh,69h,5bh,74h,5bh,73h,5bh,20h,5bh
            db      0b3h,5bh,20h,5bh,20h,5bh,20h,5bh,20h,5bh
            db      4eh,5bh,6fh,5bh,20h,5bh,50h,5bh,61h,5bh
            db      72h,5bh,69h,5bh,74h,5bh,79h,5bh,20h,5bh
            db      20h,5bh,20h,5bh,0b3h,5bh,20h,5bh,31h,5bh
            db      20h,5bh,53h,5bh,74h,5bh,6fh,5bh,70h,5bh
            db      20h,5bh,42h,5bh,69h,5bh,74h,5bh,20h,5bh
            db      0b3h,5bh,20h,5bh,31h,5bh,32h,5bh,30h,5bh
            db      30h,5bh,20h,5bh,42h,5bh,61h,5bh,75h,5bh
            db      64h,5bh,20h,5bh,4fh,5bh,72h,5bh,69h,5bh
```

```
                db      67h,5bh,69h,5bh,6eh,5bh,61h,5bh,74h,5bh
                db      65h,5bh,20h,5bh,4dh,5bh,6fh,5bh,64h,5bh
                db      65h,5bh,20h,5bh,20h,5bh,20h,5bh,0b3h,5bh 5   outgoing_msg  db    07h,19h,03h,1bh
                db      0c9h,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
10              db      0cdh,1bh,0cdh,1bh,0cdh,1bh,0cdh,1bh,0cdh,1bh
                db      0cdh,1bh,0bbh,1bh,0bah,1bh,20h,1bh,20h,1bh
                db      20h,1bh,53h,1bh,65h,1bh,6eh,1bh,64h,1bh
                db      69h,1bh,6eh,1bh,67h,1bh,20h,1bh,59h,1bh
                db      6fh,1bh,75h,1bh,72h,1bh,20h,1bh,4dh,1bh
15              db      65h,1bh,73h,1bh,73h,1bh,61h,1bh,67h,1bh
                db      65h,1bh,20h,1bh,20h,1bh,0bah,1bh,0c8h,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
20              db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0bch,1bh recording_msg db    07h,19h,03h,1eh
25              db      0c9h,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
30              db      0cdh,1bh,0cdh,1bh,0cdh,1bh,0cdh,1bh,0bbh,1bh
                db      0bah,1bh,20h,1bh,20h,1bh,20h,1bh,52h,1bh
                db      65h,1bh,63h,1bh,6fh,1bh,72h,1bh,64h,1bh
                db      69h,1bh,6eh,1bh,67h,1bh,20h,1bh,59h,1bh
                db      6fh,1bh,75h,1bh,72h,1bh,20h,1bh,4dh,1bh
35              db      65h,1bh,73h,1bh,73h,1bh,61h,1bh,67h,1bh
                db      65h,1bh,20h,1bh,20h,1bh,20h,1bh,0bah,1bh
                db      0c8h,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
40              db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0bch,1bh callp_win   db      08h,18h,05h,21h
45              db      0c9h,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
50              db      0cdh,1bh,0cdh,1bh,0cdh,1bh,0cdh,1bh,0cdh,1bh
```

```
                db      0cdh,1bh,0cdh,1bh,0bbh,1bh,0bah,1bh,20h,1bh
                db      4eh,1bh,6fh,1bh,20h,1bh,46h,1bh,69h,1bh
                db      6ch,1bh,74h,1bh,65h,1bh,72h,1bh,20h,1bh
                db      4ch,1bh,65h,1bh,76h,1bh,65h,1bh,6ch,1bh
                db      3ah,1bh,20h,1bh,20h,1bh,20h,1bh,20h,1bh
                db      20h,1bh,20h,1bh,20h,1bh,20h,1bh,20h,1bh
                db      20h,1bh,20h,1bh,20h,1bh,20h,1bh,20h,1bh
                db      0bah,1bh,0bah,1bh,20h,1bh,43h,1bh,61h,1bh
                db      6ch,1bh,6ch,1bh,20h,1bh,50h,1bh,72h,1bh
                db      6fh,1bh,67h,1bh,72h,1bh,65h,1bh,73h,1bh
                db      73h,1bh,20h,1bh,4ch,1bh,65h,1bh,76h,1bh
                db      65h,1bh,6ch,1bh,3ah,1bh,20h,1bh,20h,1bh
                db      20h,1bh,20h,1bh,20h,1bh,20h,1bh,20h,1bh
                db      20h,1bh,20h,1bh,20h,1bh,0bah,1bh,0bah,1bh
                db      20h,1bh,41h,1bh,6eh,1bh,73h,1bh,77h,1bh
                db      65h,1bh,72h,1bh,20h,1bh,54h,1bh,6fh,1bh
                db      6eh,1bh,65h,1bh,20h,1bh,4ch,1bh,65h,1bh
                db      76h,1bh,65h,1bh,6ch,1bh,3ah,1bh,20h,1bh
                db      20h,1bh,20h,1bh,20h,1bh,20h,1bh,20h,1bh
                db      20h,1bh,20h,1bh,20h,1bh,20h,1bh,20h,1bh
                db      20h,1bh,0bah,1bh,0c8h,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0bch,1bh ttone_detect_win db     09h,18h,05h,21h
                db      0c9h,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0cdh,1bh,0cdh,1bh,0cdh,1bh
                db      0cdh,1bh,0cdh,1bh,0bbh,1bh,0bah,1bh,20h,1bh
                db      4eh,1bh,6fh,1bh,20h,1bh,46h,1bh,69h,1bh
                db      6ch,1bh,74h,1bh,65h,1bh,72h,1bh,3ah,1bh
                db      20h,1bh,20h,1bh,20h,1bh,20h,1bh,20h,1bh
                db      20h,1bh,20h,1bh,20h,1bh,20h,1bh,20h,1bh
                db      20h,1bh,20h,1bh,20h,1bh,20h,1bh,20h,1bh
                db      20h,1bh,20h,1bh,20h,1bh,20h,1bh,20h,1bh
                db      0bah,1bh,0bah,1bh,20h,1bh,36h,1bh,39h,1bh
                db      37h,1bh,2dh,1bh,37h,1bh,37h,1bh,30h,1bh
                db      20h,1bh,48h,1bh,7ah,1bh,20h,1bh,46h,1bh
                db      69h,1bh,6ch,1bh,74h,1bh,65h,1bh,72h,1bh
                db      3ah,1bh,20h,1bh,20h,1bh,20h,1bh,20h,1bh
                db      20h,1bh,20h,1bh,20h,1bh,20h,1bh,20h,1bh
                db      20h,1bh,20h,1bh,20h,1bh,0bah,1bh,0bah,1bh
                db      20h,1bh,31h,1bh,32h,1bh,30h,1bh,39h,1bh
```

```
            db      2dh,1bh,31h,1bh,33h,1bh,33h,1bh,36h,1bh
            db      20h,1bh,48h,1bh,7ah,1bh,20h,1bh,46h,1bh
            db      69h,1bh,6ch,1bh,74h,1bh,65h,1bh,72h,1bh
            db      3ah,1bh,20h,1bh,20h,1bh,20h,1bh,20h,1bh
            db      20h,1bh,20h,1bh,20h,1bh,20h,1bh,20h,1bh
            db      20h,1bh,0bah,1bh,0c8h,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0bch,1bh .286
    .model small
;%%%%%%%%%%%%%%%%%%%%%%%%%%%%%%%%%%%%%%%%%%%%%%%%
;
;       Screen driver routines
;
;       This routine writes the receive data to the screen during terminal
;       mode.
;
;%%%%%%%%%%%%%%%%%%%%%%%%%%%%%%%%%%%%%%%%%%%%%%%% include     equates public      init_comm_screen,save_screen,restore_screen
            public      screen_out,print_parity extrn window_up:near extrn display_segment:word,main_flags:word extrn online_msg:byte .data
            screen_buffer   dw      2000 dup(?)
            cursor          dw      ?
            buffer_pos  dw  ?
            out_char    db  ?

parity_msg  db  '8   No'
                        db  '       '
                        db  '       '
                        db  '       '
                        db  '7  Even'
                        db  '7   Odd'
                        db  '7Space'
                        db  '7 Mark'
    .code
```

```
;
;%%%%%%%%%%%%%%%%%%%%%%%%%%%%%%%%%%%%%%%%%%%%%%%%%%
;
        INIT_COMM_SCREEN  PROC  NEAR lea     si,online_msg
        call    window_up
        call    print_parity mov     cursor,100h
        mov     buffer_pos,160
; position the cursor
        mov     dx,cursor
        mov     ah,02
        xor     bh,bh
        int     10h mov     es,display_segment
        mov     di,160
        mov     cx,(23*80)
        mov     ax,0720h            ; attribute and ' '
        cmp     display_segment,mono
        je      no_color
        mov     ax,1f20h            ; attribute and ' '
no_color:
        rep     stosw call    save_screen ret INIT_COMM_SCREEN  ENDP
;
;%%%%%%%%%%%%%%%%%%%%%%%%%%%%%%%%%%%%%%%%%%%%%%%%%%
;
        SAVE_SCREEN PROC  NEAR
        .data
            cursor_pos  dw     ?
        .code
            mov     cx,2000
            lea     di,screen_buffer
            xor     si,si
            mov     ax,display_segment
            push    ds
            pop     es
            push    ds
            mov     ds,ax
            rep     movsw
            pop     ds
```

```
                mov     ah,03
                xor     bh,bh
                int     10h
                mov     cursor_pos,dx
        ret SAVE_SCREEN ENDP
        ;
        ;%%%%%%%%%%%%%%%%%%%%%%%%%%%%%%%%%%%%%%%%%%%%%%
        ;
        RESTORE_SCREEN    PROC    NEAR mov     cx,2000
                lea     si,screen_buffer
                mov     es,display_segment
                xor     di,di
                rep     movsw mov     ah,02h
                xor     bh,bh
                mov     dx,cursor_pos
                int     10h ret RESTORE_SCREEN    ENDP
        ;
        ;%%%%%%%%%%%%%%%%%%%%%%%%%%%%%%%%%%%%%%%%%%%%%%
        ;
        SCREEN_OUT  PROC    NEAR
        ; AL has the character to print to the screen    0 to 7fh
                cmp     al,' '
                jae     out_it
                cmp     al,cr
                jne     chk_lf ; carriage return
                mov     dx,cursor
                xor     dl,dl
                mov     al,dh
                mov     cl,160
                mul     cl
                mov     buffer_pos,ax
                jmp     no_wrap chk_lf:
                cmp     al,1f
                jne     chk_bs
```

```
            mov     dx,cursor
            cmp     dh,23
            je      scroll_it
            inc     dh
 5          add     buffer_pos,160
            jmp     no_wrap chk_bs:
            cmp     al,bs
10          je      do_bs
            ret
     do_bs:
            cmp     buffer_pos,160
            jne     no_top
15          ret
     no_top:
            sub     buffer_pos,2
            mov     di,buffer_pos
            mov     al,' '
20          push    es
            mov     es,display_segment
            mov     es:[di],al
            pop     es 25          mov     dx,cursor
            dec     dl
            jns     no_wrap
            mov     dl,79
            dec     dh
30          jmp     short no_wrap
     out_it:
            push    es
            mov     es,display_segment
            mov     di,buffer_pos
35          stosb
            inc     di
            mov     buffer_pos,di
            pop     es 40          mov     dx,cursor
            inc     dl
            cmp     dl,80
            jne     no_wrap
            inc     dh
45          cmp     dh,24
            jne     no_scroll mov     buffer_pos,( 23 * 160 )
            mov     dx,1700h
50   scroll_it:
```

217

```
                mov     di,160
                mov     si,320
                mov     cx,22*80
                mov     ax,display_segment
5
                push    es
                push    ds
                mov     ds,ax
                mov     es,ax
10      rep     movsw
                pop     ds mov     cx,80
                mov     al,' '
15      clear_line:
                stosb
                inc     di
                loop    clear_line
                pop     es
20
                jmp     short no_wrap
        no_scroll:
                xor     dl,dl 25      ; get new buffer position
                mov     al,dh
                mov     cl,160
                mul     cl
                mov     buffer_pos,ax
30
        no_wrap:
                mov     cursor,dx
                xor     bh,bh
                mov     ah,02
35              int     10h ret SCREEN_OUT      ENDP
40      ;
        ;%%%%%%%%%%%%%%%%%%%%%%%%%%%%%%%%%%%%%%%%%%%%%%%%%
        ;
        PRINT_PARITY            PROC    NEAR 45              mov     ax,main_flags
                mov     al,ah
                and     ax,07h
                mov     bl,6
                imul    bl
50              mov     bx,ax
```

```
                mov     es,display_segment          ; print word length
                mov     di,26
                mov     al,parity_msg[bx]
                inc     bx
        stosb mov     cx,5
                mov     di,44
        out_loop:
                mov     al,parity_msg[bx]
                stosb
                inc     di
                inc     bx
                loop    out_loop mov     di,70
                mov     ax,5b20h
                mov     [es:di],ax ret

PRINT_PARITY            ENDP
                END

; general equates

; conditional assembly
                board equ       0
                modem_board             equ     35ch buf_len         equ     8192 * 2        ; TX and RX buffers
                rx_samples_length equ   8192 * 2        ; byte size mono equ        0b000h
                color_seg equ           0b800h b0      equ     1
                b1      equ     2
                b2      equ     4
                b3      equ     8
                b4      equ     10h
                b5      equ     20h
                b6      equ     40h
                b7      equ     80h
                b8      equ     100h
                b9      equ     200h
                b10     equ     400h
                b11     equ     800h
```

```
            b12     equ     1000h
            b13     equ     2000h
            b14     equ     4000h
            b15     equ     8000h
5
            cr      equ     13
            lf      equ     10
            bs      equ     8

10          F1      equ     3b00h
            F2      equ     3c00h
            F3      equ     3d00h
            F4      equ     3e00h
            F5      equ     3f00h
15          F6      equ     4000h
            F7      equ     4100h
            F8      equ     4200h
            F9      equ     4300h
            F10     equ     4400h
20
            ALT_A   equ     1e00h
            ALT_H   equ     2300h
            ALT_P   equ     1900h
            ALT_S   equ     1f00h
25
            UP_ARROW   equ    4800h
            DOWN_ARROW equ    5000h 30      ; DMA channels 5 and 6 equates
            dma_5_page      equ     8bh
            dma_6_page      equ     89h dma_5_address      equ     0c4h
35          dma_5_count   equ     0c6h dma_6_address      equ     0c8h
            dma_6_count   equ     0cah 40          rd_status    equ     0d0h
            rd_temp              equ     0dah wr_cmd                equ     0d0h
            wr_req                equ     0d2h
45          wr_single_mask        equ     0d4h
            wr_mode               equ     0d6h
            wr_clr_byte_ptr       equ     0d8h
            wr_master_clr         equ     0dah
            wr_clr_mask   equ     0dch
50          wr_all_mask   equ     0deh
```

```
tone_2225      equ    15189         ; 2 * freq / 9600
tone_2225_72s  equ    20252 tone_1500      equ    10240

1941    equ    6424
1852    equ    5816
1770    equ    5257
1697    equ    4758 h1663   equ    11148
h1477   equ    10083
h1336   equ    9120
h1209   equ    8253

1941_72s    equ    8565
1852_72s    equ    7755
1770_72s    equ    7009
1697_72s    equ    6344 h1663_72s   equ    14864
h1477_72s   equ    13444
h1336_72s   equ    12160
h1209_72s   equ    11004
```

END OF ASSEMBLY LANGUAGE LISTING

What is claimed is:

1. In combination with a computer of the class comprising, in combination:
   a microprocessor,
   a random access memory,
   a system bus composed of data and control conductors interconnecting said microprocessor and said memory,
   a direct memory access controller connected to said bus for supervising data transfers to and from said memory via the said system bus independently of the operation of said microprocessor, and
   at least one expansion slot socket connected to said system bus,
   an auxiliary circuit card for communicating between said computer and a remote device via a voice-band telephone circuit, said circuit card comprising, in combination:
   an edge connector including a plurality of electrical terminals adapted for insertion into said at least one expansion slot socket to establish electrical connections to said system bus,
   a hybrid circuit having a bi-directional telephone line port, and incoming port for delivery an incoming voice-band analog signal, and an outgoing voice-band port for receiving an outgoing voice-band analog signal,
   a telephone line adapter circuit connected between said telephone circuit and said bi-directional line port of said hybrid circuit, said line adapter circuit including a hook switch for selectively connecting and disconnecting said telephone circuit and said line port in response to a first control signal, a loop-current detector for generating a second control signal indicating when an active connection has been established with said remote device, a ringing-signal detector for generating a third control signal indicating when ringing signals are being received over said telephone circuit, and circuit means for transmitting said first, second, and third control signals between said auxiliary circuit card and said system bus via said edge connector, an incoming sample data register connected to said edge connector,
   an analog-to-digital converter connected between the incoming port of said hybrid circuit and said incoming sample data register for converting sample amplitudes of said incoming voice-band analog signal into incoming digital sample values which are temporarily stored in said incoming sample data register,
   first control means for applying a direct memory access storage request signal to said edge connector for transmission via said bus to said direct memory access controller each time an incoming digital sample value is temporarily stored in said incoming data register to effect the transfer of said incoming sample value to said memory,
   an outgoing sample data register connected to said edge connector,
   a digital-to-analog converter connected between the outgoing port of said hybrid circuit and said outgoing sample data register for said outgoing voice-band analog signal,
   second control means for applying a direct memory access read request signal to said edge connector for transmission via said bus to said direct memory access controller each time an sample value in said output register has been converted by said digital-to-analog converter, and
   third control means applying an interrupt signal to said edge connector for transmission via said bus to said microprocessor each time a predetermined number of incoming digital values have been processed by said analog-to-digital converter.

2. In combination with a computer of the class comprising, in combination, a microprocessor, a random access memory, expansion socket, and a system bus interconnecting said microprocessor, memory, and expansion socket, an arrangement for communicating between said computer and a remote device via a voice-band telephone circuit connecting to a telephone switching office, said arrangement comprising, in combination:
   an auxiliary circuit card having an edge connector to engage said expansion socket, said auxiliary circuit card further comprising, in combination:
   a telephone line adapter circuit connected to said telephone circuit, said line adapter circuit including a hook switch for selectively connecting and disconnecting said telephone circuit and said auxiliary circuit card in response to a first control signal, a loop-current detector for generating a second control signal indicating when an active connection has been established with said switching office, a ringing-signal detector for generating a third control signal indicating when ringing signals are being received over said telephone circuit from said switching office, and circuit means for transmitting said first, second, and third control signals between said auxiliary circuit card and said system bus,
   a hybrid circuit, interconnected to said line adapter circuit and having a bi-directional line port, for communicating signals to and from said line adapter circuit along said bi-directional line port, and
   signal conversion means connected between said bi-directional line port and said edge connector for translating an incoming analog signal from said hybrid circuit into incoming digitally-expressed values representative of the amplitude of samples of said incoming analog signal, for supplying said values to said bus via said edge connector, and for translating outgoing digital sample values received from said bus via said edge connector into a voice band analog signal for transmission to said hybrid circuit and over said telephone circuit, and
   call progress control means for supervising the connection between said computer and said telephone circuit via said auxiliary circuit card, said call progress control means comprising, in combination:
   means including a first set of instructions stored in said memory and executed by said microprocessor for applying a sequence of outgoing digital sample values to said bus which are representative of a sequence of dual dial-tone signals suitable for establishing a dial-up connection via said switching office to said remote device, and
   means including a second set of instructions stored in said memory and executed by said microprocessor for processing said incoming digitally-expressed sample values to detect the presence of an answer tone received over said telephone circuit from said switching office.

3. An auxiliary circuit card as claimed in claim 1, further comprising, in combination:
   a modem modulation routine executed by said microprocessor for translating digital data into said digital sample amplitude values; and a modem demodulation routine executed by said microprocessor for translating said incoming digital sample values into digital data.

4. An auxiliary circuit card as claimed in claim 3 wherein said modem modulation and modem demodulation routines are stored in said memory.

5. An auxiliary circuit card as claimed in claim 1, wherein said remote device operates at a remote baud rate, said analog-to-digital converter converts said sample amplitudes into a first stream of incoming digital sample values at a sampling rate synchronized to a local clock signal, and said auxiliary circuit card further comprises, in combination:

an interpolation routine executed by said microprocessor for interpolating said first stream of incoming digital sample values and thereby producing a second stream of incoming digital sample values substantially synchronized to said remote baud rate;

a modem modulation routine executed by said microprocessor for translating digital data into said digital sample amplitude values; and a modem demodulation routine executed by said microprocessor for translating said second stream of incoming digital sample values into digital data.

6. In combination with a computer of the class comprising, in combination, a microprocessor, a random access memory, and a system bus composed of data and control conductors interconnecting said microprocessor and said memory, an auxiliary circuit for communicating in real time between said computer and a remote device via a voice band telephone circuit, said remote device operating at a remote baud rate, said auxiliary circuit comprising, in combination:

a hybrid circuit having a bi-directional telephone line port, an incoming port for delivering an incoming voice-band analog signal, and an outgoing voice-band port for receiving an outgoing voice-band analog signal;

a telephone line adapter circuit connected between said telephone circuit and said bi-directional line port of said hybrid circuit, said line adapter circuit including a hook switch for selectively connecting and disconnecting said telephone circuit and said line port in response to a first control signal, a loop-current detector for generating a second control signal indicating when an active connection has been established with said remote device, a ringing-signal detector for generating a third control signal indicating when a ringing signal is being received over said telephone circuit, and circuit means for transmitting said first, second and third control signals between said auxiliary circuit and said system bus;

an incoming sample data register interconnected to said system bus;

an analog-to-digital converter connected between the incoming port of said hybrid circuit and said incoming sample data register for converting sample amplitudes of said incoming voice-band analog signal into a first stream of incoming digital sample values which are temporarily stored in said incoming sample data register, said analog-to-digital converter sampling said amplitudes at a sampling rate synchronized to a local clock signal;

an interpolation routine executed by said microprocessor for interpolating said first steam of incoming digital sample values and thereby producing a second stream of incoming digital sample values substantially synchronized to said remote baud rate;

a modem demodulation routine executed by said microprocessor for translating said second stream of incoming digital sample values into digital data;

an outgoing sample data register interconnected to said system bus;

a modem modulation routine executed by said microprocessor for translating digital data to said digital sample amplitude values, said digital sample amplitude values being temporarily stored in said outgoing sample data register;

a digital-to-analog converter connected between the outgoing port of said hybrid circuit and said outgoing sample data register for converting digital sample amplitude values in said outgoing sample data register into said outgoing voice-band analog signal;

a call answering routine executed by said microprocessor when said incoming voice-band analog signal comprises an analog voice signal from a remote caller, for (i) transmitting a voice acknowledgement over said voice-band telephone circuit by transferring a predetermined set of outgoing digital sample values from a storage medium to said digital-to-analog converter to transmit a voice signal over said voice-band telephone circuit, and thereafter (ii) recording an incoming voice message received over said voice-band telephone circuit by storing a set of digital values representative of said analog voice signal on a storage medium;

a tone-dialing routine executed by said microprocessor for applying a sequence of outgoing digital sample values to said bus which are representative of a sequence of dual dial-tone signals suitable for establishing a dial-up connection to said remote device; and an answer-tone detection routine executed by said microprocessor for processing said incoming digital sample values to detect the presence of an answer tone received over said voice-band telephone circuit.

7. An auxiliary circuit as claimed in claim 6, wherein said interpolation, modem demodulation, modem modulation, call-answering, tone-dialing and answer-tone detection routines are stored in said memory.

8. An auxiliary circuit as claimed in claim 6, wherein said incoming voice-band analog signal comprises graphical data from a facsimile transmission device.

9. In combination with a computer of the class comprising, in combination, a microprocessor, a random access memory, and a system bus interconnecting said microprocessor and memory, an arrangement for communicating in real time between said computer and a remote device via a voice band telephone circuit interconnected to a telephone switching office, said remote device operating at a remote baud rate, said arrangement comprising, in combination:

(a) an auxiliary circuit communicating with said system bus, said auxiliary circuit further comprising, in combination:

(i) a telephone line adapter circuit connected to said telephone circuit, said line adaptor circuit including a hook switcher for selectively connecting and disconnecting said telephone circuit and said auxiliary circuit in response to a first control signal, a loop-current detector for generating a second control signal indicating when an active connection has been established with said switching office, a ringing-signal detector for generating a third control signal indicating when a ringing signal is being received over said telephone circuit from said switching office, and circuit means for transmitting said first, second, and third control signals between said auxiliary circuit card and said system bus, (ii) a hybrid circuit, interconnected to said line adapter circuit and having a bi-directional line port, for communicating signals to and from said line adapter circuit along said bi-directional line port, and (iii) signal conversion means interconnected to said bi-directional line port for translating an incoming analog signal from said hybrid circuit into incoming digitally-expressed values representative of the amplitude of samples of said incoming analog signal, for supplying said values to said bus, and for translating outgoing digital sample values received from said bus into a voice band analog signal for transmission to said hybrid circuit and over said telephone circuit, said signal conversion means including interpolation, demodulation and modulation routines executed by said microprocessor;

(b) call progress control means for supervising the connection between said computer and said telephone circuit via said auxiliary circuit, said call progress control means comprising, in combination:

(i) means including a first set of instructions stored in said memory and executed by said microprocessor for applying a sequence of outgoing digital sample values to said bus which are representative of a sequence of dual dial-tone signals suitable for establishing a dial-up connection via said switching office to said remote device, and (ii) means including a second set of instructions stored in said memory and executed by said microprocessor for processing said incoming digitally-expressed sample values to detect the presence of an answer tone received over said telephone circuit from said switching office; and (c) a call answering routine executed by said microprocessor, when information being communicated over said voice-band analog circuit comprises an analog voice signal from a remote caller, for (i) transmitting a voice acknowledgement over said voice-band telephone circuit by transferring a predetermined set of outgoing digital sample values from a storage medium to said digital-to-analog converter to transmit a voice signal over said voice-band telephone circuit, and thereafter (ii) recording an incoming voice message received over said voice-band telephone circuit by storing a set of digital values representative of said analog voice signal on a storage medium.

10. An arrangement as claimed in claim 9, wherein said interpolation, demodulation and modulation routines are stored in said memory.

11. In combination with a computer of the class comprising, in combination, a microprocessor, a random access memory, a system bus composed of data and control conductors interconnecting said microprocessor and said memory, and a direct memory access controller interconnected to said bus for supervising data transfers to and from said memory via said system bus independently of the operation of said microprocessor, an auxiliary circuit for communicating in real time between said computer end a remote device via a voice band telephone circuit, said auxiliary circuit comprising, in combination:

a hybrid circuit having a bi-directional telephone line port, an incoming port for delivering an incoming voice-band analog signal, and an outgoing voice-band port for receiving an outgoing voice-band analog signal;

a telephone line adapter circuit connected between said telephone circuit and said bi-directional line port of said hybrid circuit, said line adapter circuit including a hook switcher for selectively connecting and disconnecting said telephone circuit and said line port in response to a first control signal, a loop-current detector for generating a second control signal indicating when an active connection has been established with said remote device, a ringing-signal detector for generating a third control signal indicating when a ringing signal is being received over said telephone circuit, and circuit means for transmitting said first, second and third control signals between said auxiliary circuit and said system bus;

an incoming sample data register interconnected to said system bus;

an analog-to-digital converter connected between the incoming port of said hybrid circuit and said incoming sample data register for converting sample amplitudes of said incoming voice-band analog signal into incoming digital sample values, said incoming digital sample values being temporarily stored in said incoming sample data register;

an outgoing sample data register interconnected to said system bus; and a digital-to-analog converter connected between the outgoing port of said hybrid circuit and said outgoing sample data register for converting digital sample amplitude values in said outgoing sample data register into said outgoing voice-band analog signal.

12. An auxiliary circuit as claimed in claim 11, wherein said remote device operates at a remote baud rate, said analog-to-digital converter converts said sample amplitudes into a first stream of incoming digital sample values at a sampling rate synchronized to a local clock signal, and said auxiliary circuit further includes an interpolation routine executed by said microprocessor for interpolating said first stream of incoming digital sample values and thereby producing a second stream of incoming digital sample values substantially synchronized to said remote baud rate.

13. An auxiliary circuit as claimed in claim 12, further comprising:

a modem demodulation murine executed by said microprocessor for translating said second stream of incoming digital sample values into digital data; and a modem modulation routine executed by said microprocessor for translating digital data to said digital sample amplitude values, said digital sample amplitude values being temporarily stored in said outgoing sample data register.

14. An auxiliary circuit as claimed in claim 13, further comprising a call answering routine executed by said microprocessor when said incoming voice-band analog signal comprises an analog voice signal from a remote caller, for (i) transmitting a voice acknowledgement over said voice-band telephone circuit by transferring a predetermined set of outgoing digital sample values from a storage medium to said digital-to-analog converter to transmit a voice signal over said voice-band telephone circuit, and thereafter (ii) recording an incoming voice message received over said voice-band telephone circuit by storing a set of digital values representative of said analog voice signal on a storage medium;

a tone-dialing routine executed by said microprocessor for applying a sequence of outgoing digital sample values to said bus which are representative of a sequence of dual dial-tone signals suitable for establishing a dial-up connection to said remote device; and an answer-tone detection routine executed by said microprocessor for processing said incoming digital sample values to detect the presence of an answer tone received over said voice-band telephone circuit.

15. An auxiliary circuit as claimed in claim 14, wherein said modulation, demodulation, interpolation, call-answering, tone-dialing and answer-tone detection routines are stored in said memory.

16. An auxiliary circuit as claimed in claim 15, further comprising a first control means for applying a direct memory access storage request signal via said bus to said direct memory access controller each time an incoming digital sample value is temporarily stored in said incoming sample data register to effect the transfer of said incoming sample value to said memory.

17. An auxiliary circuit as claimed in claim 16, further comprising a second control means for applying a direct memory access read request signal via said bus to said direct memory access controller each time an sample value in said outgoing sample data register has been converted by said digital-to-analog converter.

18. An auxiliary circuit as claimed in claim 17, further comprising a third control means for applying an interrupt signal via said bus to said microprocessor each time a predetermined number of incoming digital values have been processed by said analog-to-digital converter.

19. An auxiliary circuit as claimed in claim 13, wherein said incoming voice-band analog signal comprises graphical data from a facsimile transmission device.

20. An auxiliary circuit as claimed in claim 13, further comprising, in combination, a call answering routine executed by said microprocessor when said incoming voice-band analog signal comprises an analog voice signal from a remote caller, for (i) transmitting a voice acknowledgement to said remote caller by transferring a predetermined set of outgoing digital sample values from a storage medium to said digital-to-analog converter to transmit a voice signal over said voice-band telephone circuit, and thereafter (ii) recording an incoming voice message received over said voice-band telephone circuit by storing a set of digital values representative of said analog voice signal on a storage medium.

21. An auxiliary circuit as claimed in claim 13, further comprising, in combination:
  a tone-dialing routine executed by said microprocessor for applying a sequence of outgoing digital sample values to said bus which are representative of a sequence of dual dial-tone signals suitable for establishing a dial-up connection to said remote device; and
  an answer-tone detection routine executed by said microprocessor for processing said incoming digital sample values to detect the presence of an answer tone received over said voice-band telephone circuit.

22. A method for communicating between a computer system and a remote device via a voice band telephone circuit, said remote device operating at a remote baud rate, said computer system comprising, in combination:
  (i) a microprocessor,
  (ii) a random access memory,
  (iii) a system bus composed of data and control conductors interconnecting said microprocessor and said memory,
  (iv) a hybrid circuit having a bi-directional telephone line port, an incoming port for delivering an incoming voice-band analog signal, and an outgoing voice-band port for receiving an outgoing voice-band analog signal,
  (v) a telephone line adapter circuit connected between said telephone circuit and said bi-directional line port of said hybrid circuit, said line adapter circuit including a hook switch for selectively connecting and disconnecting said telephone circuit and said line port in response to a first control signal, a loop-current detector for generating a second control signal indicating when an active connection has been established with said remote device, a ringing-signal detector for generating a third control signal indicating when a ringing signal is being received over said telephone circuit, and circuit means for transmitting said first, second and third control signals between said auxiliary circuit and said system bus,
  (vi) an incoming sample data register interconnected to said system bus,
  (vii) an analog-to-digital converter connected between the incoming port of said hybrid circuit and said incoming sample data register,
  (viii) an outgoing sample data register interconnected to said system bus, and
  (ix) a digital-to-analog converter connoted between the outgoing port of said hybrid circuit and said outgoing sample data register, said method comprising, in combination, the following steps:
  operating said analog-to-digital converter at a sampling rate synchronized to a local dock signal to convert sample amplitudes of said incoming voice-band analog signal into a first stream of incoming digital sample values;
  temporarily storing said incoming digital sample values in said incoming sample data register;
  operating said microprocessor to execute an interpolation routine stored in said memory, so as to interpolate said first stream of incoming digital samples values to thereby produce a second stream of incoming digital sample values substantially synchronized to said remote baud rate;
  operating said microprocessor to execute a modem demodulation routine stored in said memory, so as to translate said second stream of incoming digital sample values into digital data;
  operating said microprocessor to execute a modem modulation routine stored in said memory, so as to translate digital data to digital sample amplitude values;
  temporarily storing said digital sample amplitude values in said outgoing sample data register;
  operating said digital-to-analog converter to convert said digital sample amplitude values in said outgoing sample data register into said outgoing voice-band analog signal;
  detecting a ringing signal received over said voice-band telephone circuit from a remote caller when information being received over said voice band telephone circuit comprises an analog voice signal; and
  operating said microprocessor, responsive to said detection of said ringing signal from a remote caller, to (i) transmit a voice acknowledgement to said remote caller by transferring a predetermined set of outgoing digital sample values from a storage medium to said digital-to-analog converter to transmit a voice signal over said voice band telephone circuit, and to (ii) record an incoming voice message from said remote caller by storing a set of digital values representative of said analog voice signal on a storage medium.

23. A method as claimed in claim 22, further comprising, in combination, the following steps:

operating said microprocessor to execute a tone-dialing routine stored in said memory, so as to apply a sequence of outgoing digital sample values to said bus which are representative of a sequence of dual dial tone signals suitable for establishing a dial-up connection to said remote device; and operating said microprocessor to execute an answer-tone detection routine stored in said memory, so as to process said incoming digital sample values to detect the presence of an answer tone received over said voice-band telephone circuit.

\* \* \* \* \*